United States Patent [19]
Gambogi, Jr. et al.

[11] Patent Number: 5,930,011
[45] Date of Patent: Jul. 27, 1999

[54] HOLOGRAPHIC MULTICOLOR OPTICAL ELEMENTS FOR USE IN LIQUID CRYSTAL DISPLAYS AND METHODS OF MAKING THE ELEMENTS

[75] Inventors: William John Gambogi, Jr., Wilmington; Steven Robert Mackara, Townsend, both of Del.; Paul James Martin, Gloucester City, N.J.; Andrew Michael Weber, Wilmington; Torence John Trout, Yorklyn, both of Del.

[73] Assignee: E. I. du Pont de Nemours and Company, Wilmington, Del.

[21] Appl. No.: 08/718,688

[22] Filed: Sep. 17, 1996

Related U.S. Application Data

[63] Continuation-in-part of application No. 08/258,638, Jun. 10, 1994, abandoned.

[51] Int. Cl.⁶ .............. G02B 5/32; G03H 1/00; G03H 1/26; G03H 1/04
[52] U.S. Cl. .................. 359/15; 359/1; 359/22; 349/105; 349/106; 430/1; 430/2
[58] Field of Search .................. 359/1, 15, 22; 349/105, 106; 430/1, 2

[56] References Cited

U.S. PATENT DOCUMENTS

| | | | |
|---|---|---|---|
| 4,807,978 | 2/1989 | Grinberg et al. | 350/3.73 |
| 4,822,718 | 4/1989 | Latham et al. | 430/271 |
| 4,834,508 | 5/1989 | Fergason | 350/339 F |
| 4,876,165 | 10/1989 | Brewer et al. | 430/7 |
| 4,878,741 | 11/1989 | Fergason | 350/339 F |
| 4,929,060 | 5/1990 | Sugimoto et al. | 350/339 F |
| 4,966,441 | 10/1990 | Conner | 350/335 |
| 4,988,151 | 1/1991 | Moss | 350/3.66 |
| 5,089,905 | 2/1992 | Sasaki et al. | 359/64 |
| 5,113,274 | 5/1992 | Takahashi et al. | 359/66 |
| 5,120,621 | 6/1992 | Ramsbottom | 430/1 |
| 5,130,826 | 7/1992 | Takanashi et al. | 359/40 |
| 5,150,236 | 9/1992 | Patel | 359/71 |
| 5,182,180 | 1/1993 | Gambogi, Jr. et al. | 430/1 |
| 5,185,059 | 2/1993 | Nishida et al. | 156/659.1 |
| 5,229,039 | 7/1993 | Ikeda et al. | 252/582 |
| 5,232,634 | 8/1993 | Sawada et al. | 252/584 |
| 5,245,449 | 9/1993 | Ooi et al. | 359/40 |
| 5,267,060 | 11/1993 | Colton | 359/15 |
| 5,537,232 | 7/1996 | Biles | 359/15 |

FOREIGN PATENT DOCUMENTS

| | | | |
|---|---|---|---|
| 0 070 322 | 1/1983 | European Pat. Off. | G09F 9/00 |
| 0 401 566 | 12/1990 | European Pat. Off. | G03H 1/20 |
| 0 407 773 A2 | 1/1991 | European Pat. Off. | G02B 5/32 |
| 0 562 839 A1 | 9/1993 | European Pat. Off. | G03H 1/02 |
| 4-355451 | 5/1991 | Japan | G03F 7/031 |
| 5-313009 | 5/1992 | Japan | G02B 5/20 |
| 5-343631 | 6/1992 | Japan | H01L 27/092 |

OTHER PUBLICATIONS

Gambogi, William J., Mackara, Steven R., Trout, T. John, "Diffractive Printing Methods using Volume Holograms," Practical Holography VII: Imaging and Materials, Proceedings Reprint, *SPIE—The International Society for Optical Engineering*, vol. 1914, San Jose, CA, pp. 145–154, Feb. 1–2, 1993.

Smothers, W. K. et al., "Photopolymers for Holography," *SPIE, vol. 212, Practical Holograph IV*, 20–29 (1990).

*Primary Examiner*—Cassandra Spyrou
*Assistant Examiner*—Audrey Chang
*Attorney, Agent, or Firm*—Thomas H. Magee

[57] ABSTRACT

The present invention relates to holographic multicolor optical elements for use as multicolor filters in liquid crystal displays and methods of making the elements. The elements can be used as multicolor reflective or transmission filters The elements can have one, two, three or more holographic recording film layers Each layer comprises at least first and second pixel volumes containing holographic mirrors and preferably third pixel volumes containing a holographic mirror.

62 Claims, 29 Drawing Sheets

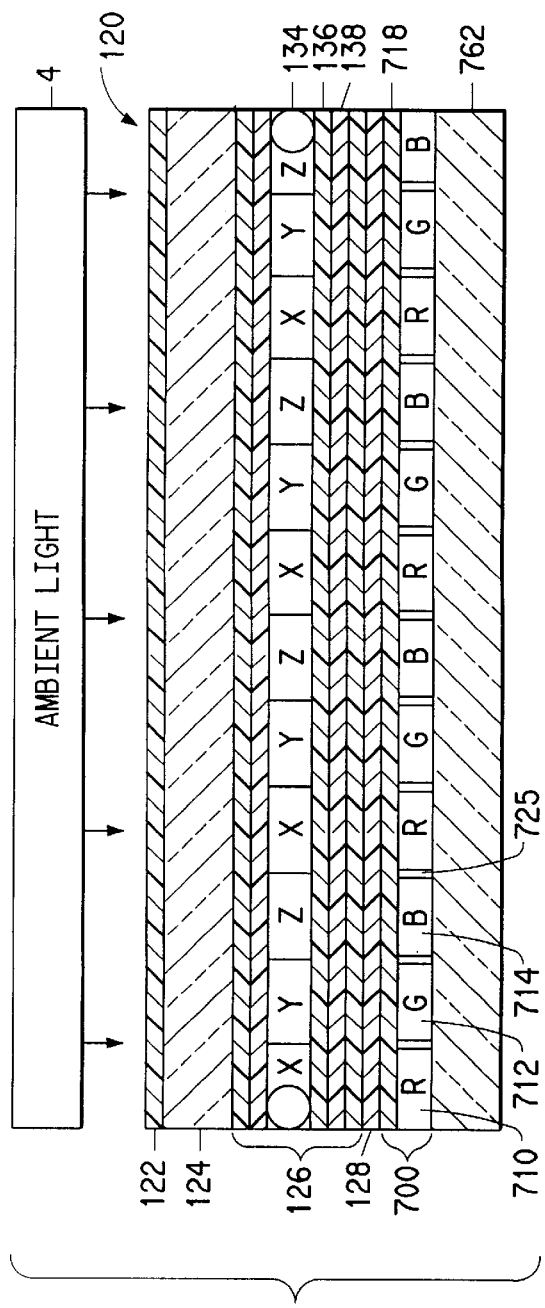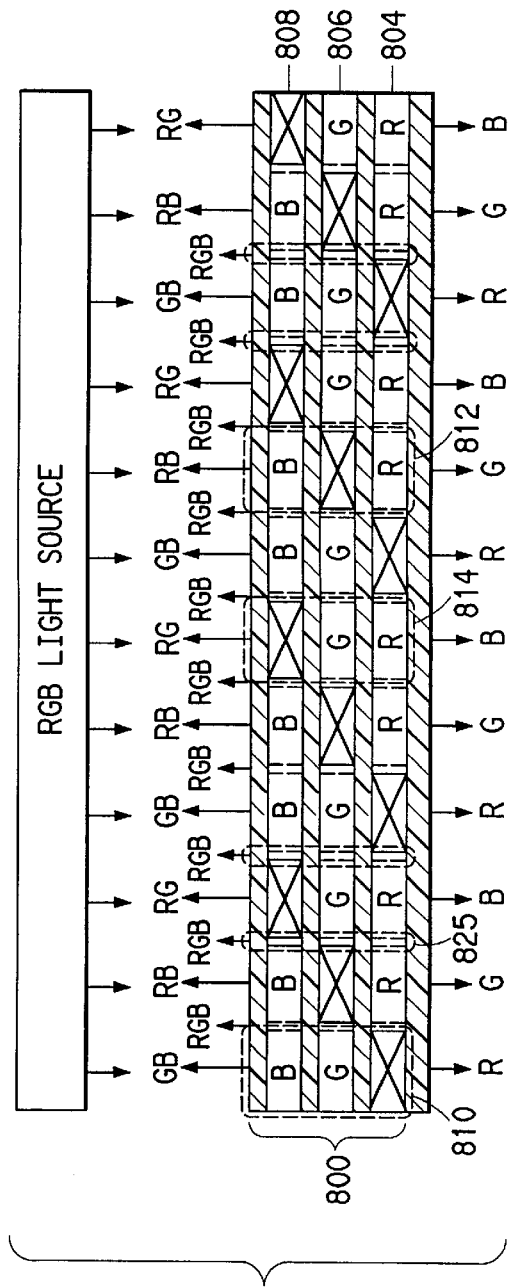

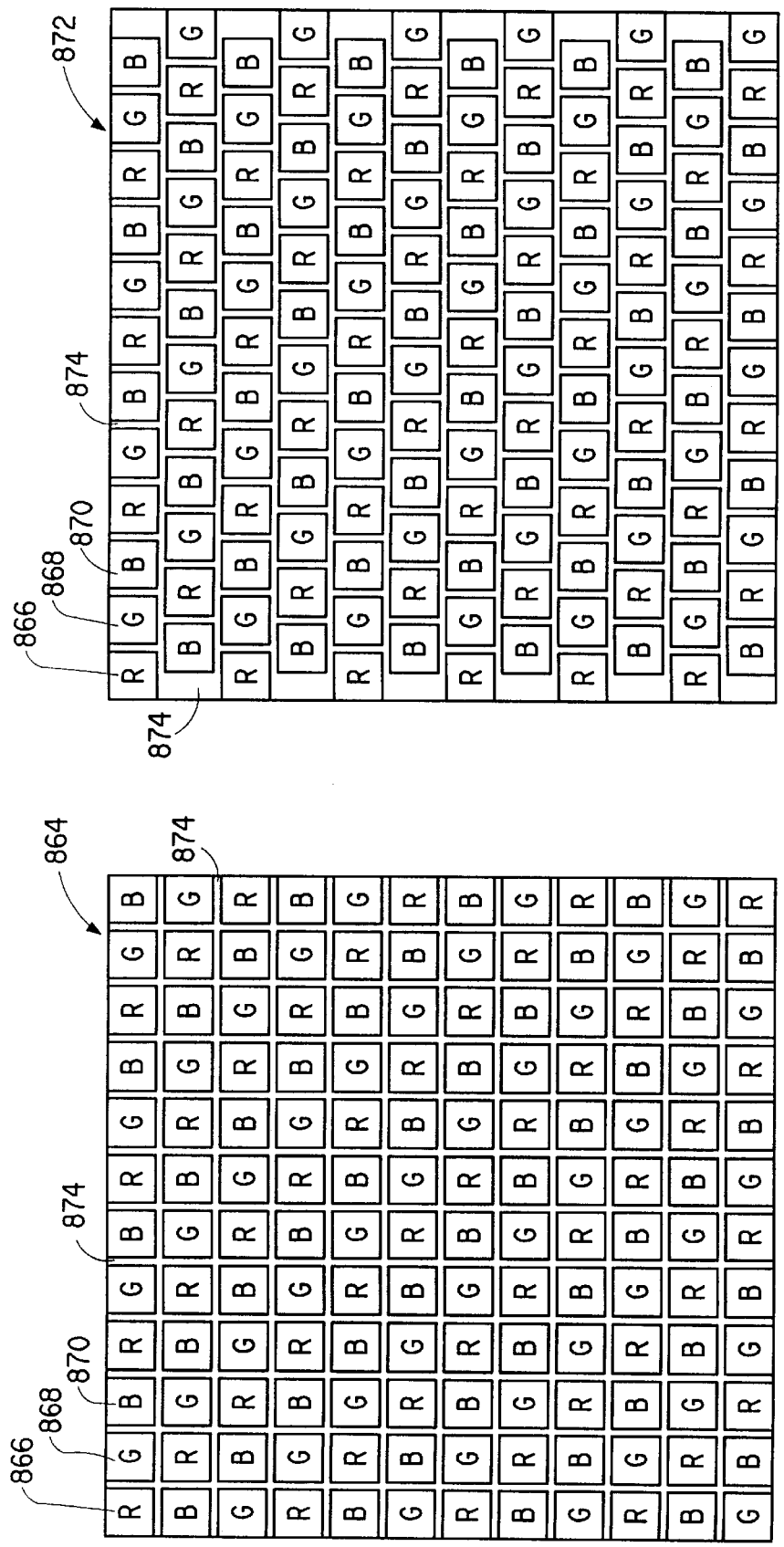

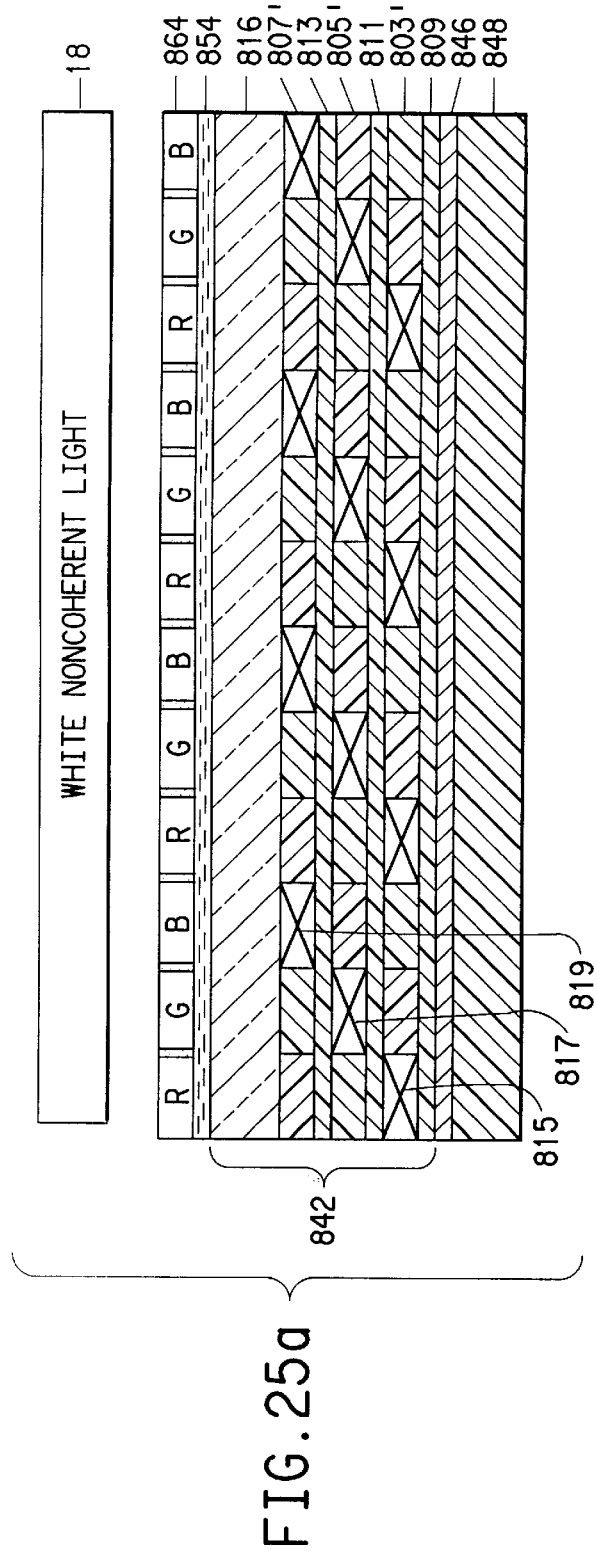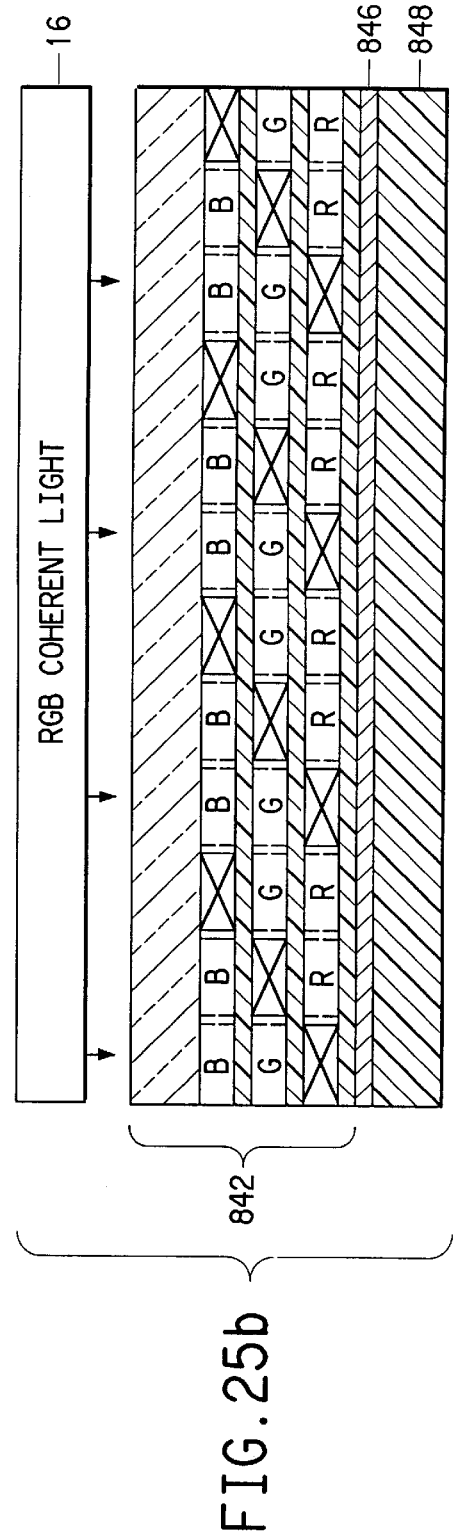
FIG. 25a
FIG. 25b

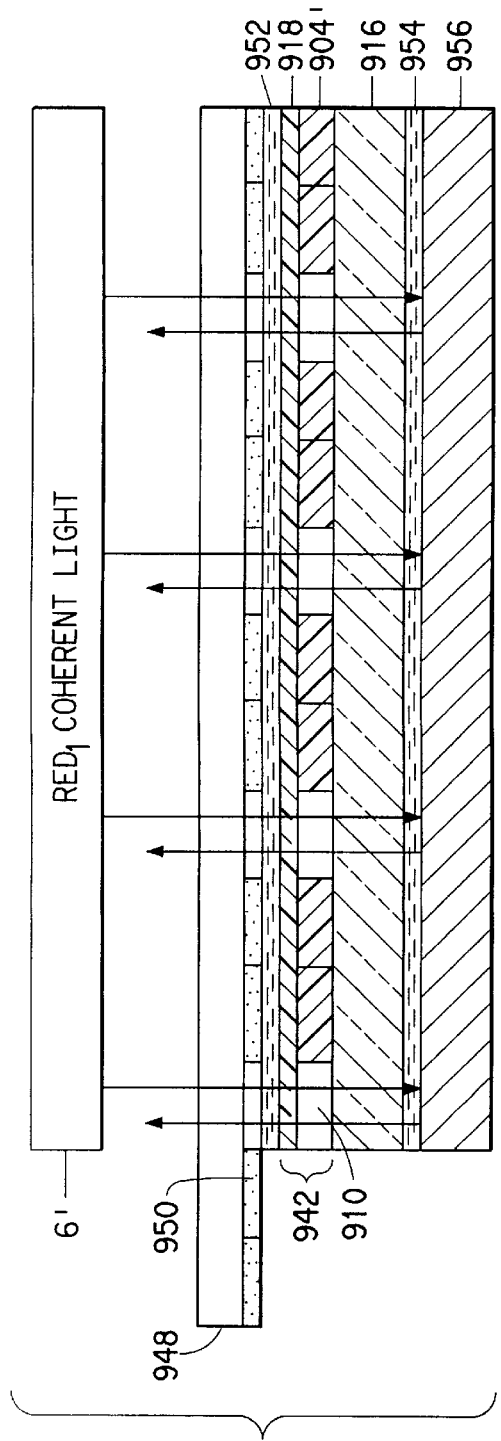
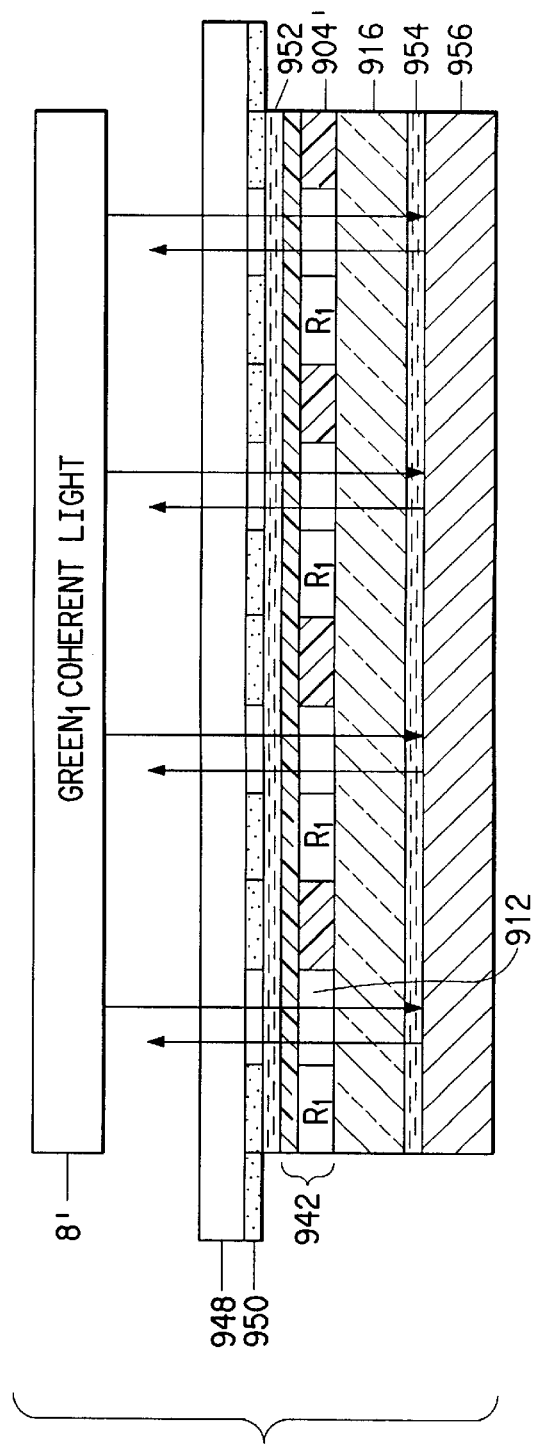
FIG. 29a
FIG. 29b

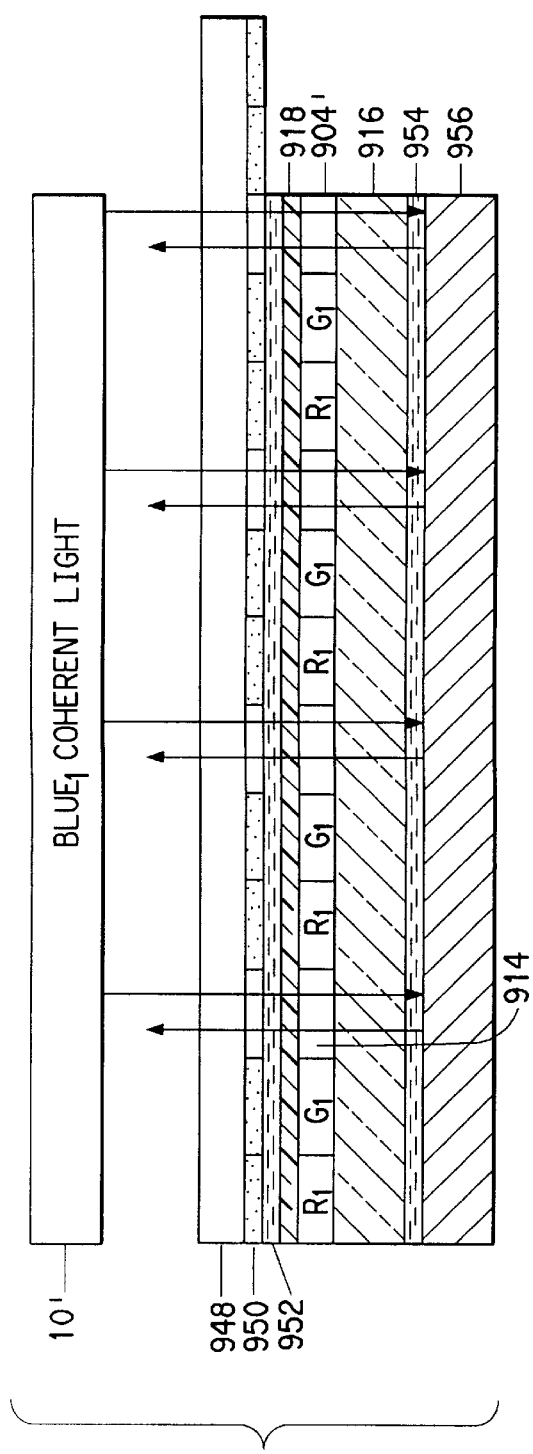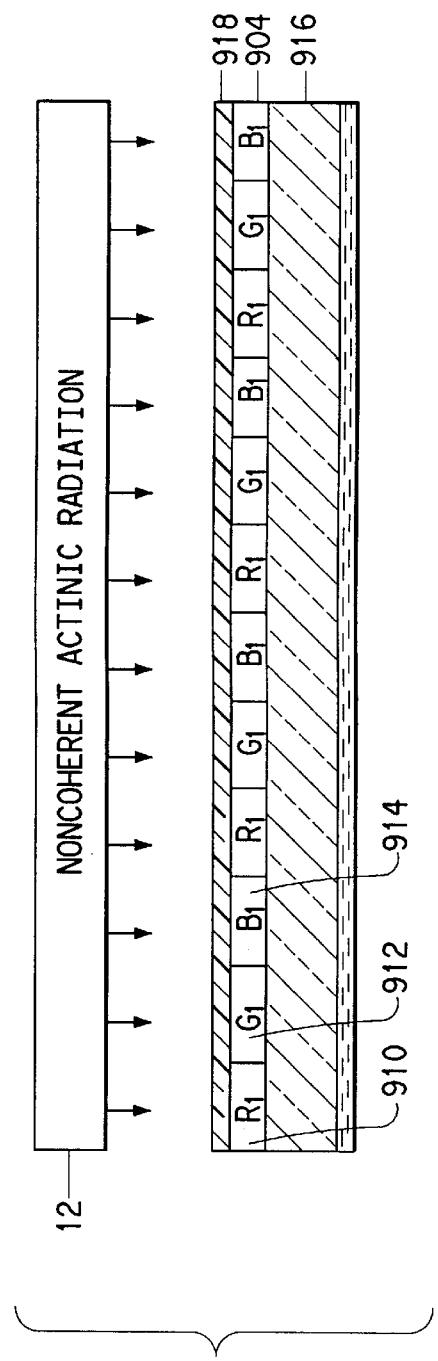

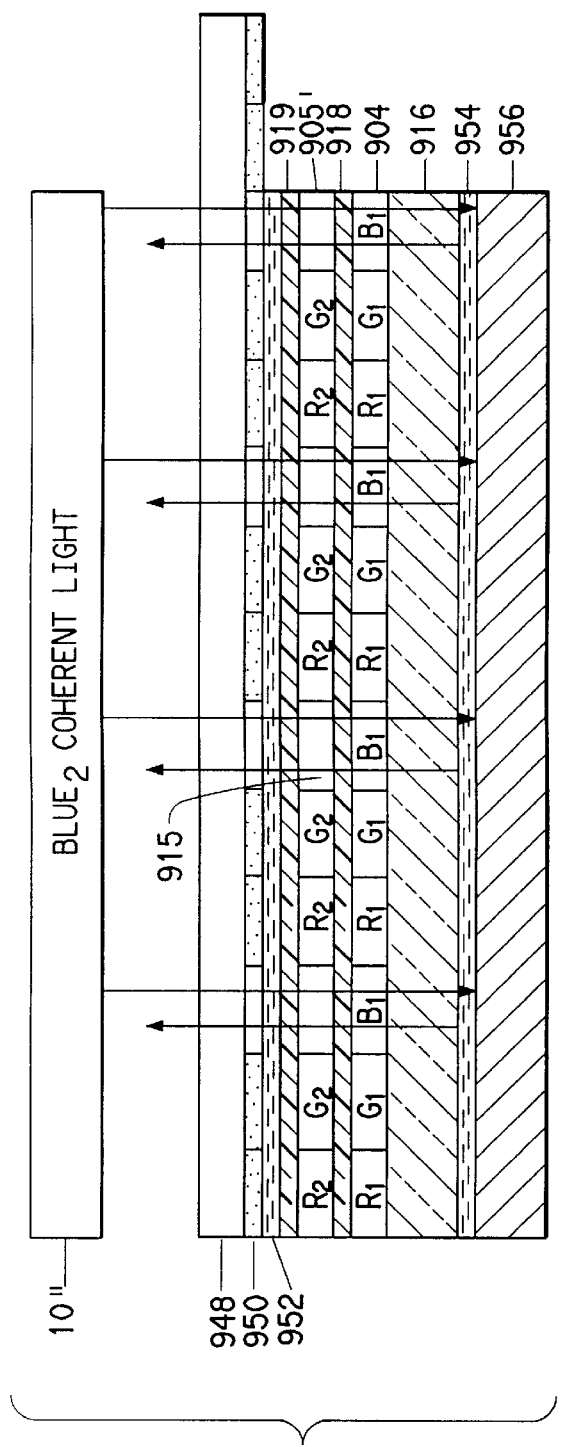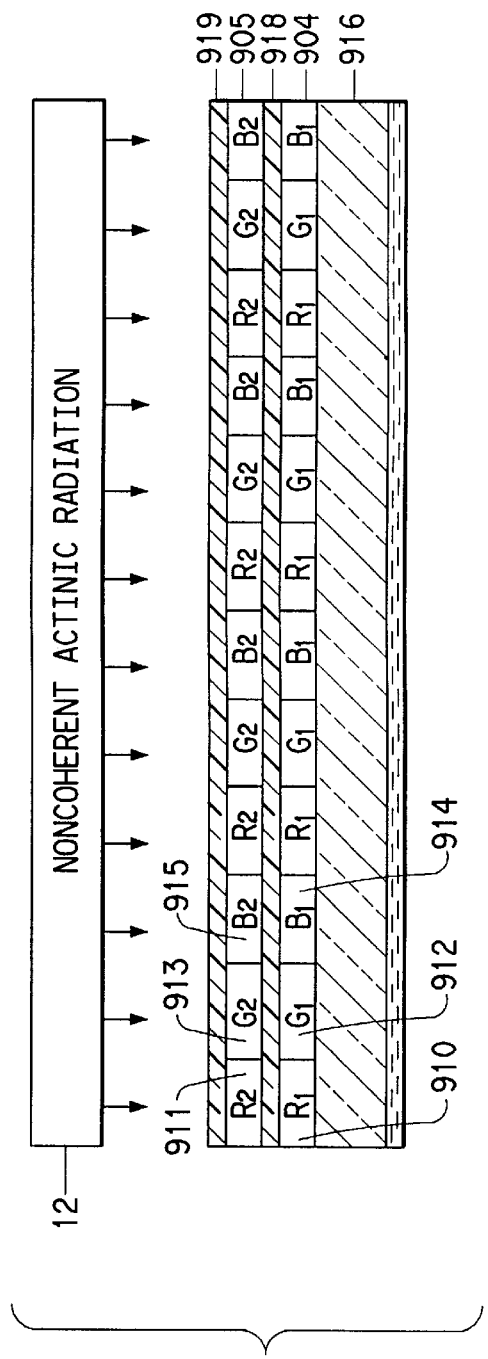

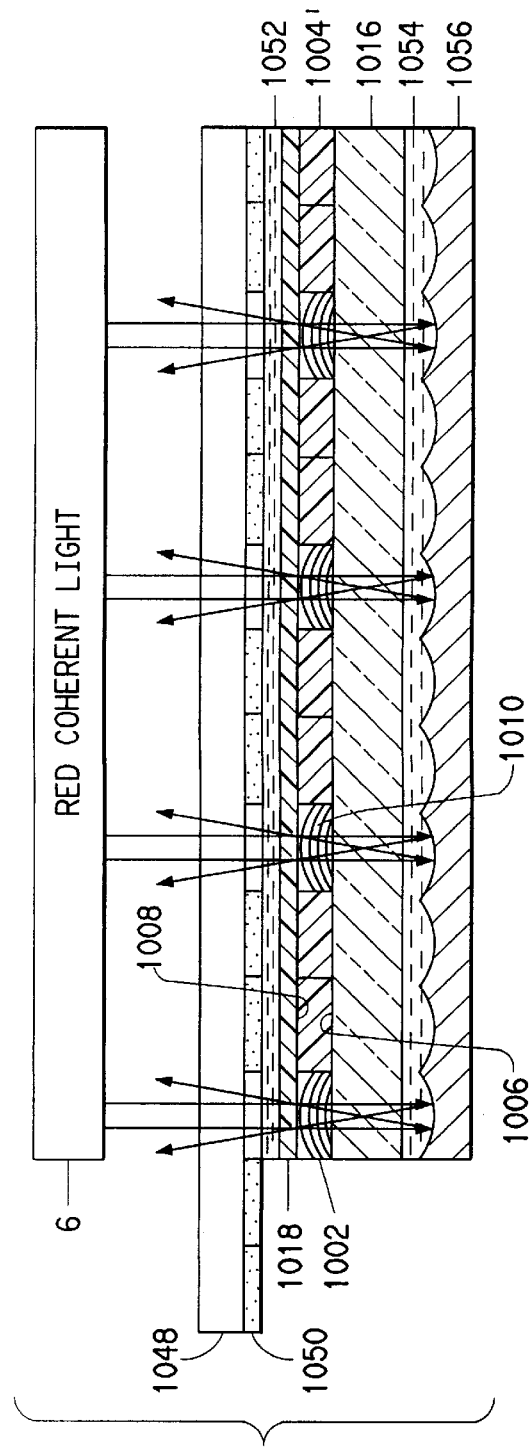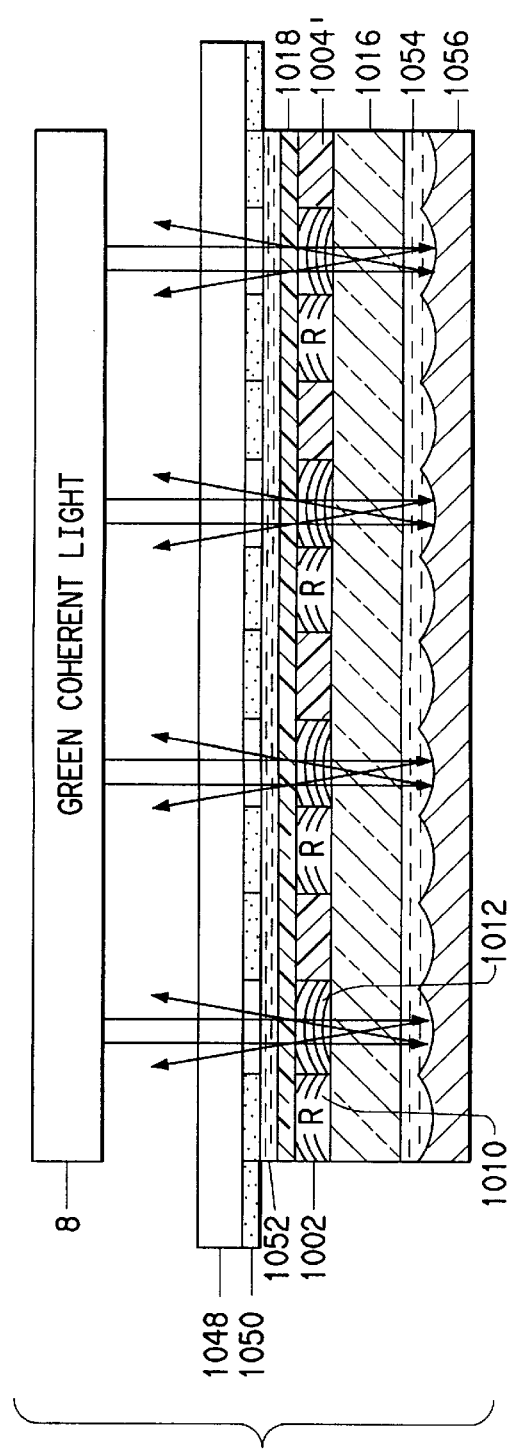

HOLOGRAPHIC MULTICOLOR OPTICAL ELEMENTS FOR USE IN LIQUID CRYSTAL DISPLAYS AND METHODS OF MAKING THE ELEMENTS

CROSS REFERENCES TO RELATED APPLICATIONS

This is a continuation-in-part of U.S. patent application Ser. No. 08/258,638 now abandoned. U.S. patent application Ser. No. 8/258,638 was filed Jun. 10, 1994, concurrently with, and is related to, U.S. patent application Ser. No. 08/258,036, now U.S. Pat. No. 5,526,145.

BACKGROUND OF THE INVENTION

1. Field of the Invention.

This invention relates to holographic multicolor optical elements for use as multicolor filters in liquid crystal displays and methods of making the elements.

2. Description of Related Art.

Multicolor liquid crystal display (LCD) assemblies have many uses including displays in vehicle dashboards, watches, calculators, televisions, computers, video camera view finders, etc. Conventional multicolor LCD assemblies are adapted to display images by transmitting light of different colors, typically red, green or blue, through selected miniature areas of a surface called pixels. Illustrative multicolor LCD assemblies are disclosed in U.S. Pat. Nos. 4,834,508, 4,878,741, 4,929,060, 4,966,441, 5,089,905, 5,113,274, 5,130,826, 5,150,236 and 5,245,449.

Conventional multicolor LCD assemblies typically use absorptive filters to absorb light except the desired color to be transmitted through each pixel. Illustrative absorptive filters for use in multicolor LCD assemblies are disclosed in U.S. Pat. Nos. 4,822,718, 4,876,165, 4,966,441, 5,185,059, 5,229,039, and 5,232,634 and in Japanese patent publications JP-04355451, JP-05313009-A and JP-05343631. In certain instances, as in U.S. Pat. No. 4,229,039, the color filter material has a dual role and also functions as an orientation layer in addition to a color filter.

The absorptive filters rely on a high concentration of particular dyes to insure sufficient absorption of background light and unwanted light of two colors out of the red, green and blue colors. The absorptive dyes typically absorb broad bands of light which restricts the colors, shades and resolution of the display. Further, the absorptive dyes are frequently not highest in transmission at the desired wavelength. Large absorptive filters are difficult to manufacture with high quality especially when pixel size is small throughout the filter. It is also desirable to find a lighter weight alternative to conventional absorptive filters.

Conventional LCD color filters typically also employ an opaque mask which creates a border, known as a "black matrix", surrounding each pixel. The black matrix is typically produced by sputtering chrome onto the glass substrate, applying photoresist, patternwise imaging the photoresist, etching the chrome and stripping the photoresist. It would be desirable to create the black matrix simultaneously with the creation of the color filter elements, thus simplifying the manufacturing process by reducing the number of manufacturing steps.

SUMMARY OF THE INVENTION

The invention relates to a volume holographic optical element for use as a multicolor filter in a liquid crystal display apparatus, comprising:

a photohardened holographic recording film element comprising at least a first plurality of pixel volumes and a second plurality of pixel volumes arranged in rows and columns;

each one of the first pixel volumes including a volume holographic mirror that passes light with at least one first color (e.g., Red) wavelength band and reflects light with at least another color (e.g., Green) wavelength band; and each one of the second pixel volumes including a volume holographic mirror that passes light with at least the another color (e.g., Green) wavelength band and reflects light with at least the one color (e.g., Red) wavelength band.

The invention is further directed to a volume holographic optical element for use as a multicolor reflection filter in a liquid crystal display apparatus, comprising:

a photohardened holographic recording film element comprising a first plurality of pixel volumes, a second plurality of pixel volumes, and a third plurality of pixel volumes;

each one of the first pixel volumes including a first volume holographic mirror that reflects light with a first color (e.g., Red) wavelength band and passes light with at least a second color (e.g, Green) wavelength band and a third color (e.g., Blue) wavelength band;

each one of the second pixel volumes including a second volume holographic mirror that reflects light with the second color (e.g., Green) wavelength band and passes light with at least the first color (e.g., Red) wavelength band and the third color (e.g., Blue) wavelength band; and each one of the third pixel volumes including a third volume holographic mirror that reflects light with the third color (e.g., Blue) wavelength band and passes light with at least the first color (e.g., Red) wavelength band and the second color (e.g., Green) wavelength band.

The invention is further directed to a volume holographic optical element for use as a multicolor transmission filter in a liquid crystal display apparatus, comprising:

a photohardened holographic recording film element comprising a first plurality of pixel volumes, a second plurality of pixel volumes, and a third plurality of pixel volumes;

each one of the first pixel volumes including a first volume holographic mirror that passes light with a first color (e.g., Red) wavelength band and reflects light with at least a second color (e.g., Green) wavelength band and a third color (e.g., Blue) wavelength band;

each one of the second pixel volumes including a second volume holographic mirror that passes light with the second color (e.g., Green) wavelength band and reflects light with at least the first color (e.g., Red) wavelength band and the third color (e.g., Blue) wavelength band; and each one of the third pixel volumes including a third volume holographic mirror that passes light with the third color (e.g., Blue) wavelength band and reflects light with at least the first dolor (e.g., Red) wavelength band and the second color (e.g., Green) wavelength band.

The invention is further directed to a wide-bandwidth volume holographic optical element for use as a multicolor reflection filter in a liquid crystal display apparatus, the volume holographic optical element comprising:

a plurality of first pixel volumes which each include a volume holographic mirror in a first layer and a volume holographic mirror in a second layer, the volume holographic mirror in the first layer reflecting light in a first wavelength sub-band of a first wavelength band and the volume holographic mirror in the second layer reflecting light in a second wavelength sub-band of a first wavelength band, the first sub-band being immediately adjacent in wavelength to the second wavelength sub-band;

a plurality of second pixel volumes which each include a volume holographic mirror in a first layer and a volume holographic mirror in a second layer, the volume holographic mirror in the first layer reflecting light in a first wavelength sub-band of a second wavelength band and the volume holographic mirror in the second layer reflecting light in a second wavelength sub-band of a second wavelength band, the first sub-band being immediately adjacent in wavelength to the second wavelength sub-band;

a plurality of third pixel volumes which each include a volume holographic mirror in a first layer and a volume holographic mirror in a second layer, the volume holographic mirror in the first layer reflecting light in a first wavelength sub-band of a third wavelength band and the volume holographic mirror in the second layer reflecting light in a second wavelength sub-band of a third wavelength band, the first sub-band being immediately adjacent in wavelength to the second wavelength sub-band.

The invention is further directed to a wide viewing angle volume holographic optical element for use as a multicolor reflection filter in a liquid crystal display apparatus, the volume holographic optical element comprising a plurality of first, second and third pixel volumes which each include a spherically convex volume holographic mirror.

The invention also relates to a volume holographic optical element for use as a multicolor filter in a liquid crystal display apparatus, comprising:

a photohardened holographic recording film element comprising at least a first plurality of pixel volumes, a second plurality of pixel volumes arranged in rows and columns and a substantially optically transparent mask volume;

each one of the first pixel volumes including a volume holographic mirror that passes light with at least one first color (e.g., Red) wavelength band and reflects light with at least a second color (e.g., Green) wavelength band;

each one of the second pixel volumes including a volume holographic mirror that passes light with at least the second color (e.g., Green) wavelength band and reflects light with at least the one color (e.g., Red) wavelength band;

the substantially optically transparent mask surrounding each first and second pixel volumes, comprising a third volume that transmits light with the first color (e.g., Red) wavelength band and transmits light with at least another color (e.g., Green) wavelength band; and an optical absorber that is substantially nonreflective and optically opaque.

The invention is further directed to a volume holographic optical element for use as a multicolor reflection filter in a liquid crystal display apparatus, comprising:

a photohardened holographic recording film element comprising at least a first plurality of pixel volumes, a second plurality of pixel volumes arranged in rows and columns and a substantially optically transparent mask;

each one of the first pixel volumes including a volume holographic mirror that passes light with at least one first color (e.g., Red) wavelength band and reflects light with at least a second color (e.g., Green) wavelength band;

each one of the second pixel volumes including a volume holographic mirror that passes light with at least the second color (e.g., Green) wavelength band and reflects light with at least the one color (e.g., Red) wavelength band;

the substantially optically transparent mask surrounding each first and second pixel volumes, comprising a third volume that transmits light with the first color (e.g., Red) wavelength band and transmits light with at least another color (e.g., Green) wavelength band; and a substantially light absorbing layer which substantially absorbs the light that passes through the first, second and third pixel volumes of the photohardened holographic recording film element.

The invention is further directed to a volume holographic optical element for use as a multicolor transmission filter in a liquid crystal display apparatus, comprising:

a photohardened holographic recording film element comprising a first plurality of pixel volumes, a second plurality of pixel volumes, a third plurality of pixel volumes, and a substantially optically opaque mask;

each one of the first pixel volumes including a first volume holographic mirror that reflects light with a first color (e.g., Red) wavelength band and passes light with at least a second color (e.g., Green) wavelength band and a third color (e.g., Blue) wavelength band;

each one of the second pixel volumes including a second volume holographic mirror that reflects light with the second color (e.g., Green) wavelength band and passes light with at least the first color (e.g., Red) wavelength band and the third color (e.g., Blue) wavelength band; and each one of the third pixel volumes including a third volume holographic mirror that reflects light with the third color (e.g., Blue) wavelength band and passes light with at least the first color (e.g., Red) wavelength band and the second color (e.g., Green) wavelength band; and the substantially optically opaque mask surrounding each first, second and third pixel volumes, comprising a fourth volume holographic mirror that reflects light with a first color (e.g., Red) wavelength band, reflects light with a second color (e.g., Green ) wavelength band, and reflects light with a third color (e.g., Blue) wavelength band.

The invention is further directed to a volume holographic optical element for use as a wide viewing angle multicolor reflection filter in a liquid crystal display apparatus, comprising:

a photohardened holographic recording film element comprising a first plurality of pixel volumes, a second plurality of pixel volumes, and a third plurality of pixel volumes;

each one of the first pixel volumes including a first volume holographic mirror that passes light with a first color (e.g., Red) wavelength band and reflects light, in a diverging manner within a predetermined cone angle, with at least a second color (e.g., Green) wavelength band and a third color (e.g., Blue) wavelength band;

each one of the second pixel volumes including a second volume holographic mirror that passes light with the second color (e.g., Green) wavelength band and reflects light, in a diverging manner within a predetermined cone angle, with at least the first color (e.g., Red) wavelength band and the third color (e.g., Blue) wavelength band; and each one of the third pixel volumes including a third volume holographic mirror that passes light with the third color (e.g., Blue) wavelength band and reflects light, in a diverging manner within a predetermined cone angle, with at least the first color (e.g., Red) wavelength band and the second color (e.g., Green) wavelength band.

The invention is further directed to a volume holographic optical element for use as a wide viewing angle multicolor transmission filter, comprising:

a photohardened holographic recording film element comprising a first plurality of pixel volumes, a second plurality of pixel volumes, and a third plurality of pixel volumes;

each one of the first pixel volumes including a first volume holographic mirror that passes light in a diverging manner with a first color (e.g., Red) wavelength band and reflects light, within a predetermined acceptance cone angle, with at least a second color (e.g., Green) wavelength band and a third color (e.g., Blue) wavelength band;

each one of the second pixel volumes including a second volume holographic mirror that passes light in a diverging manner with the second color (e.g., Green) wavelength band and reflects light, within a predetermined acceptance cone angle, with at least the first color (e.g., Red) wavelength band and the third color (e.g., Blue) wavelength band; and each one of the third pixel volumes including a third volume holographic mirror that passes light in a diverging manner with the third color (e.g., Blue) wavelength band and reflects light, within a predetermined acceptance cone angle, with at least the first color (e.g., Red) wavelength band and the second color (e.g., Green) wavelength band.

The volume holographic optical elements are preferably made of holographic recording elements comprising one, two or three holographic recording film elements.

Further, the invention is directed to methods for making the volume holographic optical elements.

BRIEF DESCRIPTION OF THE DRAWINGS

The invention can be more fully understood from the following detailed description thereof in connection with accompanying drawings described as follows.

FIG. 9b illustrates curing the holographic recording film element of FIG. 9a.

FIG. 10b illustrates curing the holographic recording film element of FIG. 10a.

FIG. 20 illustrates the seventh volume holographic optical element, used as a multicolor reflection filter in a liquid crystal display apparatus.

FIG. 22 illustrates an eighth volume holographic optical element with a holographic recording film element, comprising a substantially opaque mask surrounding each pixel, filtering a light source in accordance with the present invention.

FIG. 24a shows a first photomask that can be used in making the eighth volume holographic optical element.

FIG. 24b shows a second photomask that can be used in making the eighth volume holographic optical element.

FIG. 25a illustrates imagewise exposing a film element to make selected first layer volumes, second layer volumes and third layer volumes holographically inactive.

FIG. 25b illustrates holographically imaging the film element to record a plurality of first, second, and third holographic mirrors in the film element.

FIG. 29a illustrates holographically imaging the first holographic layer to record first holographic mirrors in the first holographic layer.

FIG. 29b illustrates holographically imaging the first holographic layer to record second holographic mirrors in the first holographic layer.

FIG. 29c illustrates holographically imaging the first holographic layer to record third holographic mirrors in the first holographic layer.

FIG. 29d illustrates curing the first holographic layer.

FIG. 29g illustrates holographically imaging the second holographic layer to record sixth holographic mirrors in the second holographic layer.

FIG. 29h illustrates curing the ninth volume holographic optical element.

FIG. 31a illustrates holographically imaging the film element to record first holographic mirrors in the film element.

FIG. 31b illustrates holographically imaging the film element to record second holographic mirrors in the film element.

DESCRIPTION OF THE PREFERRED EMBODIMENT(S)

Figure 1:
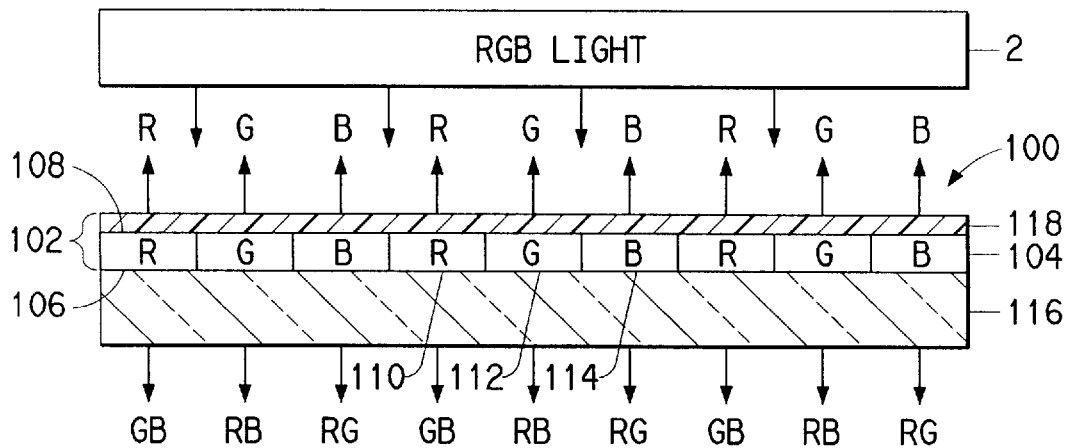
FIG. 1 illustrates a first volume holographic optical element filtering light from a light source in accordance with the present invention.

Throughout the following detailed description, similar reference characters refer to similar elements in all figures of the drawings I. Holographic Optical Elements and Manufacturing Methods 1.0 First Holographic Optical Element 100

Referring to FIG. 1, there is illustrated a first volume holographic optical element 100 in accordance with the present invention. The first volume holographic optical element 100 comprises a first photohardened holographic recording film element 102. In this embodiment, the photohardened holographic recording film element 102 comprises a first single holographic recording film layer 104 having a first surface 106 and a second surface 108. The first holographic recording film layer 104 comprises a first plurality of pixel volumes 110, a second plurality of pixel volumes 112, and a third plurality of pixel volumes 114.

Each one of the first pixel volumes 110 includes a first volume holographic mirror that reflects light with a first color (e.g., Red) wavelength band and passes light with at least a second color (e.g., Green) wavelength band and a third color (e.g., Blue) wavelength band. Each one of the second pixel volumes 112 includes a second volume holographic mirror that reflects light with the second color (e.g., Green) wavelength band and passes light with at least the first color (e.g., Red) wavelength band and the third color (e.g., Blue) wavelength band. Each one of the third pixel volumes 114 includes a third volume holographic mirror that reflects light with the third color (e.g., Blue) wavelength band and passes light with at least the first color (e.g., Red) wavelength band and the second color (e.g., Green) wavelength band.

The holographic mirrors are formed by fringes or gratings. The gratings of all holographic mirrors disclosed herein can be of any shape or slant achieved by conventional holographic methods. The gratings can be conformal gratings which are parallel to the surfaces 106,108 of the recording medium and/or non-conformal gratings which are non-parallel to the surfaces 106,108.

The operation or function of the first volume holographic optical element 100 is illustrated FIG. 1. Specifically, a light source 2 is illustrated providing light towards the first photohardened holographic recording film element 100. The light source 2 can emit the first color (e.g., Red) wavelength band, the second color (e.g., Green) wavelength band and/or the third color (e.g., Blue) wavelength band. The light source 2 can emit coherent, substantially coherent or noncoherent light. The letters in FIG. 1 designating the color wavelength bands and the associated arrows illustrate whether the element 100 will pass or reflect the specific color wavelength band assuming that the light source 2 emits actinic radiation in such color wavelength band. Preferably, if the light source 2 also emits other color wavelength bands, such wavelength bands would also pass through the first volume holographic optical element 100. The first volume holographic optical element 100 functions the same regardless of which side of the first volume holographic optical element 100 the light source 2 is positioned.

The first color wavelength band, the second color wavelength band and the third color wavelength band can be any distinct wavelength bands of light. Preferably, the distinct wavelength bands are separated by other wavelength bands. Preferably, light having the first color wavelength band has a bandwidth of at least 5 (and more preferably within about 20–30) nanometers and includes 612 nanometer which appears Red. Preferably, light having the second color wavelength band has a bandwidth of at least 5 (and more preferably within about 20–30) nanometers and includes 545 nanometer which appears Green. Preferably, light having the third color wavelength band has a bandwidth of at least 5 (and more preferably within about 20–30) nanometers and includes 436 nanometer which appears Blue. Unless otherwise indicated, the letters in all pixel volumes throughout the FIGS illustrate the color wavelength band(s) that is/are reflected by the pixel volume and all other color wavelengths pass through the pixel volumes. The letter "R" represents a Red wavelength band as an illustration for the first color wavelength band. The letter "G" represents a Green wavelength band as an illustration for the second color wavelength band. The letter "B" represents a Blue wavelength band as an illustration for the third color wavelength band. When two or more of these letters are listed together, it refers to light consisting essentially of the wavelength bands of each of the listed letters.

The first pixel volumes 110, the second pixel volumes 112 and the third pixel volumes 114 can be any shape and in any order in the film layer 104. The volumes 110,112,114 do have sides which are part of the first and second surfaces 106,108 of the film layer 104. FIG. 1 depicts one row of a two dimensional array of the volumes 110,112,114. Preferably, the pixels volumes 110,112,114 are ordered in each row of the array in a repeating sequence of one of the first pixel volumes 110, then one of the second pixel volumes 112 and then one of the third pixel volumes 114. The pixel volumes 110,112,114 in adjacent rows can be offset with respect to one another.

The first holographic optical element 100 further optionally comprises a dimensionally stable substrate 116 having a planar surface supporting the first surface 106 of the film layer 104. The first holographic recording film element 102 may further comprise a barrier layer 118 on the second surface 108 of the film layer 104.

Figure 2:
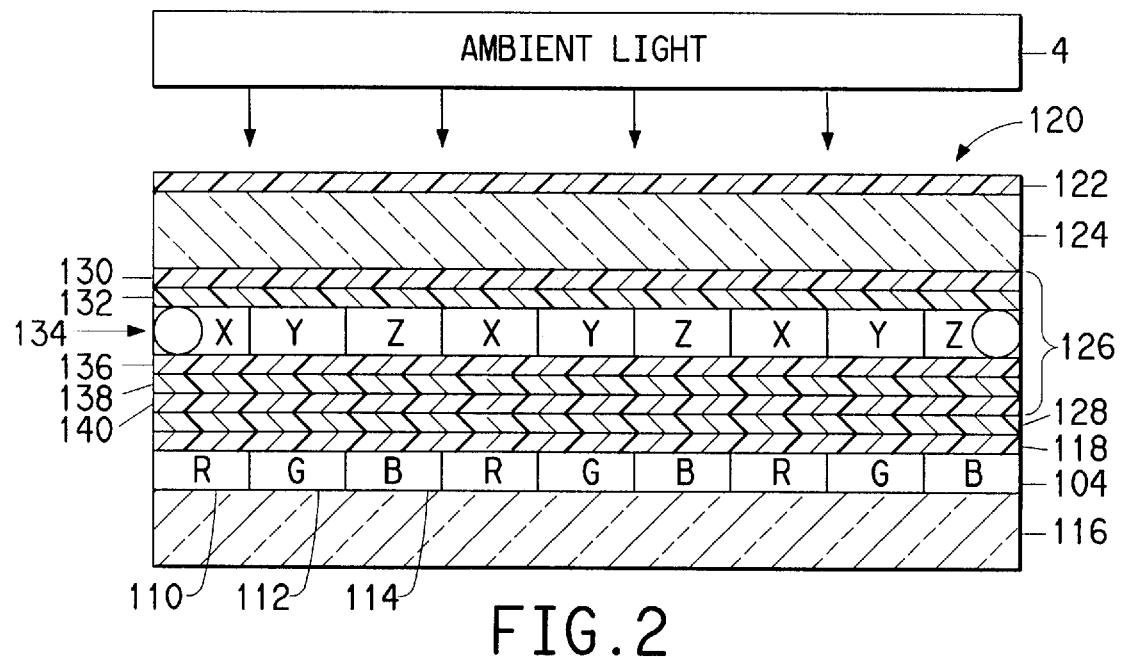
FIG. 2 illustrates the first volume holographic optical element used as a multicolor reflection filter in a liquid crystal display apparatus.

FIG. 2 illustrates the first volume holographic optical element 100 used as a multicolor reflection filter in a reflective liquid crystal display (LCD) apparatus 120. The reflective liquid crystal display apparatus comprises, in order, a first light polarizer 122, a top or first dimensionally stable support 124, a liquid crystal display element 126, a second light polarizer 128, and the holographic multicolor reflection filter 100. The first light polarizer 122 is for linearly polarizing and passing light, such as ambient light, having a first linear polarization. The top dimensionally stable substrate 124 provides rigidity and overall structural support. The liquid crystal display element 126 is well known by those skilled in the art and is for selectively modifying the polarization of the light passing through an array of cells X, Y, Z such that the polarization of light passing through a first set of the cells X, a second set of the cells Y or a third set of the cells Z can be changed to a second linear polarization. Illustrative liquid crystal display elements are disclosed in the publications cited in the Background of the Invention section of this specification. The second polarization is typically perpendicular to the first polarization. The liquid crystal display element 126 can comprise, in order, a first circuitry layer 130, a first alignment layer 132, a liquid crystal layer 134, a second alignment layer 136, a second circuitry layer 138, and a leveling layer 140. The circuitry layer 130 provides a first side of an electrical drive circuit capable of modifying a particular first side orientation of liquid crystals in the liquid crystal layer 134 through the first alignment layer 132. The liquid crystal layer 134 confines liquid crystals in cells corresponding to each pixel volume in the reflective filter 100. The second alignment layer 136 introduces a particular second side orientation to the liquid crystals in the liquid crystal layer 134. The second circuitry layer 138 provides a second side of the electrical drive circuit capable of modifying the particular second side orientation of liquid crystals in the liquid crystal layer 134 through the second alignment layer 136. The leveling layer 140 provides a rigid planar surface for the filter 100. The second light polarizer is for passing light from the liquid crystal display element 126 having the second polarization.

In operation, when the liquid crystal display element 126 modifies or rotates the polarization of the light passing through the first set of cells X to the second polarization, the light passes through the second polarizer 128 into the first pixel volumes 110 in which the first volume holographic mirrors reflect light with the first color (e.g., Red) wavelength band back through the liquid crystal display element 126 to a viewer on the same side of the LCD apparatus that ambient light 4 enters the first polarizer 122. When the liquid crystal display element 126 modifies or rotates the polarization of the light passing through the second set of cells Y to the second polarization, the light passes through the second polarizer 128 into the second pixel volumes 112 in which the second volume holographic mirrors reflect light with the second color (e.g., Green) wavelength band back through the liquid crystal display element 126 to the viewer. When the liquid crystal display element 126 modifies or rotates the polarization of the light passing through the third set of cells Z to the second polarization, the light passes through the second polarizer 128 into the third pixel volumes 114 in which the third volume holographic mirrors reflect light with the third color (e.g., Blue) wavelength band back through the liquid crystal display element 126 to the viewer. In all three cases, other wavelengths of light pass through the filter 100 away from the viewer. Further, light which passes through the liquid crystal display element 126 towards the second polarizer 128, but was not changed by the liquid crystal display element 126 to have the second polarization, is absorbed by the second polarizer 128.

1.1 Method for Making First Element 100

Figure 3:
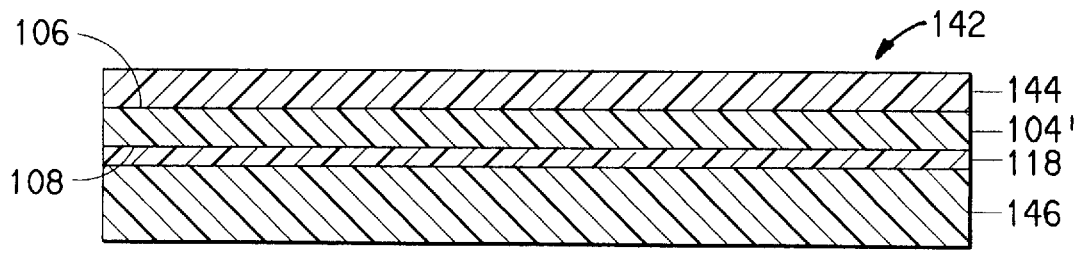
FIG. 3 illustrates a first photohardenable holographic recording film element.

FIG. 3 depicts a first holographic recording film element 142 which can be used in making the first photohardened holographic recording film element 100. The first holographic recording film element 142 comprises, in turn, a cover sheet 144, an unimaged, unexposed holographic recording film layer 104', the barrier layer 118 and a dimensionally stable support 146.

A method for making the first volume holographic optical element 100 will now be described starting with the first unimaged, unexposed holographic film element 142. The cover sheet 144 is removed from the first surface 106 of the first holographic film layer 104'. The first surface 106 of the film layer 104' is laminated on the dimensionally stable substrate 116. The support 146 is removed from the barrier layer 118. An anti-reflection plate 148 with a photomask layer 150 is coupled through a first index matching fluid layer 152 to the barrier layer 118.

Figure 4:
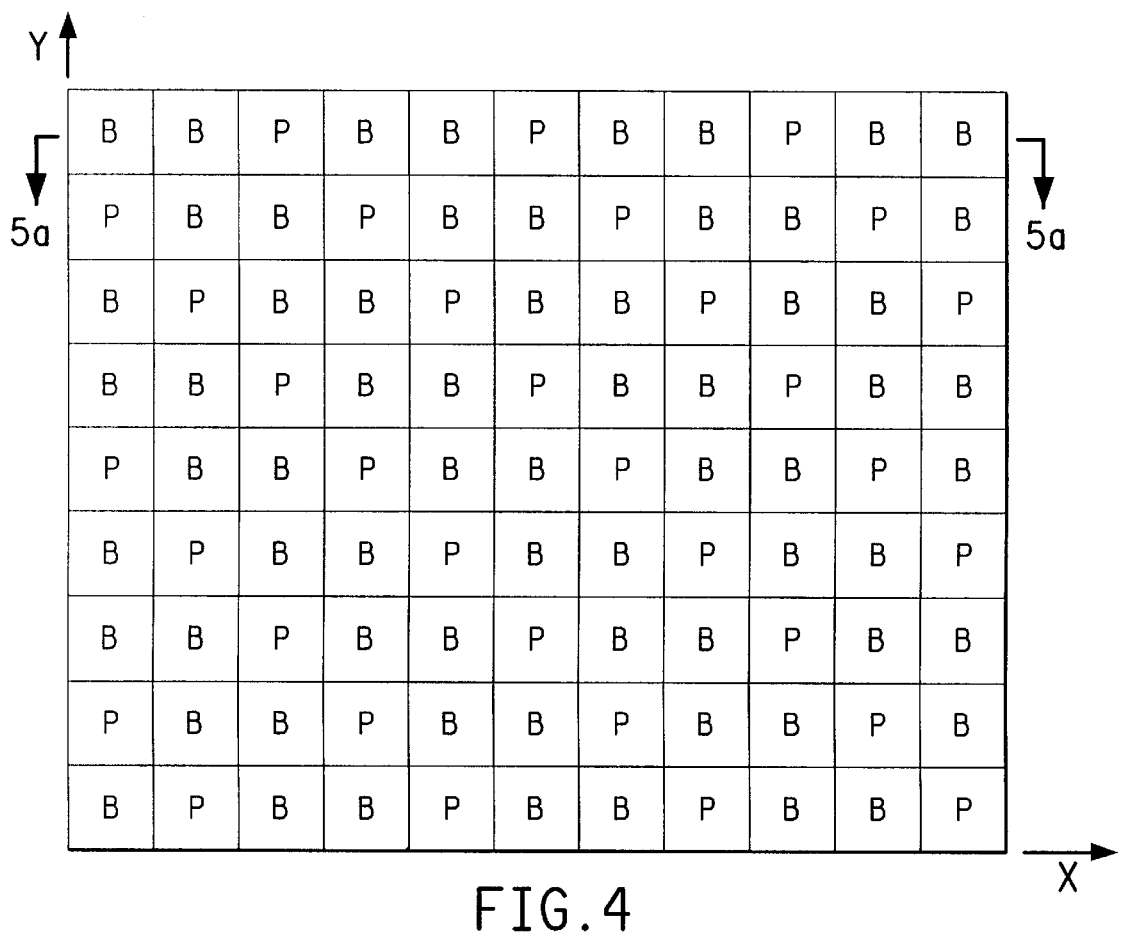
FIG. 4 shows a photomask that can be used in making the first volume holographic optical element.

FIG. 4 shows a pattern that can be used for the photomask layer 150. The pattern is a two dimensional array of pixels having a first plurality of pixels B adapted to block light, and a second plurality of pixels P adapted to transmit or pass light. As shown in FIG. 4, the array of pixels can have a repeating pattern of the following three rows of pixels:

|     |   | Column |   |   |   |   |   |   |   |   |   |   |     |
|-----|---|---|---|---|---|---|---|---|---|---|---|---|-----|
|     |   | 1 | 2 | 3 | 4 | 5 | 6 | 7 | 8 | 9 | 10 | 11 | ... |
| Row | 1 | B | B | P | B | B | P | B | B | P | B | B | ... |
|     | 2 | P | B | B | P | B | B | P | B | B | P | B | ... |
|     | 3 | B | P | B | B | P | B | B | P | B | B | P | ... |

Figure 5A:
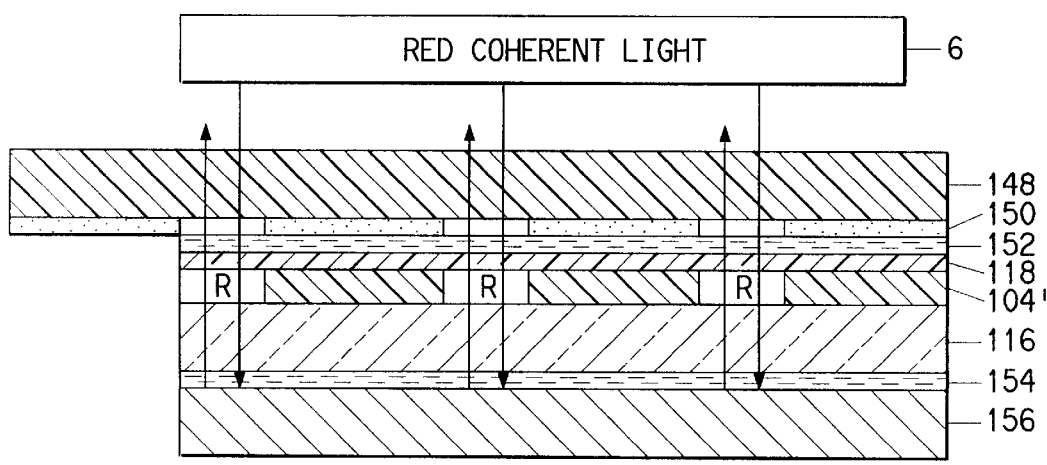
FIG. 5a illustrates holographically imaging a film element to record a plurality of first holographic mirrors in the film element.

The glass substrate 116 is coupled through a second index matching fluid layer 154 to a reflector 156, such as a front surface mirror. This results in a laminate structure which is depicted in FIG. 5a.

Next, a first color (e.g., Red) light source 6 is selected adapted to emit coherent or substantially coherent light consisting essentially of the first color (e.g., Red) wavelength band. Light from the first color (e.g., Red) light source 6 is directed, in turn, through the anti-reflection plate 148, the transparent pixels P of the photomask layer 150, and the first holographic film layer 104' onto the reflector 156. The reflector 156 reflects the light back through the first holographic film layer 104' such that the reflected light interferes with the light passing through the film layer 104 towards the reflector 156. This interference holographically images or imagewise holographically exposes the first holographic film layer 104' to record a plurality of the first volume holographic mirrors, one in each of the first pixel volumes 110.

Next the anti-reflection plate 148 and photomask layer 150 are shifted or moved one pixel in a first direction, i.e., in the X direction illustrated in FIG. 4.

Figure 5B:
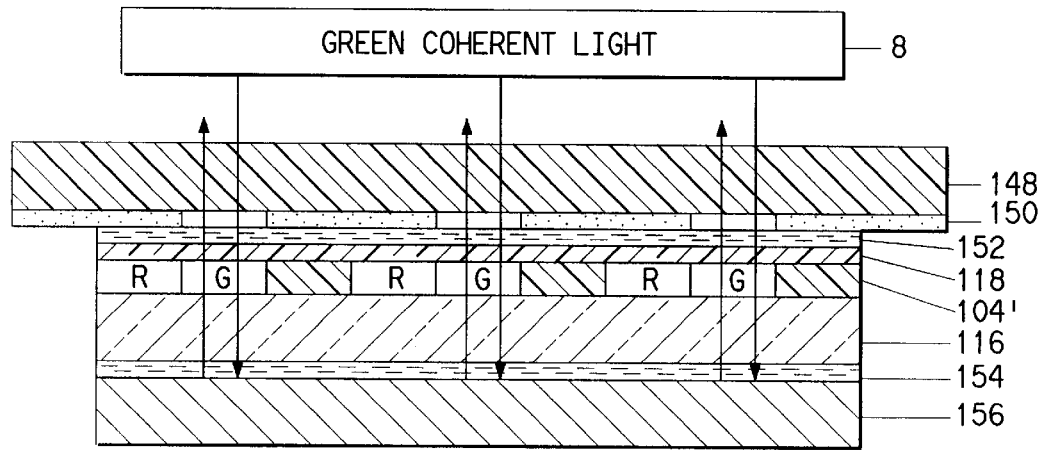
FIG. 5b illustrates holographically imaging the film element to record a plurality of second holographic mirrors in the film element.

Next, as illustrated in FIG. 5b, a second color (e.g., Green) light source 8 is selected adapted to emit coherent or substantially coherent light consisting essentially of the second color (e.g., Green) wavelength band. Light from the second color (e.g., Green) light source 8 is directed, in turn, through the anti-reflection plate 148, the transparent pixels P of the photomask layer 150, and the first holographic film layer 104' onto the reflector 156. The reflector 156 reflects the light back through the first holographic film layer 104' such that the reflected light interferes with the light passing through the film layer 104' towards the reflector 156. This interference holographically images or imagewise holographically exposes the first holographic film layer 104' to record a plurality of the second volume holographic mirrors, one in each of the second pixel volumes 112.

Figure 5C:
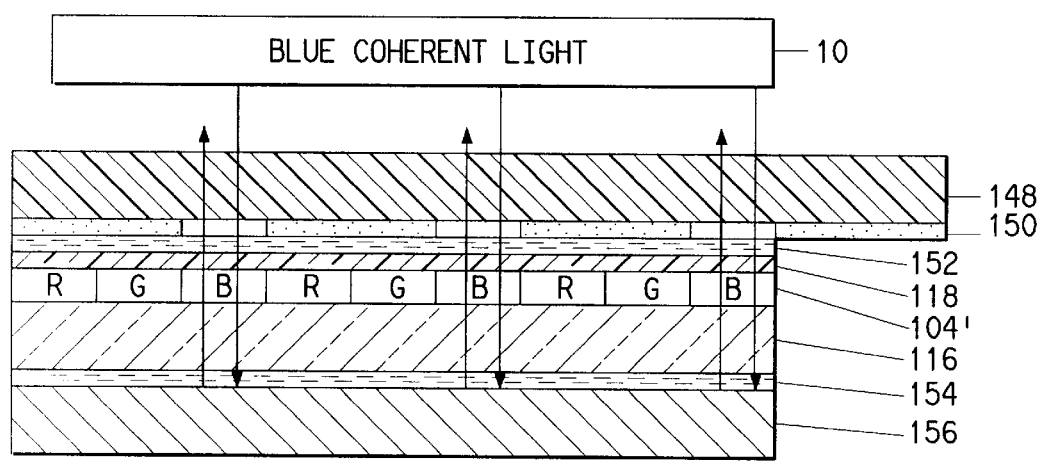
FIG. 5c illustrates holographically imaging the film element to record a plurality of third holographic mirrors in the film element.

Next the anti-reflection plate 148 and the photomask layer 150 are again shifted or moved one pixel in the first or X direction Next, as illustrated in FIG. 5c, a third color (e.g., Blue) light source 10 is selected adapted to emit coherent or substantially coherent light consisting essentially of the third color (e.g., Blue) wavelength band. Light from the third color (e.g., Blue) light source 10 is directed, in turn, through the anti-reflection plate 148, the transparent pixels P of the photomask layer 150, and the first holographic film layer 104' onto the reflector 156. The reflector 156 reflects the light back through the film layer 104' such that the reflected light interferes with the light passing through the film layer 104' towards the reflector 156. This interference holographically images or imagewise holographically exposes the film layer 104' to record a plurality of the third volume holographic mirrors, one in each of the third pixel volumes 114. This third consecutive holographic imaging step completes the formation of the unimaged film layer 104' into the imaged film layer 104.

Figure 5D:
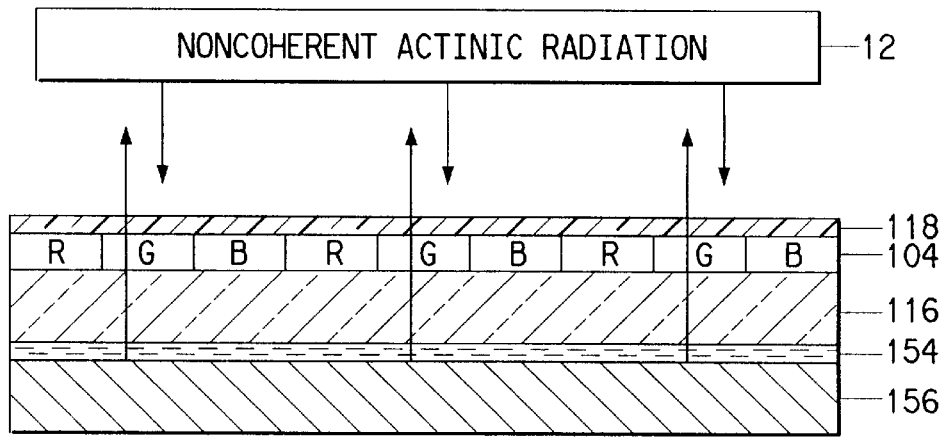
FIG. 5d illustrates curing the holographic recording film element.

After the anti-reflection plate 148, the photomask layer 150 and the first index matching fluid layer 152 are removed, the resulting laminate structure can be optionally cured, fixed or exposed to substantially polymerize any monomer and fix the holographic mirrors in the laminate structure This can be accomplished, as illustrated in FIG. 5d, by using noncoherent actinic radiation, such as from a broad band ultraviolet light source 12, to flood expose the laminate structure Throughout this application, the term "broad band ultraviolet light" means light in the spectral region of about 300 through 450 nanometers. This step provides an exposure level of about 100 millijoules per squared centimeter (mJ/cm$^2$), but the exposure level can be greater. This step typically occurs for about 20 seconds, but can occur longer. This step photohardens or substantially photohardens any remaining photosensitive material in the imaged film layer 104.

Figure 5E:
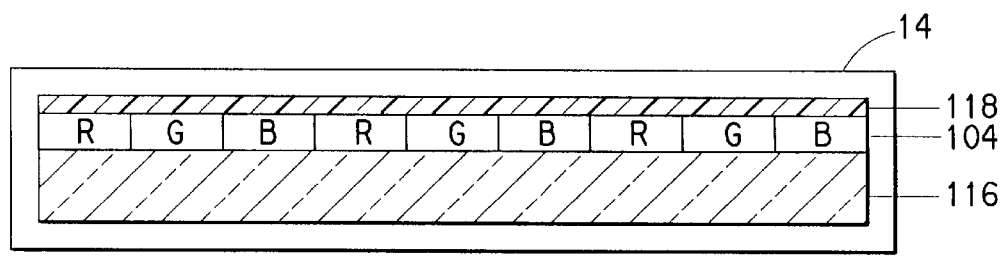
FIG. 5e illustrates heating the holographic recording film element.

After the reflector 156 and the second index matching fluid layer 154 are then removed, the resulting laminate structure can be optionally heated in an oven 14 such as illustrated in FIG. 5e. The structure is heated to further harden it and increase its refractive index modulation, its efficiency and the bandwidth of the holographic mirrors. This heating step occurs at a temperature in the range of about 50° C. through 200° C., and preferably in the range of about 100° C. through 160° C. The greater the temperature the shorter the duration of the heating step. Using the preferred materials, the holographic recording film element can be heated at about 100° C. for about 30 minutes.

This results in the first volume holographic optical element 100 illustrated in FIGS. 1 and 2 where the unimaged, unexposed holographic recording film layer 104' has become the holographic recording film layer 104 holographically imaged with mirrors, optionally fixed (flood exposed) and optionally cured.

2.0 Second Holographic Optical Element 200

Figure 6:
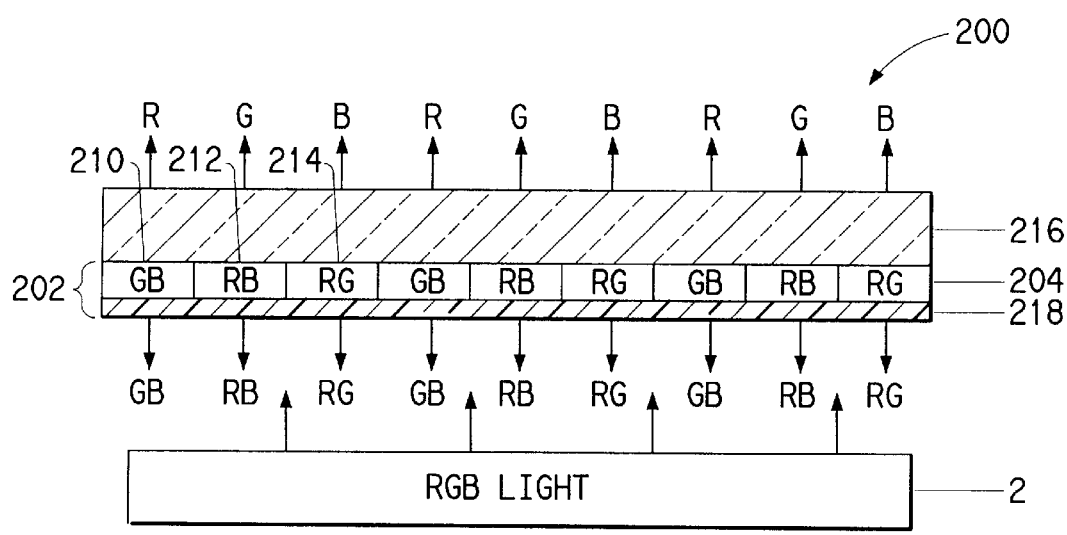
FIG. 6 illustrates a second volume holographic optical element filtering light from a light source in accordance with the present invention.

Referring to FIG. 6, there is illustrated a second volume holographic optical element 200 in accordance with the present invention. The second photohardened holographic recording film element 200 comprises a photohardened holographic recording film element 202 which, in this embodiment, comprises a second single holographic recording film layer 204. The second holographic recording film layer 204 comprises a first plurality of pixel volumes 210, a second plurality of pixel volumes 212, and a third plurality of pixel volumes 214.

Each one of the first pixel volumes 210 includes a first volume holographic mirror that passes light with the first color (e.g., Red) wavelength band and reflects light with at least the second color (e.g., Green) wavelength band and the third color (e.g., Blue) wavelength band. Each one of the second pixel volumes 212 includes a second volume holographic mirror that passes light with the second color (e.g., Green) wavelength band and reflects light with at least the first color (e.g., Red) wavelength band and the third color (e.g., Blue) wavelength band. Each one of the third pixel volumes 214 includes a third volume holographic mirror that passes light with the third color (e.g., Blue) wavelength band and reflects light with at least the first color (e.g., Red) wavelength band and the second color (e.g., Green) wavelength band.

In all other respects, the second volume holographic optical element 200 can be the same as the first volume holographic optical element 100.

The operation or function of the second volume holographic optical element 200 is illustrated FIG. 6. Specifically, the light source 2 is illustrated providing RGB light towards the second photohardened holographic recording film element 200. Arrows show that the first pixel volumes 210 pass the first color (e.g., R) light and reflect the second and third color (e.g., GB) light back to the RGB light source 2, etc. Again, if the light source 2 also emitted other color wavelength bands, such wavelength bands would preferably pass through the second volume holographic optical element 200. The second volume holographic optical element 200 also functions the same regardless of which side of the second volume holographic optical element 200 the light source 2 is positioned.

Figure 7A:
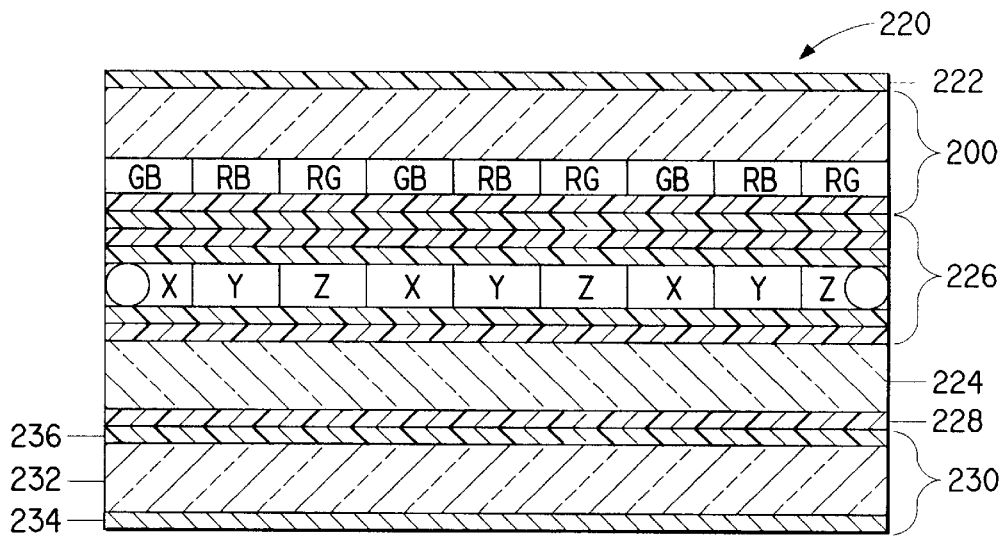
FIG. 7a illustrates the second volume holographic optical element used as a multicolor transmission filter in a liquid crystal display apparatus.

FIG. 7a illustrates the second volume holographic optical element 200 used as a multicolor transmission filter in a liquid crystal display 220. The transmission liquid crystal display apparatus comprises, in order, a first light polarizer 222, the holographic multicolor transmission filter 200, a liquid crystal display element 226, a first dimensionally stable substrate 224, a second light polarizer 228, and a light assembly 230.

Figure 7B:
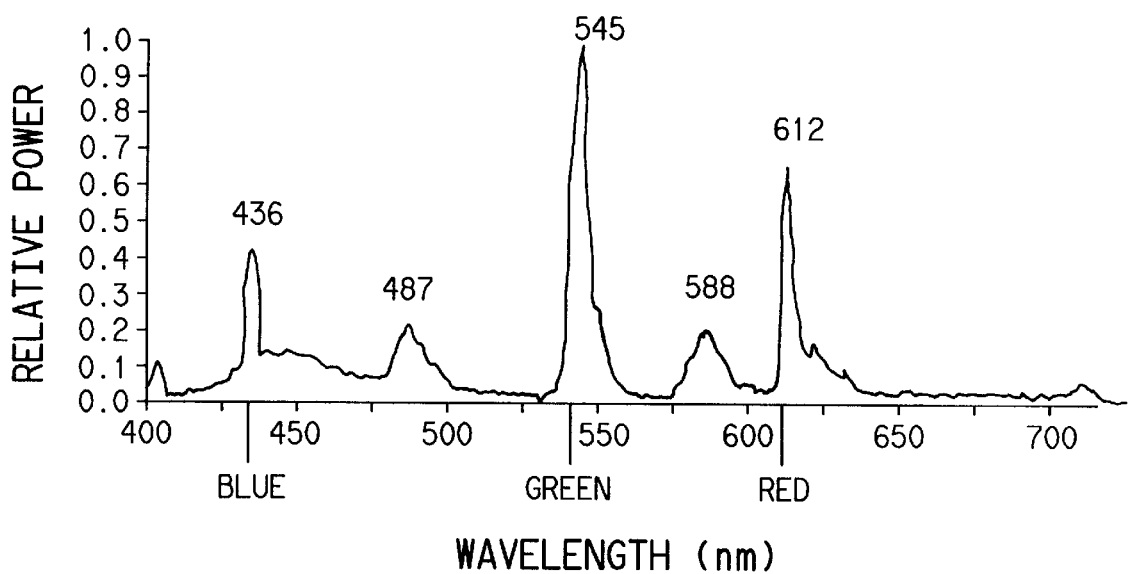
FIG. 7b is a graph of relative spectral power versus wavelength for a typical multicolor liquid crystal display light source.

The light assembly 230 can comprise a light source 232, a reflector or intensifier 234, and a prefilter 236. The light source 232 emits light with a first color (e.g., Red) wavelength band, a second color (e.g., Green) wavelength band and a third color (e.g., Blue) wavelength band. The light source 232 may also emit light with other wavelength bands. In this case, the prefilter 236 is included to block passage of the other wavelength bands. FIG. 7b is a graph of relative spectral power (e.g., milliwatts) versus wavelength (nm) for a typical multicolor liquid crystal display light source. The prefilter 236 could be made to block passage of light having wavelength bands of about 400–425, 474–500, and 575–595 nanometers. Preferably, the prefilter 236 is a volume holographic optical element adapted to pass the first color (e.g., Red) wavelength band, the second color (e.g., Green) wavelength band and the third color (e.g., Blue) wavelength band and to reflect other wavelength bands, such as wavelength bands of about 400–425, 474–500, and 575–595 nanometers.

The second light polarizer 228 is for linearly polarizing and passing light from the light assembly 230 having a first polarization. The liquid crystal display element 226 can be the same as the LCD display element 126 and passes light or polarized modified light to the filter 200. The first light polarizer 222 passes light from the filter 200 having the second polarization.

In operation, when the liquid crystal display element 226 modifies or rotates the polarization of the light passing through the first set of cells X to the second polarization, the light passes into the first pixel volumes 210 in which the first volume holographic mirrors pass light with the first color (e.g., Red) wavelength band through the first polarizer 222 to a viewer. When the liquid crystal display element 226 modifies or rotates the polarization of the light passing through the second set of cells Y to the second polarization, the light passes into the second pixel volumes 212 in which the second volume holographic mirrors pass light with the second color (e.g., Green) wavelength band through the first polarizer 222 to the viewer. When the liquid crystal display element 226 modifies or rotates the polarization of the light passing through the third set of cells Z to the second polarization, the light passes into the third pixel volumes 214 in which the third volume holographic mirrors pass light with the third color (e.g., Blue) wavelength band through the first polarizer 222 to the viewer.

2.1 First Method for Making the Second Element 200

Figure 8:
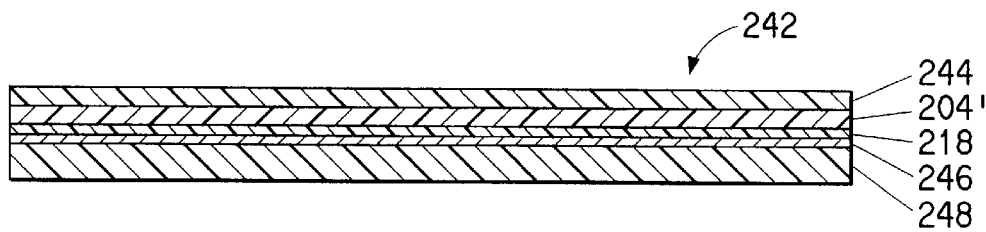
FIG. 8 illustrates a second photohardenable holographic recording film element.
Figure 9A:
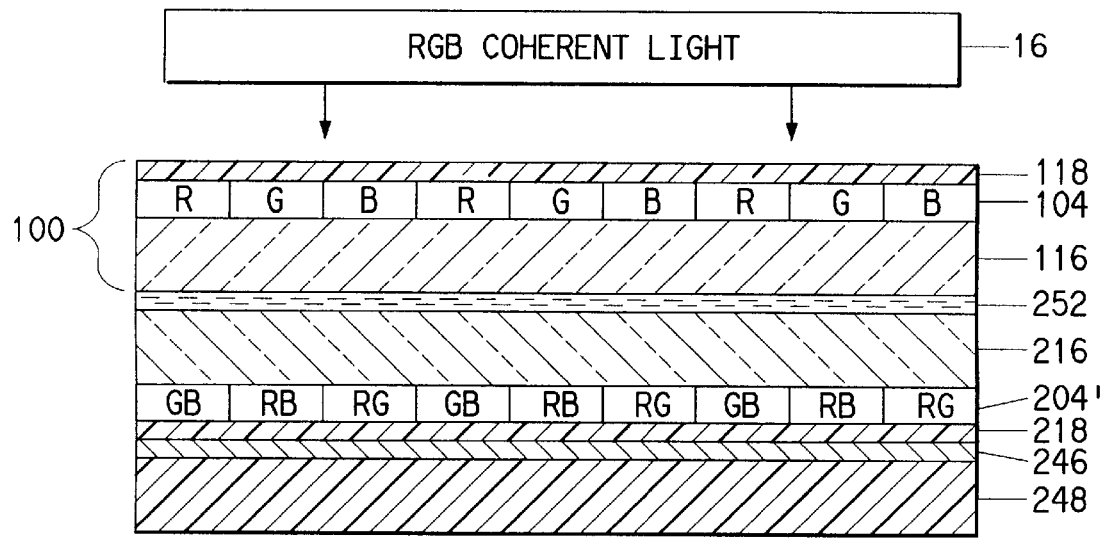
FIG. 9a illustrates holographically imaging a film element using the first holographic optical element to record a plurality of first, second and third holographic mirrors in the film element.

FIG. 8 illustrates a second photohardenable holographic recording film element 242 which can be used in making the second photohardened holographic recording film element 200. The second photohardenable holographic recording film element 242 is the same as or similar to the first photohardenable holographic recording film element 142 and comprises a second cover sheet 244, a second photohardenable holographic recording film layer 204' and the second barrier layer 218. However, the support 146 of the first photohardenable holographic recording film element 142 is replaced with a reflective layer 246 coated on a dimensionally stable support 248. The reflective layer 246 can be aluminum or any other reflective material A first method for making the second volume holographic optical element 200 will now be described starting with the second holographic recording film element 242 and using the first photohardened holographic optical element 100. First, the cover sheet 244 is removed from a first surface of the unimaged holographic film layer 204'. The first surface of the film layer 204' is laminated on a dimensionally stable substrate 216. The dimensionally stable substrate 116 of the first photohardened holographic optical element 100 is coupled through an index matching fluid layer 252 to the dimensionally stable substrate 216. This results in a laminate structure which is depicted in FIG. 9a.

Next, a light source 16 is selected adapted to emit coherent or substantially coherent light comprising the first color (e.g., Red) wavelength band, the second color (e.g., Green) wavelength band and the third color (e.g., Blue) wavelength band. Light from the light source 16 is directed, in turn, through the first photohardened holographic recording film element 100, the dimensionally stable substrate 216, and the unimaged second film layer 204' onto the reflective layer 246. The reflective layer 246 reflects the light back through the second film layer 204' such that the reflected light interferes with the light passing through the second film layer 204' towards the reflective layer 246. This interference holographically images the second film layer 204' forming it into the second imaged holographic recording film layer 204. This is the sole holographic imaging step in this method.

Figure 9B:
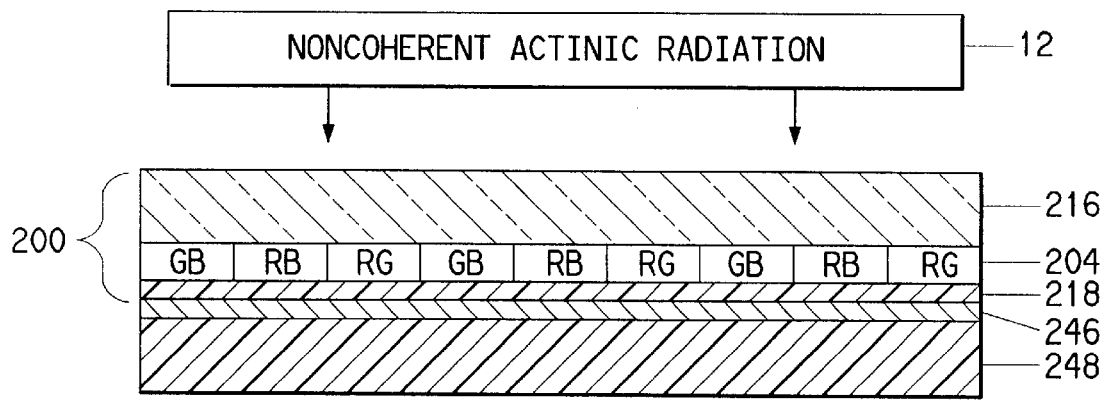

Then the second holographic recording film element 200 can be optionally cured, fixed or exposed to substantially polymerize any monomer and fix the holographic mirrors in the film layer 204. This can be accomplished by removing the first photohardened holographic recording film element 100 and the index matching fluid layer 252. Then, as illustrated in FIG. 9b, noncoherent actinic radiation, such as from broad band ultraviolet light source 12, or its equivalent, is used to flood expose the second holographic recording film element 200 as described in relation to FIG. 5d.

Figure 9C:
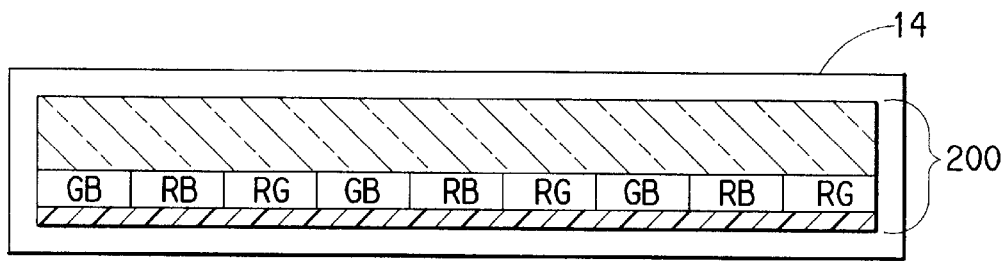
FIG. 9c illustrates heating the holographic recording film element of FIG. 9b.

The reflective layer 246 and the dimensionally stable support 248 are then removed. FIG. 9c illustrates another optional step of heating the second holographic recording film element 200 such as in the oven 14 which can be as described in relation to FIG. 5e. This results in the second volume holographic optical element 200 illustrated in FIGS. 6 and 7a where the unimaged, unexposed holographic recording film layer 204' has become the holographic recording film layer 204 holographically imaged with mirrors, optionally fixed (flood exposed) and optionally cured.

2.2 Second Method for Making the Second Element 200

Figure 10A:
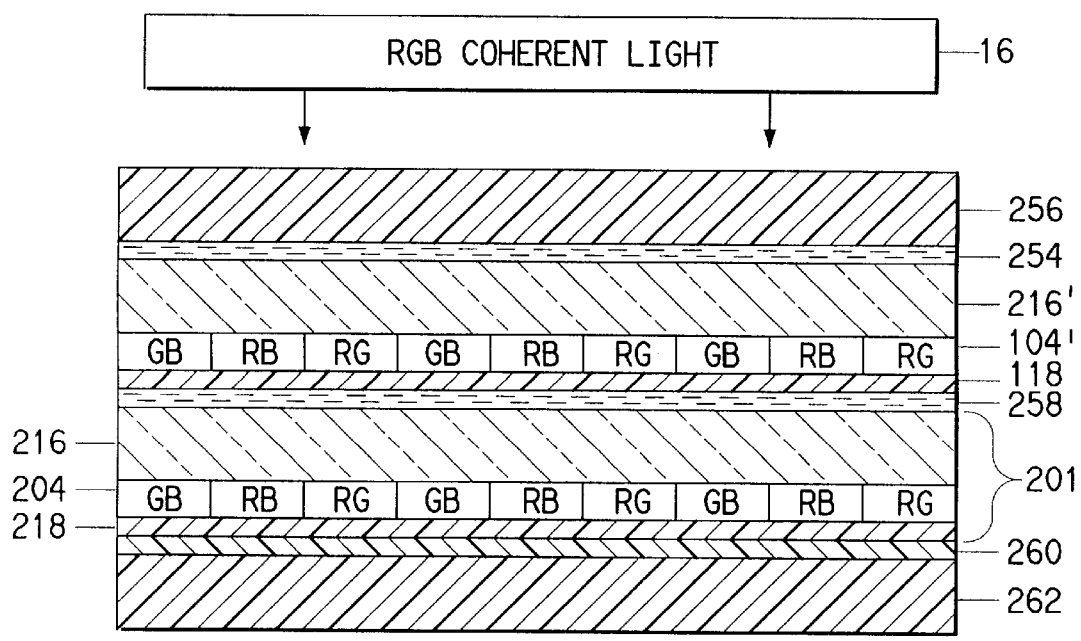
FIG. 10a illustrates holographically imaging a film element using the second holographic optical element to record a plurality of first, second and third holographic mirrors in the film element.

A second method for making the second volume holographic optical element 200 will now be described starting with the first holographic film element 142 and using a master 201 which is another one of the second holographic film elements 200. First, the cover sheet 144 is removed from the first surface 106 of the first unimaged holographic film layer 104'. The first surface 106 of the unimaged film layer 104' is laminated to a dimensionally stable substrate 216'. The dimensionally stable substrate 216' is coupled through a first index matching fluid layer 254 to an anti-reflection plate 256. The support 146 of the first holographic recording film element 142 is removed. The barrier layer 118 of the unimaged film layer 104' is coupled through a second index matching fluid layer 258 to the dimensionally stable substrate 216 of the master 201. The barrier layer 218 of the master 201 is coupled through an optical adhesive layer 260 to an antihalation layer 262. This results in a laminate structure which is depicted in FIG. 10a.

Next, RGB light from light source 16 or an equivalent is directed, in turn, through the anti-reflection layer 256, the unimaged film layer 104', onto the first, second and third mirrors in the first, second and third pixel volumes 210, 212, 214, respectively, in the film layer 204 of the master 201. The first mirrors pass the first color (e.g., Red) light which passes through the antihalation layer 262 and reflect the second color (e.g., Green) light and the third color (e.g., Blue) light back through the film layer 104' such that the reflected light interferes with the light passing through the film layer 104' towards the first mirrors in the film layer 204 in the master 201'. This interference holographically images the film layer 104' forming, copying or reproducing the first mirrors in the holographic recording film layer 104'. The second mirrors pass the second color (e.g., Green) light which passes through the antihalation layer 262 and reflect the first color (e.g., Red) light and the third color (e.g., Blue) light back through the film layer 104' such that the reflected light interferes with the light passing through the film layer 104' towards the second mirrors in the master 201. This interference holographically images the film layer 104' forming, copying or reproducing the second mirrors in the second holographic recording film layer 104'. The third mirrors pass the third color (e.g., Blue) light which passes through the antihalation layer 262 and reflect the first color (e.g., Red) light and the second color (e.g., Green) light back through the film layer 104' such that the reflected light interferes with the light passing through the film layer 104' towards the third mirrors in the master 201. This interference holographically images the film layer 104' forming, copying or reproducing the third mirrors in the second holographic recording film layer 104'. This single holographic imaging step simultaneously forms, copies or reproduces the unimaged holographic recording film layer 104' into the holographic recording film layer 204 holographically imaged with mirrors. Note that in this case barrier layer 118 is identical or substantially identical to barrier layer 218 and substrate 216' is identical or substantially identical to substrate 216.

Figure 10B:
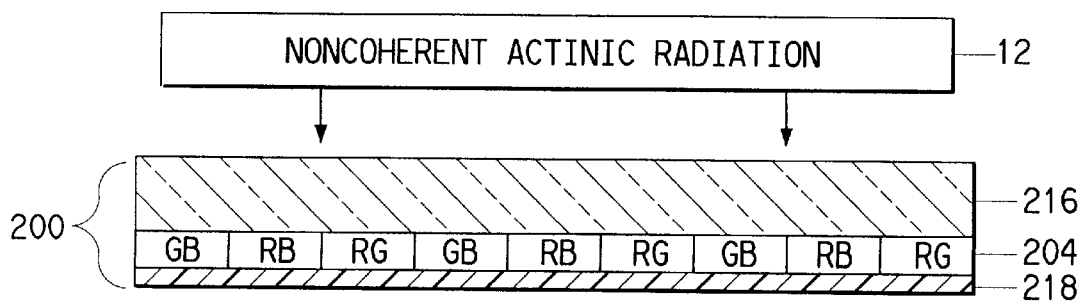

Then the second holographic recording film element 200 can be optionally cured, fixed or exposed to substantially polymerize any monomer and fix the holographic mirrors in the film element 200. This can be accomplished by removing the anti-reflection plate 256, the first index matching fluid layer 254, the second index matching fluid layer 258, the master 201, the optical adhesive 260 and the antihalation layer 262. Then, as illustrated in FIG. 10b, noncoherent actinic radiation, such as from broad band ultraviolet light source 12 or an equivalent, is used to flood expose the second holographic recording film element 200 as described in relation to FIG. 5d.

Figure 10C:
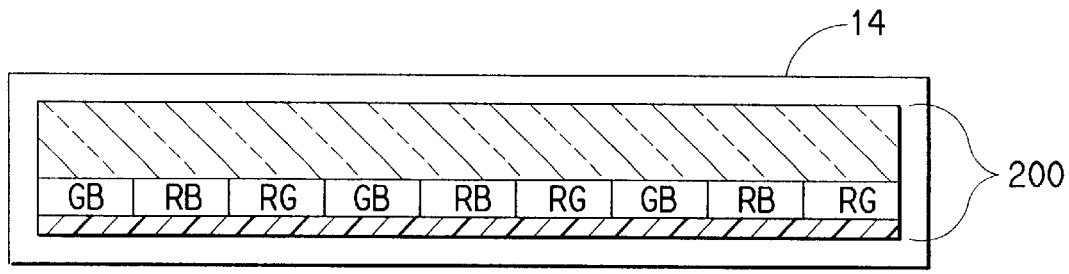
FIG. 10c illustrates heating the holographic recording film element of FIG. 10b.

FIG.10c illustrates another optional step of heating the second holographic recording film element 200 in oven 14 which can be as described in relation to FIG. 5e. This again results in the second volume holographic optical element 200 illustrated in FIGS. 6 and 7a.

3.0 Third Holographic Optical Element 300

Figure 11:
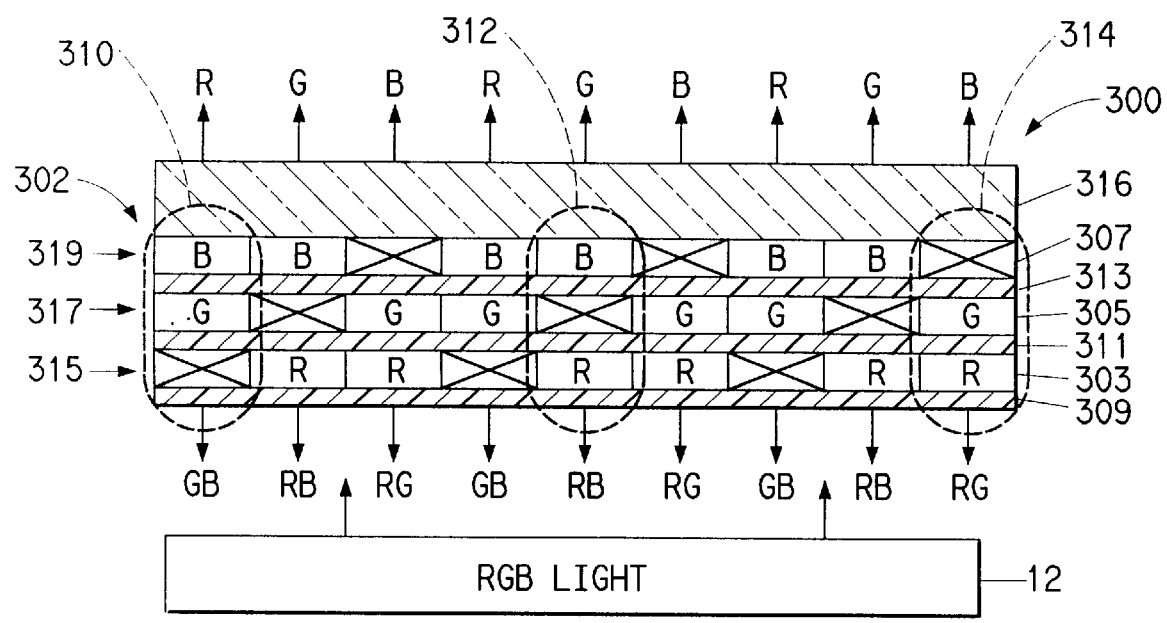
FIG. 11 illustrates a third volume holographic optical element with a holographic recording film element having a first holographic layer, a second holographic layer and a third holographic layer filtering light from a light source in accordance with the present invention.

Referring to FIG. 11, there is illustrated a third volume holographic optical element 300 in accordance with the present invention. The third volume holographic optical element 300 effectively functions the same as the second volume holographic optical element 200.

Structurally, like the second volume holographic optical element 200, the third volume holographic optical element 300 comprises a photohardened holographic recording film element 302 comprising a first plurality of pixel volumes 310, a second plurality of pixel volumes 312, and a third plurality of pixel volumes 314. Each one of the first pixel volumes 310 includes a first volume holographic mirror that passes light with the first color (e.g., Red) wavelength band and reflects light with at least the second color (e.g., Green) wavelength band and the third color (e.g., Blue). wavelength band. Each one of the second pixel volumes 312 includes a second volume holographic mirror that passes light with the second color (e.g., Green) wavelength band and reflects light with at least the first color (e.g., Red) wavelength band and the third color (e.g., Blue) wavelength band. Each one of the third pixel volumes 314 includes a third volume holographic mirror that passes light with the third color (e.g., Blue) wavelength band and reflects light with at least the first color (e.g., Red) wavelength band and the second color (e.g., Green) wavelength band.

However, in contrast to the second volume holographic recording film element 202, the third volume holographic recording film element 302 comprises a first holographic recording layer 303, a second holographic recording layer 305, and a third holographic recording layer 307. Further, referring to FIG. 11, the third volume holographic recording film element 302 preferably comprises, in order, a first barrier layer 309, the first holographic recording layer 303, a second barrier layer 311, the second holographic recording layer 305, a third barrier layer 313, and the third holographic recording layer 307. The third volume holographic optical element 302 may further comprise a dimensionally stable substrate 316 laminated to the third holographic recording layer 307. Other equivalent embodiments exist, such as an embodiment interchanging layers 315 and 319.

Referring back to FIG. 11, each one of the first pixel volumes 310, the second pixel volumes 312 and the third pixel volumes 314 comprises a first layer volume 315, a second layer volume 317 and a third layer volume 319. Each of the first volume holographic mirrors comprises a fourth volume holographic mirror and a fifth volume holographic mirror. The fourth mirrors are adapted to pass light with the first color (e.g., Red) wavelength band and the second color (e.g., Green) wavelength band and reflect light with the third color (e.g., Blue) wavelength band. The fourth mirrors are in the third layer volumes 319 of the first pixel volumes 310. The fifth volume holographic mirrors are adapted to pass light with the first color (e.g., Red) wavelength band and the third color (e.g., Blue) wavelength band and reflect light with the second color (e.g., Green) wavelength band. The fifth mirrors are in the second layer volumes 317 of the first pixel volumes 310. Each of the second volume holographic mirrors comprises one of the fourth mirrors and a sixth volume holographic mirror. The fourth mirrors are in the third layer volumes 319 of the second pixel volumes 312. The sixth volume holographic mirrors are adapted to pass light with the second color (e.g., Green) wavelength band and the third color (e.g., Blue) wavelength band and reflect light with the first color (e.g., Red) wavelength band. The sixth mirrors are in the first layer volumes 315 of the second pixel volumes 312. Each df the third volume holographic mirrors comprise one of the fifth mirrors and one of the sixth mirrors. The fifth mirrors are in the second layer volumes 317 of the third pixel volumes 314. The sixth mirrors are in the first layer volumes 315 of the third pixel volumes 314. The layer volumes with fourth mirrors are designated with an "R" since they reflect Red and pass other colors. The layer volumes with fifth mirrors are designated with a "G" since they reflect Green and pass other colors. The layer volumes with sixth mirrors are designated with a "B" since they reflect Blue and pass other colors.

The operation or function of the third volume holographic optical element 300 is illustrated FIG. 11. Specifically, the light source 12 is illustrated providing RGB light towards the third photohardened holographic recording film element 300. Arrows show that the first pixel volumes 310 pass the first color (e.g., R) light and reflect the second and third color (e.g., GB) light back to the RGB light source 12, etc. Again, if the light source 12 also emitted other color wavelength bands, such wavelength bands would also pass through the third volume holographic optical element 300. The third volume holographic optical element 300 also functions the same regardless of which side of the third volume holographic optical element 300 the light source 12 is positioned.

3.1 First Method for Making the Third Element 300

Figure 12:
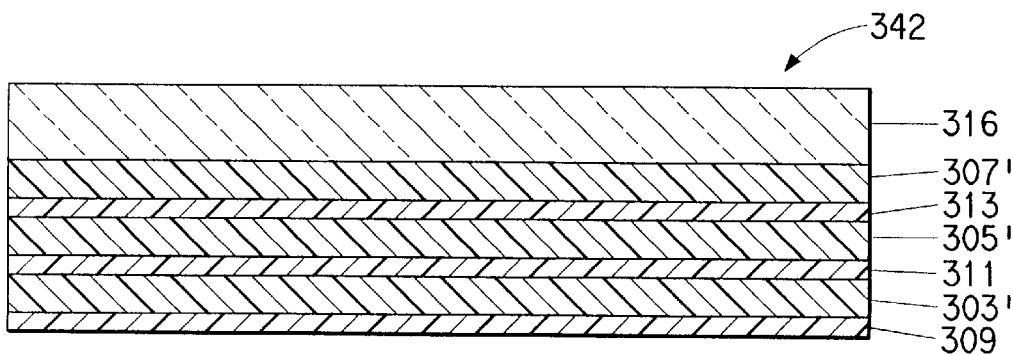
FIG. 12 illustrates a third photohardenable holographic recording film element.

FIG. 12 illustrates a third photohardenable holographic recording film element 342 which can be used in making the third photohardened holographic optical element 300. The third photohardenable holographic recording film element 342 comprises, in order, the first barrier layer 309, a first unimaged holographic recording layer 303', the second barrier layer 311, a second unimaged holographic recording layer 305', the third barrier layer 313, a third unimaged holographic recording layer 307' and the dimensionally stable substrate 316. Each of the first, second and third holographic recording layers 303', 305', 307' are fully sensitized.

When the third photohardenable holographic recording film element 342 is substituted for the unimaged holographic recording film layer 204', and the dimensionally stable substrate 216 and the barrier layer 218 laminated on the sides of the film layer 204', in the method described in relation to FIGS. 9a–c, the third volume holographic optical element 300 is formed as illustrated in FIG. 11 (rather than the second volume holographic optical element 200 being formed as illustrated in FIGS. 6 and 7a). This is a first method for making the third volume holographic optical element 300.

3.2 Second Method for Making the Third Element 300

Furthermore, when the third photohardenable holographic recording film element 342 is substituted for the first photohardenable holographic recording film layer 104', the barrier layer 118 and the substrate 216 in the method described in relation to FIGS 10a–c, the third volume holographic optical element 300 is formed as illustrated in FIG. 11 (rather than the second volume holographic optical element 200 being formed as illustrated in FIGS. 6 and 7a). This is a second method for making the third volume holographic optical element 300.

4.0 Fourth Holographic Optical Element 400

A fourth volume holographic optical element 400 is structurally and functionally the same as the third volume holographic optical element 300, except the fourth volume holographic optical element 400 is made of holographic recording layers that are wavelength selective, i.e., not fully sensitized.

4.1 First Method for Making the Fourth Element 400

Figure 13A:
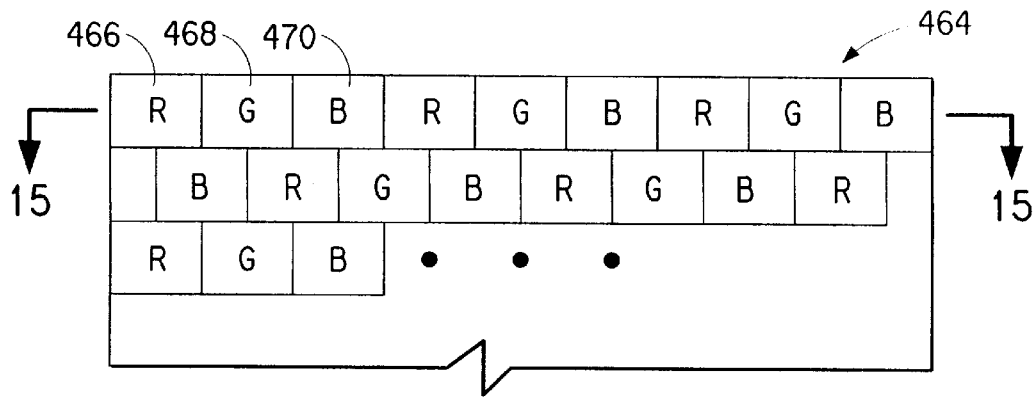
FIG. 13a shows a first filter that can be used in making the third volume holographic optical element.
Figure 13B:
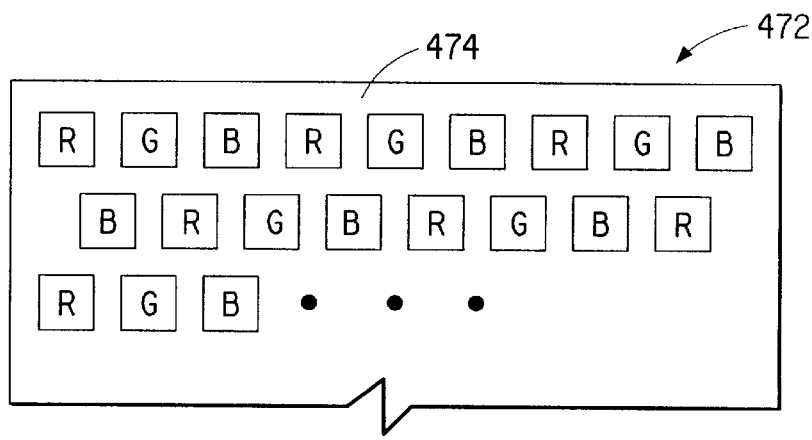
FIG. 13b shows a second filter that can be used in making the third volume holographic optical element.

FIG. 13a shows a pattern of a first photomask or filter layer 464 that can be used in a method for making the fourth volume holographic optical element 400. The pattern is a two dimensional array of pixels having a first plurality of pixels 466, a second plurality of pixels 468, and a third plurality of pixels 470. The letter "R" is in each of the first pixels 466 indicating that such pixels 466 only pass Red light. The letter "G" is in each of the second pixels 468 indicating that such pixels 468 only pass Green light. The letter "B" is in each of the third pixels 470 indicating that such pixels 470 only pass Blue light. FIG. 13b illustrates a pattern of a second photomask or filter layer 472 which is the same as the first photomask layer 464 with one exeption. The second photomask layer 472 has rows of pixels that are offset with respect to adjacent rows of pixels. Specifically, the array of pixels can have a repeating pattern of the following two rows of pixels:

|  | Column | | | | | | | | | | | | | | | | |
| --- | --- | --- | --- | --- | --- | --- | --- | --- | --- | --- | --- | --- | --- | --- | --- | --- | --- |
|  | 1 | A | 2 | B | 3 | C | 4 | D | 5 | E | 6 | F | 7 | G | 8 | H | 9 |
| Row 1 | R |  | G |  | B |  | R |  | G |  | B |  | R |  | G |  | B |
| Row 2 |  | B |  | R |  | G |  | B |  | R |  | G |  | B |  | R |  |

Further, in the second filter 472, each pixel is surrounded by a border 474 which should be essentially transparent to the first, second and third wavelength bands of light. This border can be produced by recording no holographic mirrors that reflect the first, second and third wavelength bands in this area. This can be accomplished by requiring the holographic imaging radiation to pass through a photomask which blocks the radiation from recording holograms in the border in forming the filter 472. One suitable filter that can be used would be to use a conventional LCD RGB filter.

Figure 14A:
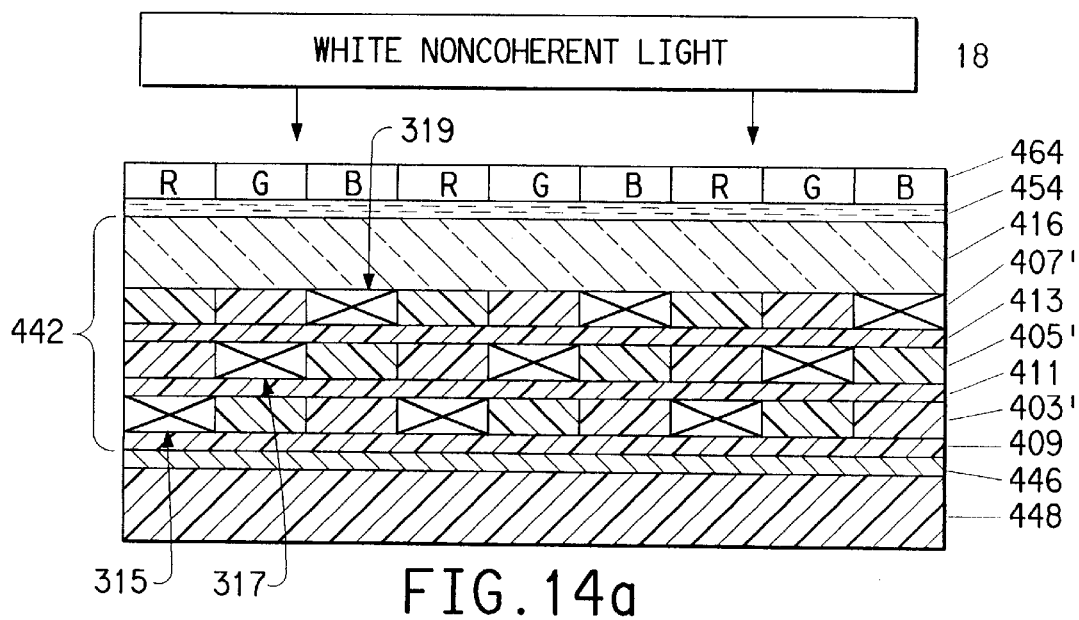
FIG. 14a illustrates imagewise exposing a film element to make selected first layer volumes, second layer volumes and third layer volumes holographically inactive
Figure 14B:
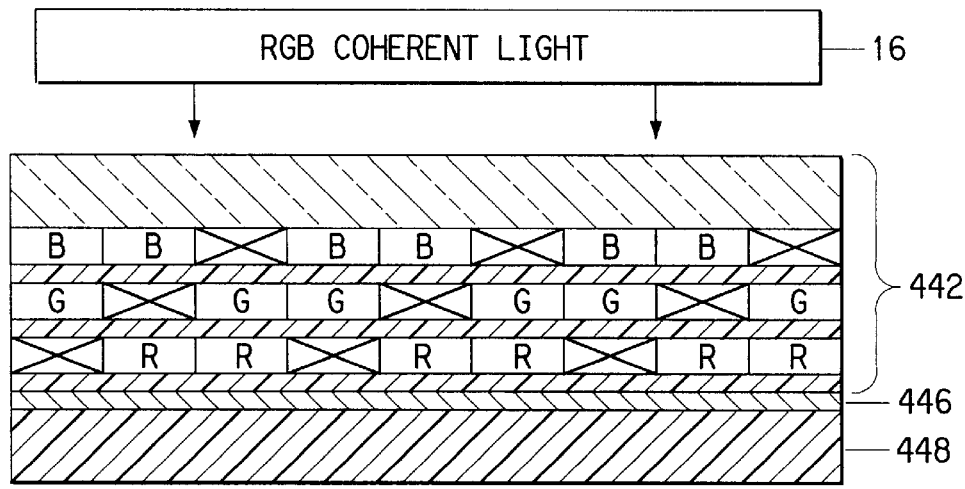
FIG. 14b illustrates holographically imaging the film element to record a plurality of first, second and third holographic mirrors in the film element.
Figure 14C:
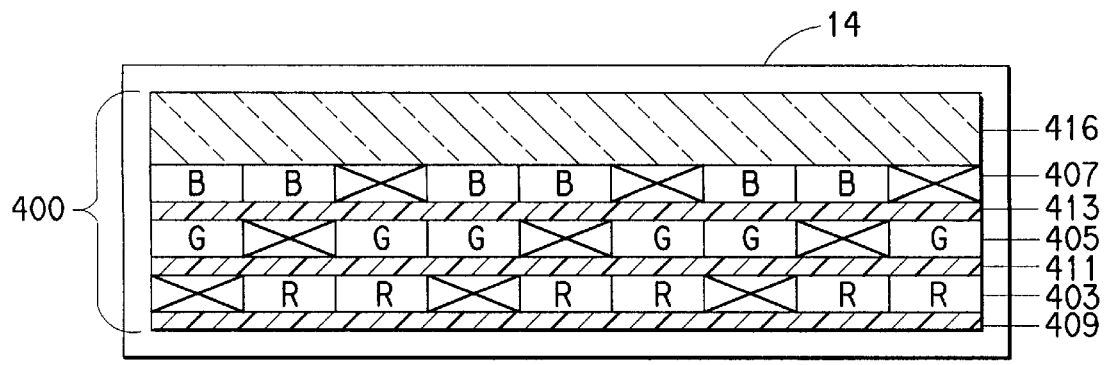
FIG. 14c illustrates heating the holographic recording film element.

Referring to FIGS. 14a–c, the method for making the fourth volume holographic optical element 400 will now be described starting with the a fourth photohardenable holographic recording film element 442. The fourth photohardenable holographic recording film element 442 is the same as the third photohardenable holographic recording film element 342 illustrated in FIG. 12, except in the fourth photohardenable holographic recording film element 442, the first unimaged holographic recording layer 403' is substantially only sensitized to be photosensitive to the first color (e.g., Red) wavelength band, the second unimaged holographic recording layer 405' is substantially only sensitized to be photosensitive to the second color (e.g., Green) wavelength band, and the third unimaged holographic recording layer 407' is substantially only sensitized to be photosensitive to the third color (e.g., Blue) wavelength band.

The first barrier layer 409 of the fourth photohardenable holographic recording film element 440 is laminated to a reflective layer 446 coated on a dimensionally stable support 448. The reflective layer can be a reflective metal, such as aluminum, or any other reflective material. The dimensionally stable substrate 416 of the fourth photohardenable holographic recording film element 442 is coupled to the filter layer 464 by an index matching fluid layer 454.

Then, as illustrated in FIG. 14a, actinic radiation is directed from source 18 through the filter layer 464, the fourth photohardenable holographic recording film element 442 onto the reflective layer 446. The reflective layer 446 reflects the light back through the fourth photohardenable holographic recording film element 442. This imagewise exposes the film element 442 to actinic radiation to polymerize monomer in selected first layer volumes 315, second layer volumes 317 and third layer volumes 319 to make the exposed volumes holographically inactive. More specifically, actinic radiation which passes through a pixel in filter layer 464 labeled "R" passes only the first color (e.g., Red) wavelength band. Only the first film layer 403' is sensitized to the first color (e.g., Red) wavelength band. Thus, the layer volumes 315 in the first film layer 403' under the filter layer pixels labeled "R" become holographically inactive. Actinic radiation which passes through a filter layer pixel labeled "G" passes only the second color (e.g., Green) wavelength band. Only the second film layer 405' is sensitized to the second color (e.g., Green) wavelength band. Thus, the layer volumes 317 in the second film layer 405' under the filter layer pixels labeled "G" become holographically inactive. Actinic radiation which passes through a filter layer pixel labeled "B" passes only the third color (e.g., Blue) wavelength band. Only the third film layer 407' is sensitized to the third color (e.g., Blue) wavelength band. Thus, the layer volumes 319 in the third film layer 407' under the filter layer pixels labeled "B" become holographically inactive.

Then the filter layer 464 and the index matching fluid layer 454 are removed. Next, as illustrated in FIG. 14b, coherent or substantially coherent light, such as from light source 16 or its equivalent, is directed, in turn, through the film element 442 onto the reflective layer 446. The reflective layer 446 reflects the light back through the film element 442 such that the reflected light interferes with the light directly from the source 16. This interference holographically images the film element 442 recording the multi-layer volume holographic optical element 400. More specifically, holographic mirrors form in non-inactive layer volumes 315 of the first layer 403' where the mirrors will reflect light having the first color (e.g., Red) wavelength band and pass all other wavelength bands. Holographic mirrors form in non-inactive layer volumes 317 of the second layer 405' where the mirrors will reflect light having the second color (e.g., Green) wavelength band and pass all other wavelength bands. Holographic mirrors form in non-inactive layer volumes 319 of the third layer 407' where the mirrors will reflect light having the third color (e.g., Blue) wavelength band and pass all other wavelength bands. This simultaneously holographically images the first layer 403', the second layer 405' and the third layer 407' into imaged layers 403, 405 and 407, respectively.

Then the reflective layer 446 and the dimensionally stable support 448 are removed. The fourth holographic recording film element 400 does not need to be cured. FIG. 14c illustrates another optional step of heating the fourth holographic recording film element 400 which can be as described in relation to FIG. 5e. This results in the fourth volume holographic optical element 400.

5.0 Fifth Holographic Optical Element 500

Figure 15:
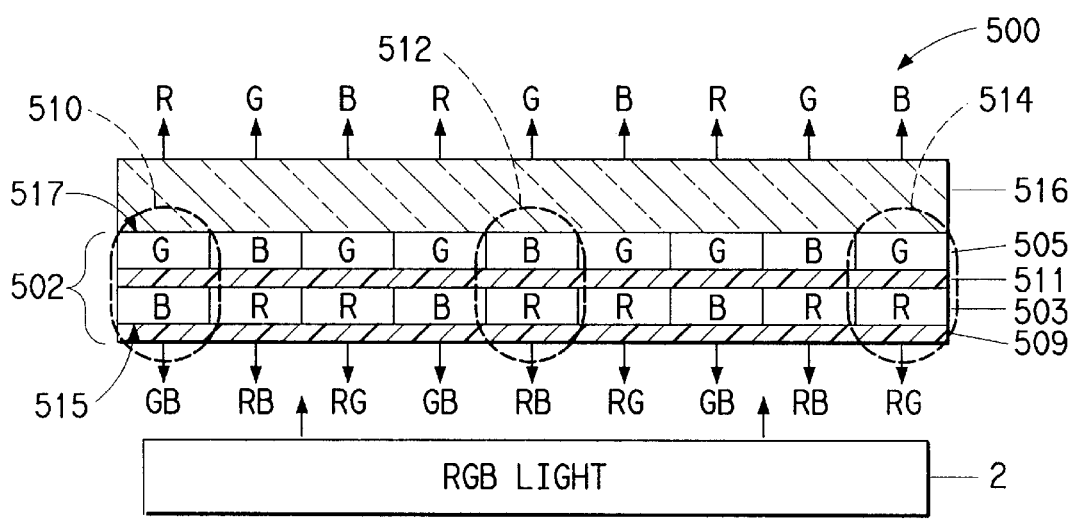
FIG. 15 illustrates a fourth volume holographic optical element with a holographic recording film element having a first holographic layer and a second holographic layer filtering a light source in accordance with the present invention.

Referring to FIG. 15, there is illustrated a fifth volume holographic optical element 500 in accordance with the present invention. The fifth volume holographic optical element 500 effectively functions the same as the second volume holographic optical element 200.

Structurally, like the second volume holographic optical element 200, the fifth volume holographic optical element 500 comprises a photohardened holographic recording film element 502 comprising a first plurality of pixel volumes 510, a second plurality of pixel volumes 512, and a third plurality of pixel volumes 514. Each one of the first pixel volumes 510 includes a first volume holographic mirror that passes light with the first color (e.g., Red) wavelength band and reflects light with at least the second color (e.g., Green) wavelength band and the third color (e.g., Blue) wavelength band. Each one of the second pixel volumes 512 includes a second volume holographic mirror that passes light with the second color (e.g., Green) wavelength band and reflects light with at least the first color (e.g., Red) wavelength band and the third color (e.g., Blue) wavelength band. Each one of the third pixel volumes 514 includes a third volume holographic mirror that passes light with the third color (e.g., Blue) wavelength band and reflects light with at least the first color (e.g., Red) wavelength band and the second color (e.g., Green) wavelength band.

In contrast to the second volume holographic recording film element 202, the fifth volume holographic recording element 502 has a first holographic recording layer 503 and a second holographic recording layer 505. Further, the fifth volume holographic recording film element 502 preferably comprises, in order, a first barrier layer 509, the first holographic recording layer 503, a second barrier layer 511, and the second holographic recording layer 505. The fifth volume holographic optical element 502 may further comprise a dimensionally stable substrate 516 laminated to the second holographic recording layer 505.

Each one of the first pixel volumes 510, the second pixel volumes 512 and the third pixel volumes 514 comprises a first layer volume 515 and a second layer volume 517. Each of the first volume holographic mirrors comprises a fourth volume holographic mirror and a fifth volume holographic mirror. The fourth mirrors are adapted to pass light with the first color (e.g., Red) wavelength band and the second color (e.g., Green) wavelength band and reflect light with the third color (e.g., Blue) wavelength band. The fourth mirrors are in the first layer volumes 515 of the first pixel volumes 510. The fifth volume holographic mirrors are adapted to pass light with the first color (e.g., Red) wavelength band and the third color (e.g., Blue) wavelength band and reflect light with the second color (e.g., Green) wavelength band. The fifth mirrors are in the second layer volumes 517 of the first pixel volumes 510. Each of the second volume holographic mirrors comprises one of the fourth mirrors and a sixth volume holographic mirror. The fourth mirrors are in the second layer volumes 517 of the second pixel volumes 512. The sixth volume holographic mirrors are adapted to pass light with the second color (e.g., Green) wavelength band and the third color (e.g., Blue) wavelength band and reflect light with the first color (e.g., Red) wavelength band. The sixth mirrors are in the first layer volumes 515 of the second pixel volumes 512. Each of the third volume holographic mirrors comprise one of the fifth mirrors and one of the sixth mirrors. The fifth mirrors are in the second layer volumes 517 of the third pixel volumes 514. The sixth mirrors are in the first layer volumes 515 of the third pixel volumes 514. The layer volumes with fourth mirrors are designated with an "R" since they reflect Red and pass other colors. The layer volumes with fifth mirrors are designated with a "G" since they reflect Green and pass other colors. The layer volumes with sixth mirrors are designated with a "B" since they reflect Blue and pass other colors.

The operation or function of the fifth volume holographic optical element 500 is illustrated FIG. 15. Specifically, the light source 2 is illustrated providing RGB light towards the fifth photohardened holographic recording film element 500. Arrows show that the first pixel volumes 510 pass the first color (e.g., R) light and reflect the second and third color (e.g., GB) light back to the RGB light source 2, etc. Again, if the light source 2 also emitted other color wavelength bands, such wavelength bands would also pass through the third volume holographic optical element 500. The fifth volume holographic optical element 500 also functions the same regardless of which side of the third volume holographic optical element 500 the light source 2 is positioned.

5.1 First Method for Making the Fifth Element 500

Figure 16:
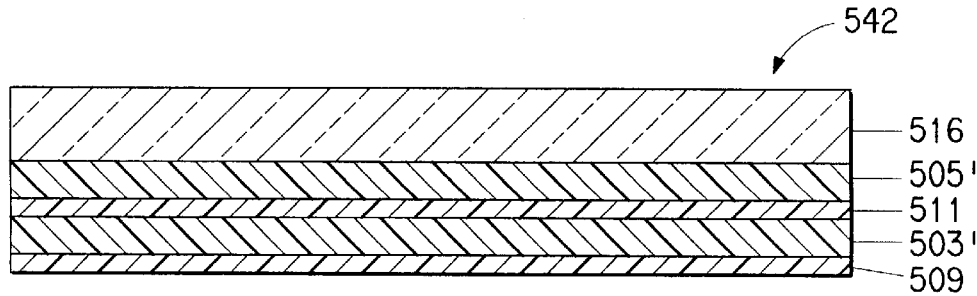
FIG. 16 illustrates a fourth photohardenable holographic recording film element.

FIG. 16 illustrates a fifth photohardenable holographic recording film element 542 which can be used in making the fifth photohardened holographic optical element 500. The fifth photohardenable holographic recording film element 542 comprises, in order, the first barrier layer 509, a first unimaged holographic recording layer 503', a second barrier layer 511, a second unimaged holographic recording layer 505' and a dimensionally stable substrate 516. The first holographic recording layer 503' is at least sensitized to the first color (e.g., Red) wavelength band and the third color (e.g., Blue) wavelength band. The first holographic recording layer 503' is either not sensitized to the second color (e.g., Green) wavelength band or sensitized much less to the second color (e.g., Green) wavelength band than it is sensitized to the first color (e.g., Red) wavelength band and the third color (e.g., Blue) wavelength band. The second holographic recording layer 505' is at least sensitized to the second color (erg., Green) wavelength band and the third color (e.g., Blue) wavelength band. The second holographic recording layer 505' is either not sensitized to the first color (e.g., Red) wavelength band or sensitized much less to the first color (e.g., Red) wavelength band than it is sensitized to the second color (e.g., Green) wavelength band and the third color (e.g., Blue) wavelength band.

When the fifth photohardenable holographic recording film element 542 is substituted for the unimaged holographic recording film layer 204', and the dimensionally stable substrate 216 and the barrier layer 218 laminated on the sides of the film layer 204', in the method described in relation to FIGS. 9a–c, the fifth volume holographic optical element is formed as illustrated in FIG. 15 (rather than the second volume holographic optical element being formed as illustrated in FIGS. 6 and 7a). This is a first method for making the fifth volume holographic optical element 500.

5.2 Second Method for Making the Fifth Element 500

Furthermore, when the fifth photohardenable holographic recording film element 542 is substituted for the first photohardenable holographic recording film layer 104', the substrate 216 and the barrier layer 118 in the method described in relation to FIGS. 10a–c, the fifth volume holographic optical element is formed as illustrated in FIG. 15 (rather than the second volume holographic optical element 200 being formed as illustrated in FIGS. 6 and 7a) This is a second method for making the fifth volume holographic optical element.

6.0 Sixth Holographic Optical Element 600

A sixth volume holographic optical element 600 is structurally and functionally the same as the fifth volume holographic optical element 500, except the sixth volume holographic optical element 600 is made of holographic recording layers that are fully sensitized.

6.1 Method for Making the Sixth Element 600

Figure 17A:
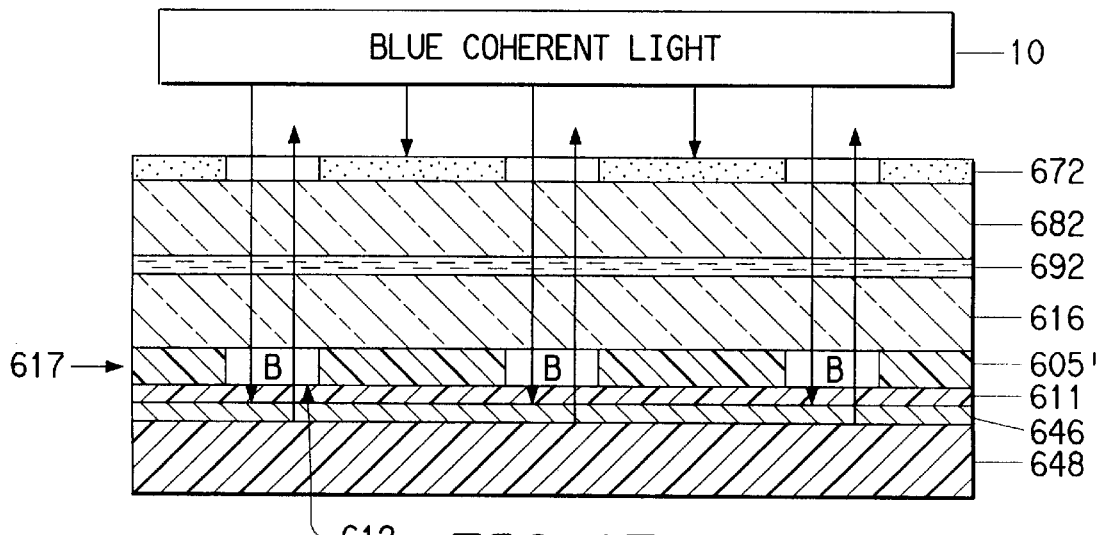
FIG. 17a illustrates holographically imaging the first holographic layer to record third holographic mirrors in the first holographic layer.

A method for making the sixth volume holographic optical element 600 will now be described starting with a photohardenable holographic recording film element which is identical to the second photohardenable holographic recording film element 242, except its layers will be identified by 600 numbers, rather than 200 numbers, and its film layer will be designed by the number 605'. First, the cover sheet 644 is removed from the first surface of the unimaged holographic film layer 605'. The first surface of the film layer 605' is laminated on a dimensionally stable substrate 616. The dimensionally stable substrate 616 is coupled through an index matching fluid layer 692 to the dimensionally stable substrate 682 which is coated with a first photomask layer 672. This results in a laminate structure which is depicted in FIG. 17a.

Next, the third color coherent or substantially coherent light from light source 10 or its equivalent is directed, in turn, through the first photomask layer 672, and the second photohardened holographic recording film layer 605' onto the reflective layer 646. The reflective layer 646 reflects the light back through the film layer 605' such that the reflected light interferes with the light passing through the film layer 605' towards the reflective layer 246. This interference holographically images or imagewise holographically exposes the film layer 605' with the Blue light which records the fourth volume holographic mirrors in the second layer volumes 617 of the second pixel volumes 610.

Figure 17B:
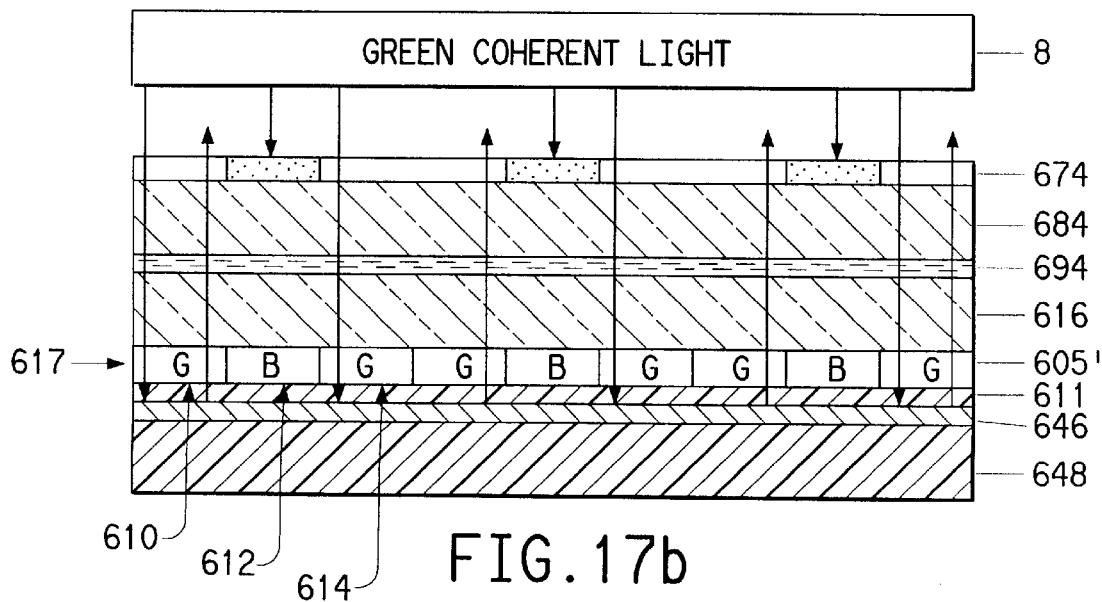
FIG. 17b illustrates holographically imaging the first holographic layer to record second holographic mirrors in the first holographic layer.

Referring to FIG. 17b, a second photomask layer 674 coated on a dimensionally stable substrate 684 is substituted for the first photomask layer 672 coated on the dimensionally stable substrate 682. The substrate 684 is coupled to the substrate 616 through an index matching fluid layer 694. Then, the second color coherent or substantially coherent light, such as from the light source 8, is directed, in turn, through the second photomask layer 674, the film layer 605' onto the reflective layer 246. The reflective metal layer 246 reflects the light back through the film layer 605' such that the reflected light interferes with the light passing through the film layer 605' towards the reflective layer 246. This interference holographically images or imagewise holographically exposes the film layer 605' with the Green light to record the fifth volume holographic mirrors in the second layer volumes 617 of the first pixel volumes 610 and the third pixel volumes 614. This completes the conversion of the unimaged film layer 605' to the imaged film layer 605.

Figure 17C:
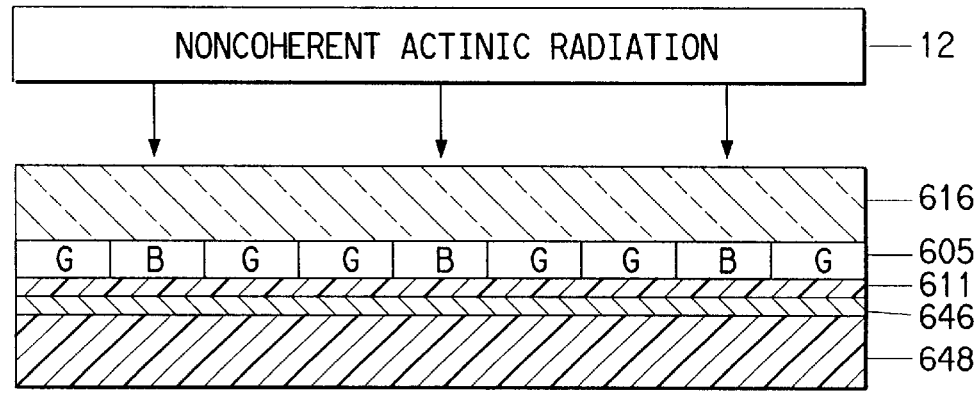
FIG. 17c illustrates curing the first holographic layer.

Then the second photomask layer 674, its dimensionally stable substrate 684 and the index matching fluid layer 694 can be removed. The resulting laminate can be optionally cured or fixed to substantially polymerize any monomer and fix the holographic mirrors in the laminate. As illustrated in FIG. 17c, noncoherent actinic radiation, such as from source 12, is used to flood expose the laminate as described in relation to FIG. 5d.

Figure 17D:
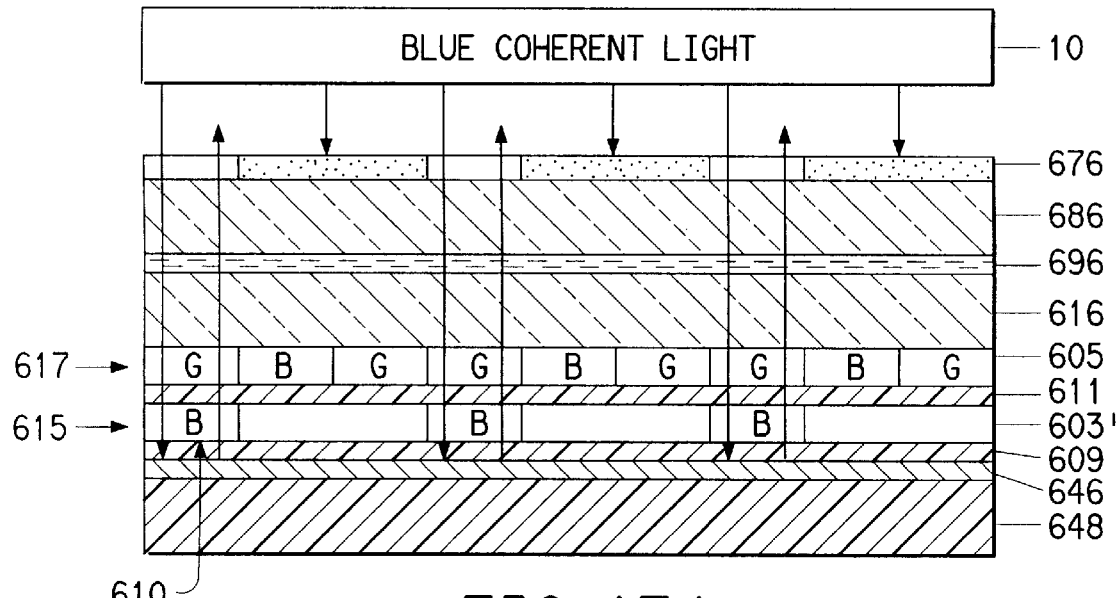
FIG. 17d illustrates holographically imaging the second holographic layer to record third holographic mirrors in the second holographic layer.

Referring to FIG. 17d, a third photomask layer 676 coated on a dimensionally stable substrate 686 is coupled to the dimensionally stable substrate 616 with an index matching fluid 696. Further, an unimaged fully sensitized holographic recording film layer 603' and a first barrier layer 609 are located between the second barrier layer 611 and the reflective metal layer 246. Then, the third color coherent or substantially coherent light, such as from the light source 10, is directed, in turn, through the third photomask layer 676, the film layer 605, and the unimaged film layer 603' onto the reflective layer 246. The reflective layer 246 reflects the light back through the film layer 603' such that the reflected light interferes with the light passing through the film layer 6031 towards the reflective layer 246. This interference holographically images or imagewise holographically exposes the film layer 603' with the third color (e.g., Blue) light to record the fourth volume holographic mirrors in the first layer volumes 615 of the first pixel volumes 610.

Figure 17E:
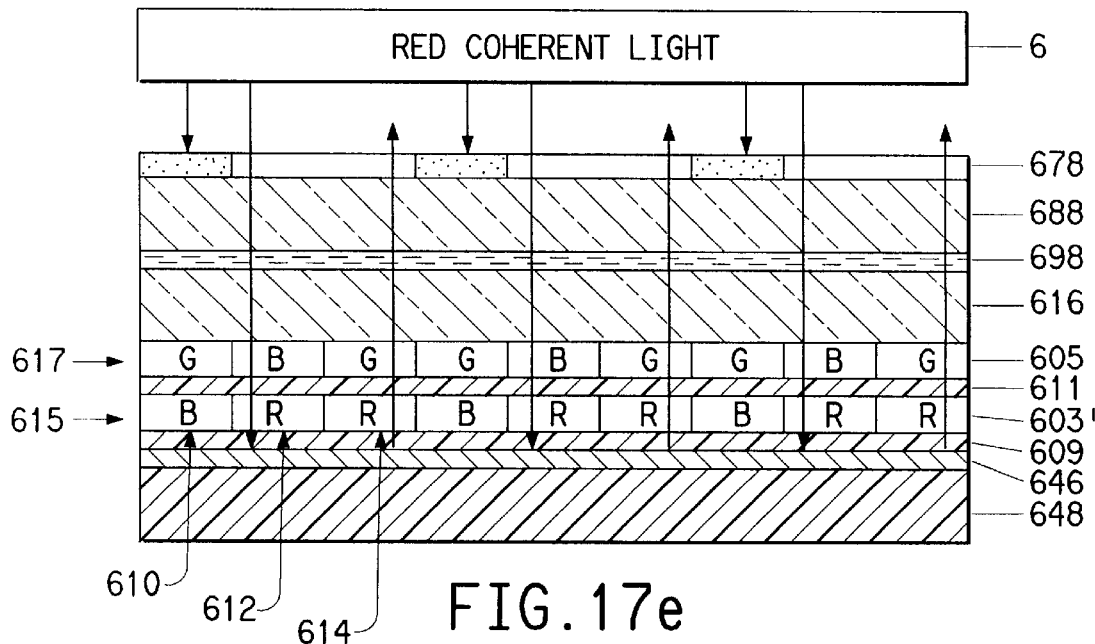
FIG. 17e illustrates holographically imaging the second holographic layer to record first holographic mirrors in the second holographic layer.

Referring to FIG. 17e, a fourth photomask layer 678 coated on a dimensionally stable substrate 688 is coupled to the dimensionally stable substrate 616 with the index matching fluid 698. Then, the first color light, such as from the light source 6, is directed, in turn, through the fourth photomask layer 678, the film layer 605, and the first film layer 603' onto the reflective layer 246. The reflective layer 246 reflects the light back through the first film layer 603' such that the reflected light interferes with the light passing through the first film layer 603' towards the reflective layer 246. This interference holographically images or imagewise holographically exposes the first film layer 603' with the first color (e.g., Red) light to record the sixth volume holographic mirrors in the first layer volumes 615 of the second pixel volumes 612 and the third pixel volumes 614. This completes the conversion of the unimaged film layer 603' to the imaged film layer 603.

Figure 17F:
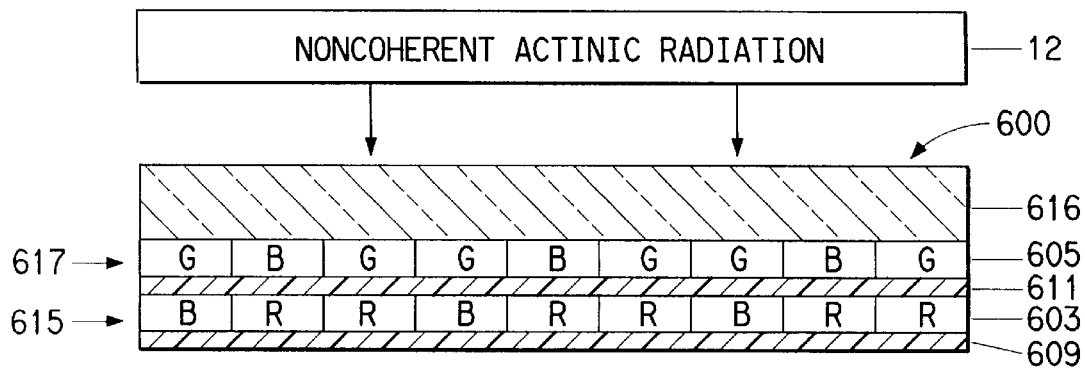
FIG. 17f illustrates curing the fourth volume holographic optical element.

Then the fourth photomask layer 678, its dimensionally stable substrate 688 and the index matching fluid layer 698 can be removed. The resulting laminate can be optionally cured or fixed to substantially polymerize any monomer and fix the holographic mirrors in the laminate. As illustrated in FIG. 17f, noncoherent actinic radiation, such as from the light source 12, is used to flood expose the laminate as described in relation to FIG. 5d.

Figure 17G:
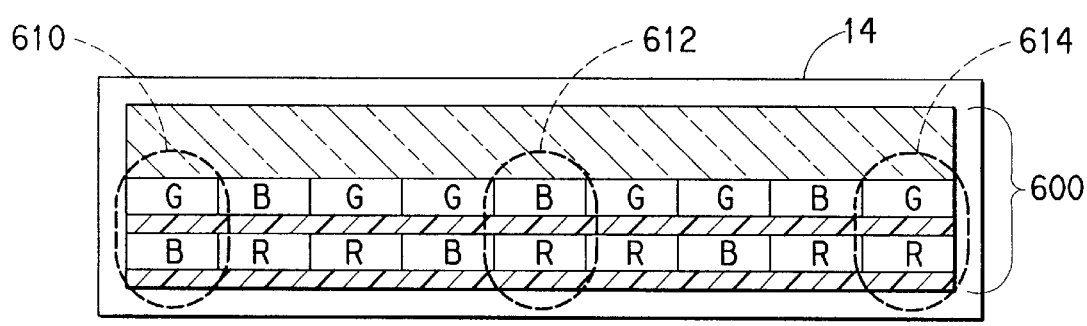
FIG. 17g illustrates heating the fourth volume holographic optical element.

FIG. 17g illustrates another optional step of heating the laminate which can be as described in relation to FIG. 5e. This results in the sixth volume holographic optical element 600.

7.0 Seventh Holographic Optical Element 700

Figure 18:
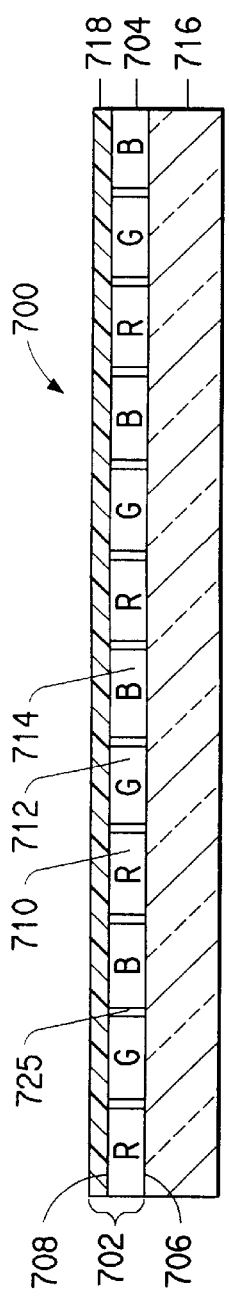
FIG. 18 illustrates a seventh photohardenable holographic recording film element, comprising a substantially transparent mask surrounding each pixel.
Figure 19:
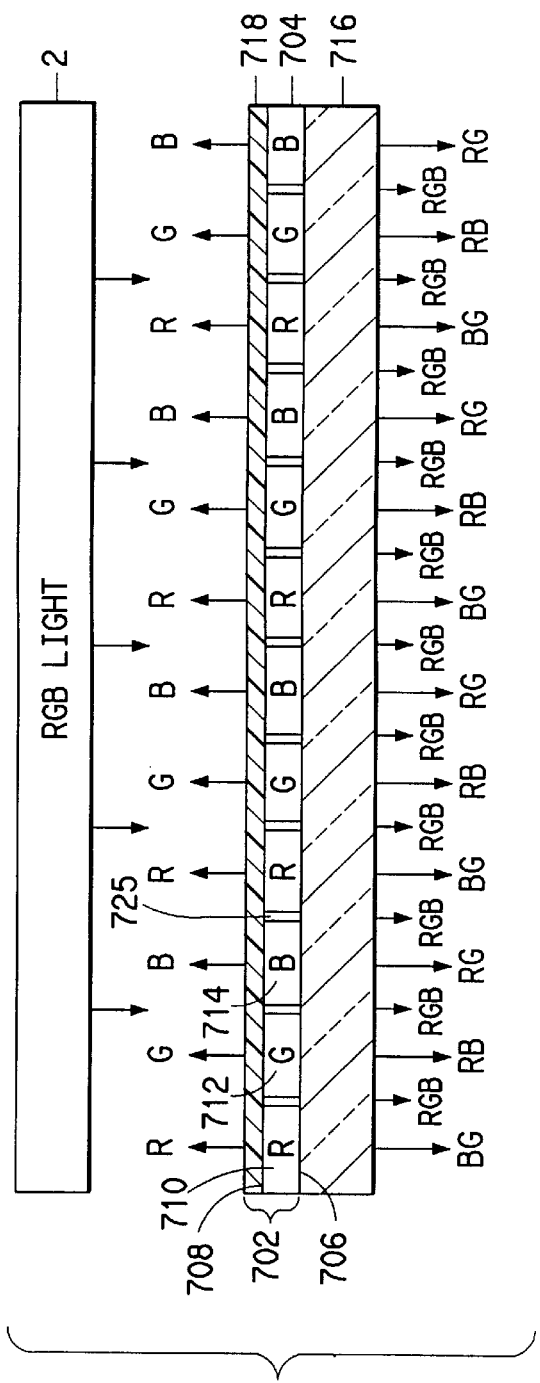
FIG. 19 illustrates the seventh volume holographic optical element filtering light from a light source in accordance with the present invention.

Referring to FIG. 18, there is illustrated a seventh volume holographic optical element 700 in accordance with the present invention. The seventh volume holographic optical element 700 comprises a photohardened holographic recording film element 702. In this embodiment, the photohardened holographic recording film element 702 comprises a single holographic recording film layer 704 having a first surface 706 and a second surface 708. The holographic recording film layer 704 comprises a first plurality of pixel volumes 710, a second plurality of pixel volumes 712, a third plurality of pixel volumes 714, and a fourth plurality of mask volumes 725. As best seen in FIG. 19, the mask volumes are substantially optically transparent to the first, second and third color wavelength bands.

Each one of the first pixel volumes 710 includes a first volume holographic mirror that reflects light with a first color (e.g., Red) wavelength band and passes light with at least a second color (e.g., Green) wavelength band and a third color (e.g., Blue) wavelength band. Each one of the second pixel volumes 712 includes a second volume holographic mirror that reflects light with the second color (e.g., Green) wavelength band and passes light with at least the first color (e.g., Red) wavelength band and the third color (e.g., Blue) wavelength band. Each one of the third pixel volumes 714 includes a third volume holographic mirror that reflects light with the third color (e.g., Blue) wavelength band and passes light with at least the first color (e.g., Red) wavelength band and the second color (e.g., Green) wavelength band.

The operation or function of the volume holographic optical element 700 is illustrated FIG. 19. Specifically, a light source 2 is illustrated providing light towards the first photohardened holographic recording film element 700. The light source 2 can emit the first color (e.g., Red) wavelength band, the second color (e.g., Green) wavelength band and/or the third color (e.g., Blue) wavelength band. The light source 2 can emit coherent, substantially coherent or noncoherent light. The letters in FIG. 19 designating the color wavelength bands and the associated arrows illustrate whether the element 700 will pass or reflect the specific color wavelength band assuming that the light source 2 emits actinic radiation in such color wavelength band. Preferably, if the light source 2 also emits other color wavelength bands, such wavelength bands would also pass through the first volume holographic optical element 700. The volume holographic optical element 700 functions the same regardless of which side of the volume holographic optical element 700 the light source 2 is positioned.

The first color wavelength band, the second color wavelength band and the third color wavelength band can be any distinct wavelength bands of light, as discussed in conjunction with first element 100.

The first pixel volumes 710, the second pixel volumes 712 and the third pixel volumes 714 can be any shape and in any order in the film layer 704. The volumes 710, 712, 714 do have sides which are part of the first and second surfaces 706, 708 of the film layer 704. FIG. 18 depicts one row of a two dimensional array of the volumes 710, 712, 714. Preferably, the pixels volumes 710, 712, 714 are ordered in each row of the array in a repeating sequence of one of the first pixel volumes 710, a mask volume 725, then one of the second pixel volumes 712, a mask volume 725, and then one of the third pixel volumes 714. The pixel volumes 710, 712, 714 in adjacent rows are separated by a mask volume 725 and the pixel volumes 710, 712, 714 can be offset with respect to one another.

The holographic optical element 700 further optionally comprises a dimensionally stable substrate 716 having a planar surface supporting the first surface 706 of the film layer 704. The first holographic recording film element 702 may further comprise a barrier layer 718 on the second surface 708 of the film layer 704. A light absorbing, or antihalation, layer 762 is laminated to the barrier layer 718 or, in the absence of a barrier layer, affixed to the film layer 704 with an adhesive layer 760.

FIG. 20 illustrates the seventh volume holographic optical element 700 used as a multicolor reflection filter in a reflective liquid crystal display (LCD) apparatus 120. The reflective liquid crystal display apparatus comprises, in order, a first light polarizer 122, a top or first dimensionally stable support 124, a liquid crystal display element 126, a second light polarizer 128, and the holographic multicolor reflection filter 700. The first light polarizer 122 is for linearly polarizing and passing light, such as ambient light, having a first linear polarization. The top dimensionally stable substrate 124 provides rigidity and overall structural support. The liquid crystal display element 126 is well known by those skilled in the art and is previously discussed in conjunction with the first volume holographic optical element 100. The liquid crystal display element 126 can comprise, in order, a first circuitry layer 130, a first alignment layer 132, a liquid crystal layer 134, a second alignment layer 136, a second circuitry layer 138, and a leveling layer 140. The circuitry layer 130 provides a first side of an electrical drive circuit capable of modifying a particular first side orientation of liquid crystals in the liquid crystal layer 134 through the first alignment layer 132. The liquid crystal layer 134 confines liquid crystals in cells corresponding to each pixel volume in the reflective filter 700. The second alignment layer 136 introduces a particular second side orientation to the liquid crystals in the liquid crystal layer 134. The second circuitry layer 138 provides a second side of the electrical drive circuit capable of modifying the particular second side orientation of liquid crystals in the liquid crystal layer 134 through the second alignment layer 136. The leveling layer 140 provides a rigid planar surface for the filter 700. The second light polarizer is for passing light from the liquid crystal display element 126 having the second polarization.

In operation, when the liquid crystal display element 126 modifies or rotates the polarization of the light passing through the first set of cells X to the second polarization, the light passes through the second polarizer 128 into the first pixel volumes 710 in which the first volume holographic mirrors reflect light with the first color (e.g., Red) wavelength band back through the liquid crystal display element 126 to a viewer on the same side of the LCD apparatus that ambient light 4 enters the first polarizer 122. When the liquid crystal display element 126 modifies or rotates the polarization of the light passing through the second set of cells Y to the second polarization, the light passes through the second polarizer 128 into the second pixel volumes 712 in which the second volume holographic mirrors reflect light with the second color (e.g., Green) wavelength band back through the liquid crystal display element 126 to the viewer. When the liquid crystal display element 126 modifies or rotates the polarization of the light passing through the third set of cells Z to the second polarization, the light passes through the second polarizer 128 into the third pixel volumes 714 in which the third volume holographic mirrors reflect light with the third color (e.g., Blue) wavelength band back through the liquid crystal display element 126 to the viewer. Light which passes through the mask volumes 725 (i.e., between the pixel volumes 710, 712, 714) passes through the filter 700 away from the viewer and is absorbed by the antihalation layer 762. Wavelengths of light passing through the pixel volumes 710, 712, 714, other than those reflected, pass through the filter 700 away from the viewer and are absorbed by the antihalation layer 762. Further, light which passes through the liquid crystal display element 126 towards the second polarizer 128, but was not changed by the liquid crystal display element 126 to have the second polarization, is absorbed by the second polarizer 128.

7.1 Method for Making Seventh Element 700

FIG. 3 depicts a first holographic recording film element 142 which can be used in making the seventh photohardened holographic recording film element 700 in a manner similar to that described in conjunction with first element 100.

Figure 21B:
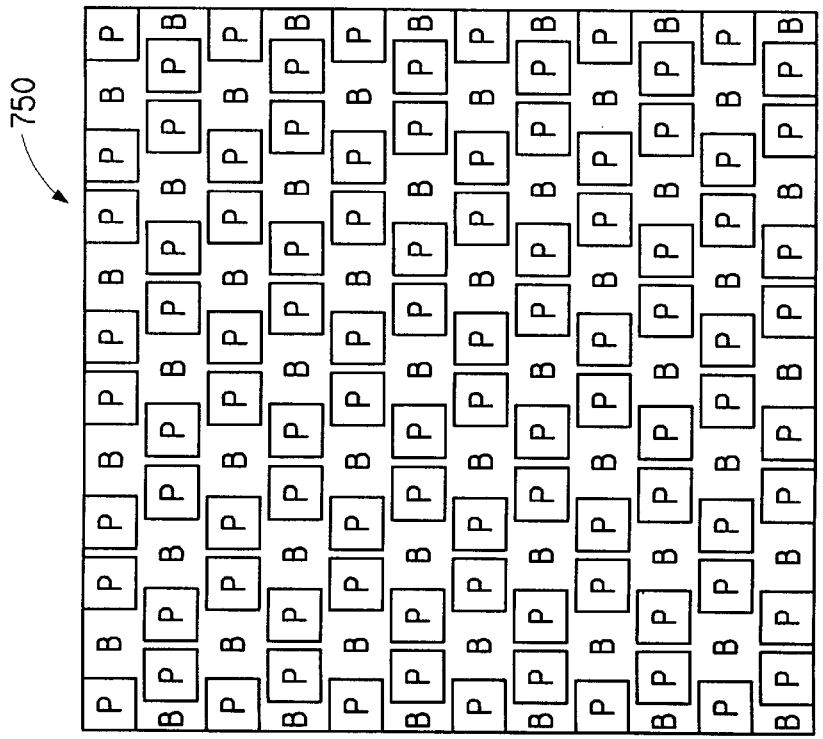
FIG. 21b shows a second photomask that can be used in making the seventh volume holographic optical element.
Figure 21A:
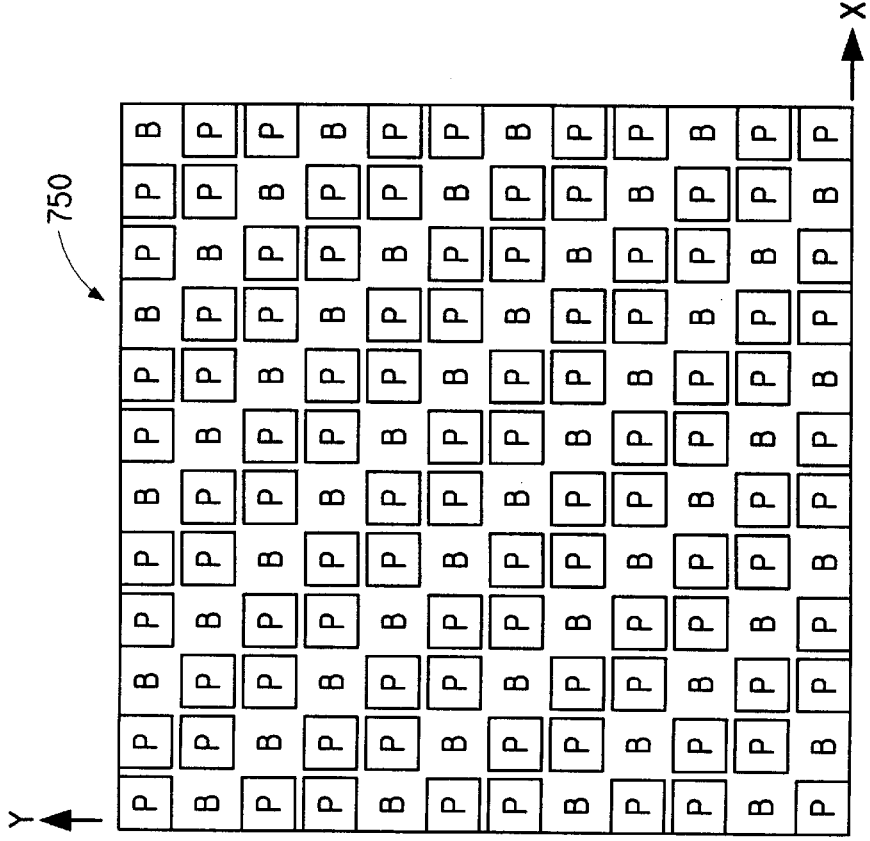
FIG. 21a shows a first photomask that can be used in making the seventh volume holographic optical element.

The method for making seventh element 700 is the same as the method of making first element 100 differing only in that a different pattern for the photomask is employed. A photomask layer 750 having a pattern shown in FIG. 21a or FIG. 21b is used for making seventh element 700. The pattern is a two dimensional array of pixels having a first plurality of pixels B adapted to block light, and a second plurality of pixels P adapted to transmit or pass light. As shown in FIGS. 21a and 21b, the array of pixels can have a repeating pattern of the following three rows of pixels:

|     |   | Column |   |   |   |   |   |   |   |   |    |    |     |
|-----|---|--------|---|---|---|---|---|---|---|---|----|----|-----|
|     |   | 1      | 2 | 3 | 4 | 5 | 6 | 7 | 8 | 9 | 10 | 11 | ... |
| Row | 1 | B      | B | P | B | B | P | B | B | P | B  | B  | ... |
|     | 2 | P      | B | B | P | B | B | P | B | B | P  | B  | ... |
|     | 3 | B      | P | B | B | P | B | B | P | B | B  | P  | ... |

This results in the seventh volume holographic optical element 700 illustrated in FIGS. 18 and 19 where the unimaged, unexposed holographic recording film layer 704' (same as 104') has become the holographic recording film layer 704 holographically imaged with mirrors, optionally fixed (flood exposed) and optionally cured.

8.0 Eighth Holographic Optical Element 800

An eighth volume holographic optical element 800, illustrated in FIG. 22, while structurally and functionally similar to the third volume holographic optical element 300 and to the fourth volume holographic optical element 400, additionally comprises a substantially opaque mask surrounding each pixel. The holographic recording film layer 804 comprises a first plurality of pixel volumes 810, a second plurality of pixel volumes 812, a third plurality of pixel volumes 814, and a fourth plurality of mask volumes 825. As best seen in FIG. 22, the mask volumes 825 reflect light having a first, a second or a third color wavelength band and thus are substantially optically opaque to the first, second and third color wavelength bands.

rows of pixels. Specifically, the array of pixels can have a repeating pattern of the following two rows of pixels:

|  |  | Column |  |  |  |  |  |  |  |  |  |  |  |  |  |  |  |
|---|---|---|---|---|---|---|---|---|---|---|---|---|---|---|---|---|---|
|  |  | 1 | A | 2 | B | 3 | C | 4 | D | 5 | E | 6 | F | 7 | G | 8 | H | 9 |
| Row | 1 | R |  | G |  | B |  | R |  | G |  | B |  | R |  | G |  | B |
| Row | 2 |  | B |  | R |  | G |  | B |  | R |  | G |  | B |  | R |  |

The eighth holographic optical element 800 may be made of holographic recording layers that are either fully sensitized, using a method similar to the method for making the third volume holographic optical element 300; or may be made of layers that are wavelength selective, i.e., not fully sensitized, using a method similar to the method for making the fourth volume holographic optical element 400. A method using wavelength selective holographic recording layers will be described.

Figure 23:
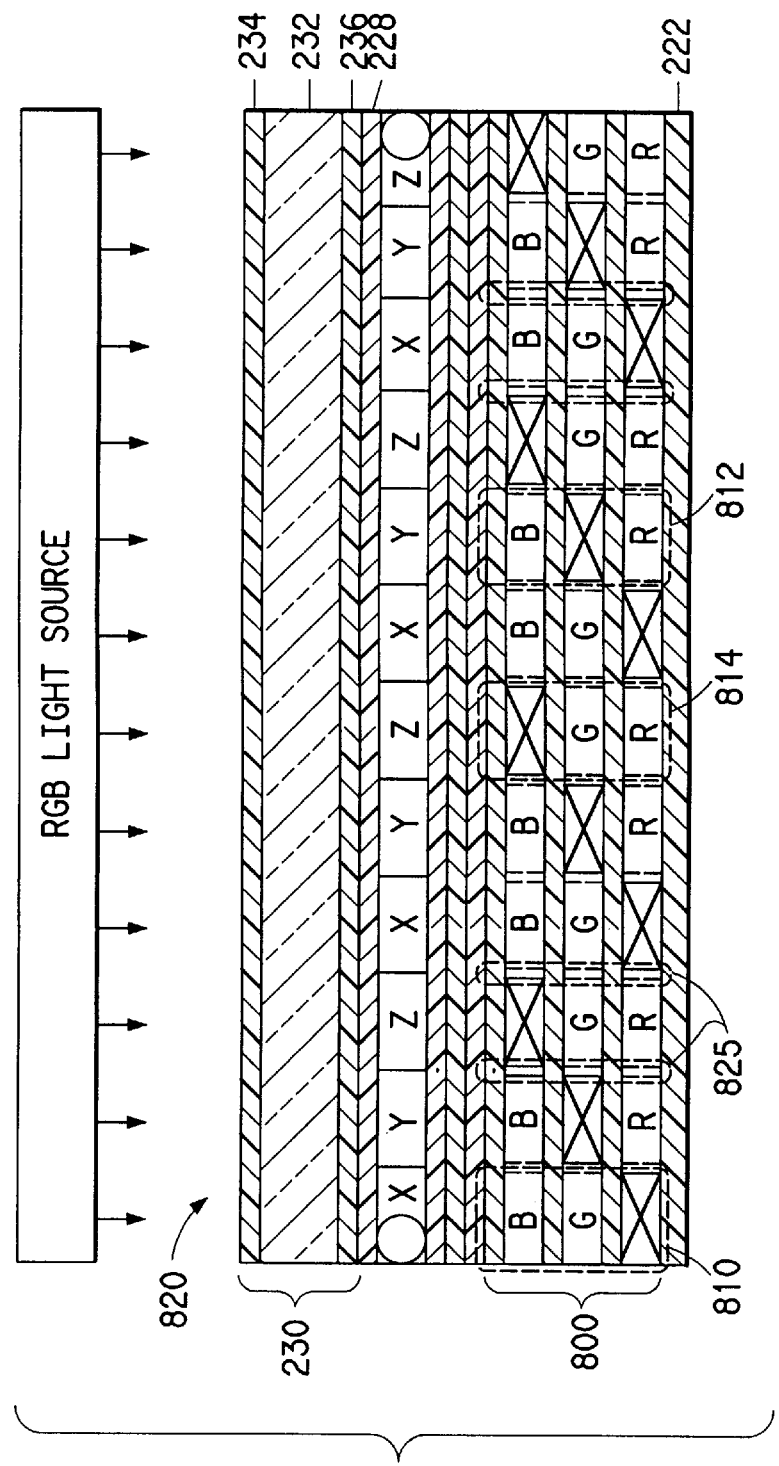
FIG. 23 illustrates the eighth volume holographic optical element used as a multicolor transmission filter in a liquid crystal display apparatus.

FIG. 23 illustrates the eighth volume holographic optical element 800 used as a multicolor transmission filter in a liquid crystal display 820. The transmission liquid crystal display apparatus comprises the same elements as that described in conjunction with FIG. 7a, differing only in that the eighth holographic multicolor transmission filter 800 is used in place of the second holographic multicolor transmission filter 200.

In operation, when the liquid crystal display element 226 modifies or rotates the polarization of the light passing through the first set of cells X to the second polarization, the light passes into the first pixel volumes 810 in which the first volume holographic mirrors pass light with the first color (e.g., Red) wavelength band through the first polarizer 222 to a viewer. When the liquid crystal display element 226 modifies or rotates the polarization of the light passing through the second set of cells Y to the second polarization, the light passes into the second pixel volumes 812 in which the second volume holographic mirrors pass light with the second color (e.g., Green) wavelength band through the first polarizer 222 to the viewer. When the liquid crystal display element 226 modifies or rotates the polarization of the light passing through the third set of cells Z to the second polarization, the light passes into the third pixel volumes 814 in which the third volume holographic mirrors pass light with the third color (e.g., Blue) wavelength band through the first polarizer 222 to the viewer. Light from cells X, Y, or Z which enters the mask volume 825 (i.e., between the pixel volumes 810,812,814) is reflected back to the light source and never reaches the viewer, regardless of polarization.

8.1 Method for Making the Eighth Element 800

FIG. 24a shows a first pattern of a first photomask or filter layer 864 that can be used in a method for making the eighth volume holographic optical element 800. The pattern is a two dimensional array of pixels having a first plurality of pixels 866, a second plurality of pixels 868, and a third plurality of pixels 870. The letter "R" is in each of the first pixels 866 indicating that such pixels 866 only pass Red light. The letter "G" is in each of the second pixels 868 indicating that such pixels 868 only pass Green light. The letter "B" is in each of the third pixels 870 indicating that such pixels 870 only pass Blue light.

FIG. 24b illustrates a pattern of a second photomask or filter layer 872 which is the same as the first photomask layer 864 with one exception. The second photomask layer 872 has rows of pixels that are offset with respect to adjacent rows of pixels. Further, in the second filter 872, each pixel is surrounded by a border 874 which should be essentially opaque to the first, second and third wavelength bands of light. This border can be produced by prior art methods for making etched chrome masks or by recording holographic mirrors that reflect the first, second and third wavelength bands in this area.

This can be accomplished by requiring the holographic imaging radiation to pass through a photomask which blocks the radiation from recording holograms in the border 874 in forming the filter 872. One suitable filter that can be used would be to use an appropriate conventional LCD RGB filter.

Referring to FIGS. 25 a–c, the method for making the eighth volume holographic optical element 800 will now be described starting with an eighth photohardenable holographic recording film element 842. The eighth photohardenable holographic recording film element 842 is the same as the fourth photohardenable holographic recording film element 442, i. e., the first unimaged holographic recording layer 803' is substantially only sensitized to be photosensitive to the first color (e.g., Red) wavelength band, the second unimaged holographic recording layer 805' is substantially only sensitized to be photosensitive to the second color (e.g., Green) wavelength band, and the third unimaged holographic recording layer 807' is substantially only sensitized to be photosensitive to the third color (e.g., Blue) wavelength band.

The first barrier layer 809 of the eighth photohardenable holographic recording film element 840 is laminated to a reflective layer 846 coated on a dimensionally stable support 848. The reflective layer can be a reflective metal, such as aluminum, or any other reflective material. The dimensionally stable substrate 816 of the eighth photohardenable holographic recording film element 842 is coupled to the filter layer 864 by an index matching fluid layer 854.

Then, as illustrated in FIG. 25a, actinic radiation is directed from source 18 through the filter layer 864, the eighth photohardenable holographic recording film element 842 onto the reflective layer 846. The reflective layer 846 reflects the light back through the eighth photohardenable holographic recording film element 842. This imagewise exposes the film element 842 to actinic radiation to polymerize monomer in selected first layer volumes 815, second layer volumes 817 and third layer volumes 819 to make the exposed volumes holographically inactive. More specifically, actinic radiation which passes through a pixel in filter layer 864 labeled "R" passes only the first color (e.g., Red) wavelength band. Only the first film layer 803' is sensitized to the first color (e.g., Red) wavelength band. Thus, the layer volumes 815 in the first film layer 803' under the filter layer pixels labeled "R" become holographically inactive. Actinic radiation which passes through a filter layer pixel labeled "G" passes only the second color (e.g., Green) wavelength band. Only the second film layer 805' is sensitized to the second color (e.g., Green) wavelength band.

Thus, the layer volumes 817 in the second film layer 805' under the filter layer pixels labeled "G" become holographically inactive. Actinic radiation which passes through a filter layer pixel labeled "B" passes only the third color (e.g., Blue) wavelength band. Only the third film layer 807' is sensitized to the third color (e.g., Blue) wavelength band. Thus, the layer volumes 819 in the third film layer 807' under the filter layer pixels labeled "B" become holographically inactive.

Then the filter layer 864 and the index matching fluid layer 854 are removed. Next, as illustrated in FIG. 25b, coherent or substantially coherent light, such as from light source 16 or its equivalent, is directed, in turn, through the film element 842 onto the reflective layer 846. The reflective layer 846 reflects the light back through the film element 842 such that the reflected light interferes with the light directly from the source 16. This interference holographically images the film element 842 recording the multi-layer volume holographic optical element 800. More specifically, holographic mirrors form in non-inactive layer volumes 815 of the first layer 803' where the mirrors will reflect light having the first color (e.g., Red) wavelength band and pass all other wavelength bands. Holographic mirrors form in non-inactive layer volumes 817 of the second layer 805' where the mirrors will reflect light having the second color (e.g., Green) wavelength band and pass all other wavelength bands. Holographic mirrors form in non-inactive layer volumes 819 of the third layer 807' where the mirrors will reflect light having the third color (e.g., Blue) wavelength band and pass all other wavelength bands. This simultaneously holographically images the first layer 803', the second layer 805' and the third layer 807' into imaged layers 803, 805 and 807, respectively.

Figure 25C:
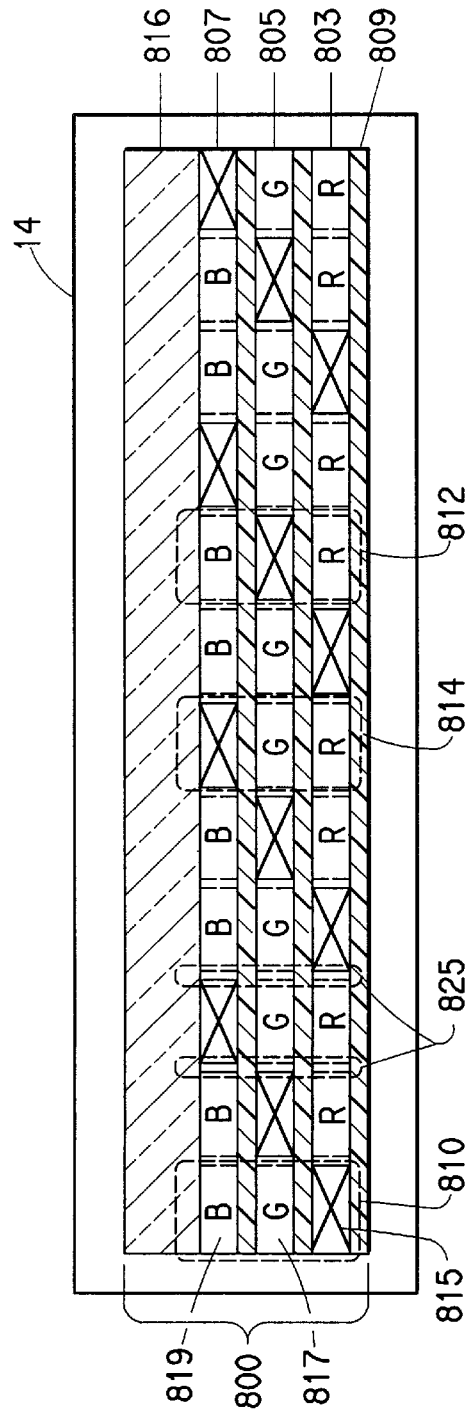
FIG. 25c illustrates heating the holographic recording film element.

Then the reflective layer 846 and the dimensionally stable support 848 are removed. The eighth holographic recording film element 800 does not need to be cured. FIG. 25c illustrates another optional step of heating the fourth holographic recording film element 800 which is the same as the heating step described in relation to FIG. 5e. This results in the eighth volume holographic optical element 800.

9.0 Ninth Holographic Optical Element 900

Figures 26, 27:
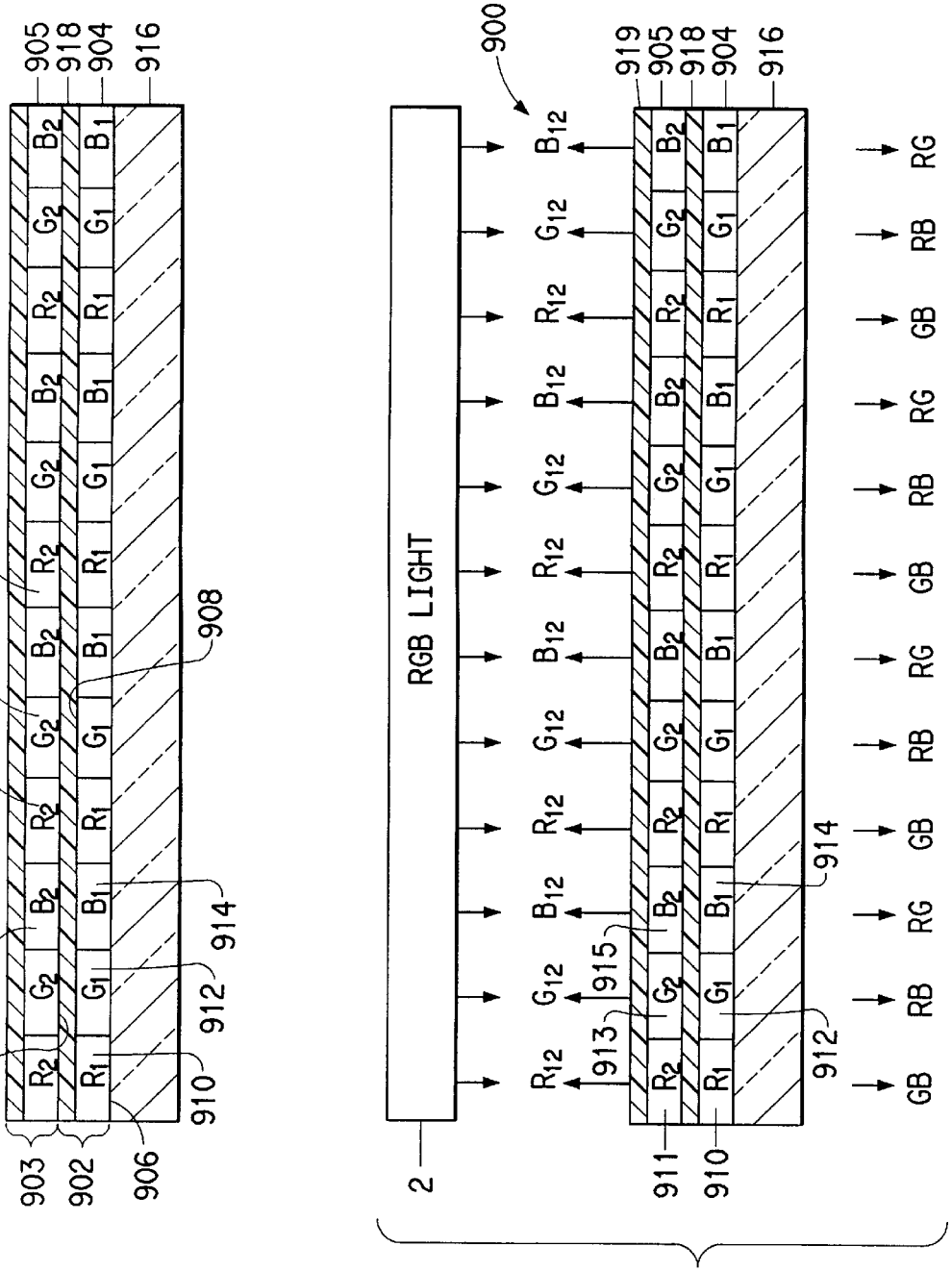
FIG. 26 illustrates a ninth photohardenable holographic recording film element having a first holographic layer and a second holographic layer.
FIG. 27 illustrates the ninth volume holographic optical element with a holographic recording film element filtering a light source in accordance with the present invention to provide a wide bandwidth filtered light output.

Referring to FIG. 26, there is illustrated a ninth wide-bandwidth volume holographic optical element 900 in accordance with the present invention. The ninth volume holographic optical element 900 comprises a first photohardened holographic recording film element 902 and a second photohardened holographic recording film element 903. In this embodiment, the photohardened holographic recording film element 902 comprises a holographic recording film layer 904 and photohardened holographic recording film element 903 comprises a holographic recording film layer 905. The first holographic recording film layer 904 has a first surface 906 and a second surface 908 and comprises a first plurality of pixel volumes 910, a second plurality of pixel volumes 912, and a third plurality of pixel volumes 914. The second holographic recording film layer 905 has a first surface 907 and a second surface 909 and comprises a first plurality of pixel volumes 911, a second plurality of pixel volumes 913, and a third plurality of pixel volumes 915.

Each one of the first pixel volumes 910 includes a first volume holographic mirror that reflects light with a first wavelength sub-band (e.g., $Red_1$) of a first color (e.g., Red) wavelength band and passes light with at least a second color (e.g., Green) wavelength band and a third color (e.g., Blue) wavelength band. Each one of the second pixel volumes 912 includes a second volume holographic mirror that reflects light with a first wavelength sub-band (e.g., $Green_1$) of the second color (e.g., Green) wavelength band and passes light with at least the first color (e.g., Red) wavelength band and the third color (e.g., Blue) wavelength band. Each one of the third pixel volumes 914 includes a third volume holographic mirror that reflects light with a first wavelength sub-band (e.g., $Blue_1$) of the third color (e.g., Blue) wavelength band and passes light with at least the first color (e.g., Red) wavelength band and the second color (e.g., Green) wavelength band.

Each one of the first pixel volumes 911 of the second holographic recording film layer 905 includes a first volume holographic mirror that reflects light with a second wavelength sub-band (e.g., $Red_2$) of a first color (e.g., Red) wavelength band and passes light with at least a second color (e.g., Green) wavelength band and a third color (e.g., Blue) wavelength band. Each one of the second pixel volumes 913 includes a second volume holographic mirror that reflects light with a second wavelength sub-band (e.g., $Green_2$) of the second color (e.g., Green) wavelength band and passes light with at least the first color (e.g., Red) wavelength band and the third color (e.g., Blue) wavelength band. Each one of the third pixel volumes 915 includes a third volume holographic mirror that reflects light with a second wavelength sub-band (e.g., $Blue_2$) of the third color (e.g., Blue) wavelength band and passes light with at least the first color (e.g., Red) wavelength band and the second color (e.g., Green) wavelength band.

The first pixel volumes 910, 911, the second pixel volumes 912, 913 and the third pixel volumes 914, 915 can be any shape and in any order in the respective film layers 904, 905. The volumes 910, 912, 914 do have sides which are part of the first and second surfaces 906, 908 of the film layer 904. The volumes 911, 913, 915 do have sides which are part of the first and second surfaces 907, 909 of the film layer 905. FIG. 27 depicts one row of a two dimensional array of the volumes 910, 912, 914 and 911, 913, 915. Preferably, the pixels volumes 910, 912, 914; 911, 913, 915 are ordered in each row of the array in a repeating sequence of one of the first pixel volumes 910, 911 then one of the second pixel volumes 912, 913 and then one of the third pixel volumes 914, 915. The pixel volumes 910, 912, 914; 911, 913, 915 in adjacent rows can be offset with respect to one another.

The holographic mirrors are formed by fringes or gratings. The gratings of all holographic mirrors disclosed herein can be of any shape or slant achieved by conventional holographic methods. The gratings can be conformal gratings which are parallel to the surfaces 906, 907; 908, 909 of the recording medium and/or non-conformal gratings which are non-parallel to the surfaces 906, 907; 908, 909.

The operation or function of the first volume holographic optical element 900 is illustrated in FIG. 27. Specifically, a light source 2 is illustrated providing light towards the ninth photohardened holographic recording film element 900. The light source 2 can emit the first color (e.g., Red) wavelength band, the second color (e.g., Green) wavelength band and/or the third color (e.g., Blue) wavelength band. The light source 2 can emit coherent, substantially coherent or noncoherent light. The letters in FIG. 27 designating the color wavelength bands and the associated arrows illustrate whether the element 900 will pass or reflect the specific color wavelength band assuming that the light source 2 emits actinic radiation in such color wavelength band. Preferably, if the light source 2 also emits other color wavelength bands, such wavelength bands would also pass through the ninth volume holographic optical element 900. The ninth volume holographic optical element 900 functions the same regardless of which side of the ninth volume holographic optical element 900 the light source 2 is positioned The first color wavelength band, the second color wavelength band and the third color wavelength band can be any distinct wavelength bands of light. Preferably, the distinct wavelength bands are separated by other wavelength bands Preferably, light having the first color wavelength band has a bandwidth of at least 20 (and more preferably within about 40–60) nanometers and includes 612 nanometer which appears Red. Preferably, light having the second color wavelength band has a bandwidth of at least 20 (and more preferably within about 40–60) nanometers and includes 545 nanometer which appears Green. Preferably, light having the third color wavelength band has a bandwidth of at least 20 (and more preferably within about 40–60) nanometers and includes 436 nanometer which appears Blue. As previously mentioned, the letters in all pixel volumes illustrate the color wavelength band(s) that is/are reflected by the pixel volume and all other color wavelengths pass through the pixel volumes. The subscript(s) following the letters in all pixel volumes in FIGS. 26–29 illustrate the sub-band(s) of the color wavelength band(s) that is/are reflected by the pixel volume. The letter "R" represents a Red wavelength band as an illustration for the first color wavelength band, with "$R_1$" illustrating the first sub-band and "$R_2$" illustrating the second sub-band. The letter "G" represents a Green wavelength band as an illustration for the second color wavelength band, with "$G_1$" illustrating the first sub-band and "$G_2$" illustrating the second sub-band. The letter "B" represents a Blue wavelength band as an illustration for the third color wavelength band, with "$B_1$" illustrating the first sub-band and "$B_2$" illustrating the second sub-band. When two or more of these letters are listed together, it refers to light consisting essentially of the wavelength bands of each of the listed letters. When two or more of the subscripts are listed together, it refers to light consisting essentially of the wavelength sub-bands of each of the listed subscripts.

The ninth holographic optical element 900 further optionally comprises a dimensionally stable substrate 916 having a planar surface supporting the first surface 906 of the film layer 904. The ninth holographic recording film element 902 may further comprise a barrier layer 918 on the second surface 908 of the film layer 904. A light absorbing, or antihalation, layer 962 is laminated to the barrier layer 918 or, in the absence of a barrier layer, affixed to the film layer 904 with an adhesive layer 960.

Figure 28:
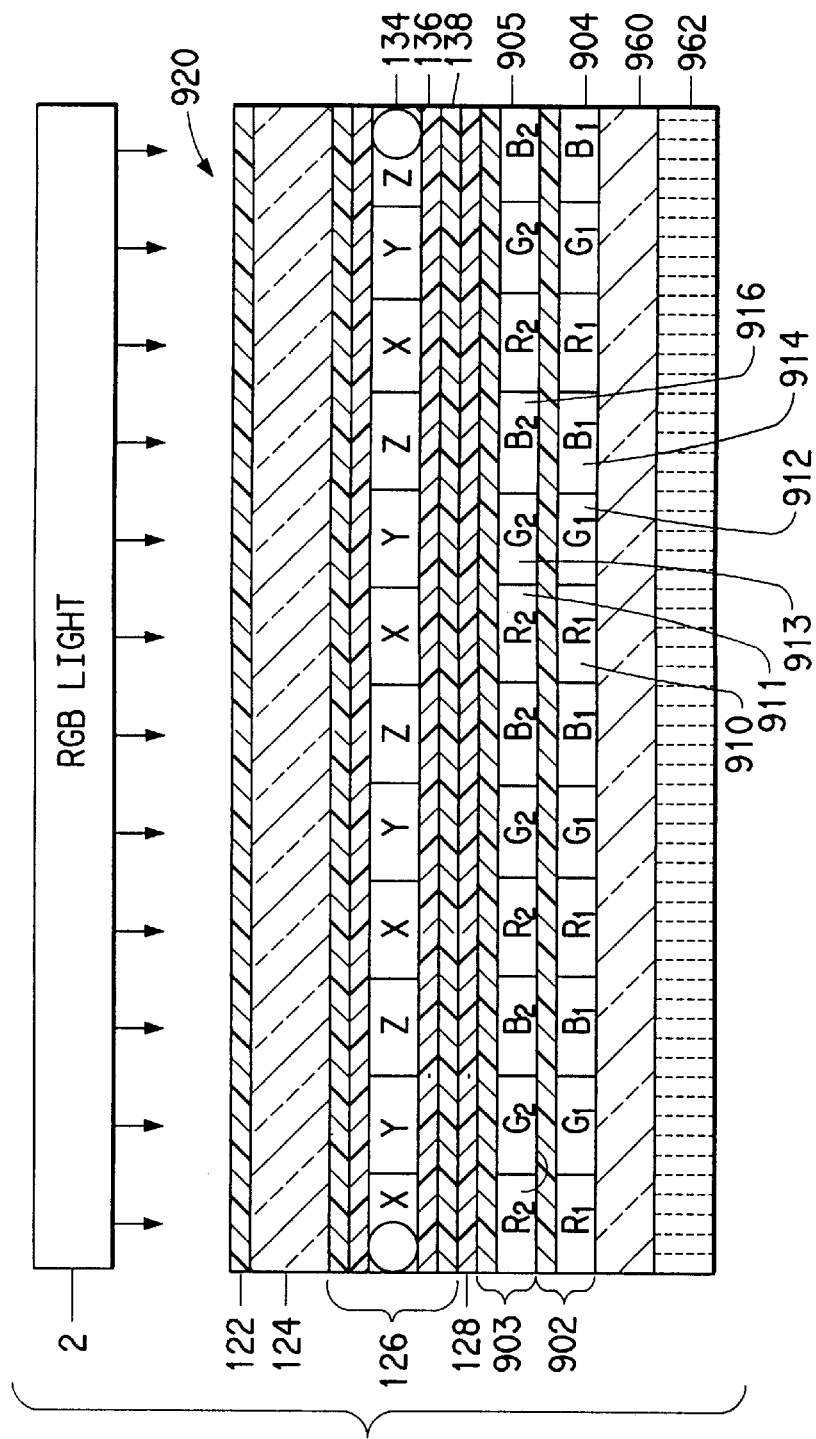
FIG. 28 illustrates the ninth volume holographic optical element used as a multicolor transmission filter in a liquid crystal display apparatus.

FIG. 28 illustrates the ninth volume holographic optical element 900 used as a multicolor reflection filter in a reflective liquid crystal display (LCD) apparatus 920. The reflective liquid crystal display apparatus comprises, in order, a first light polarizer 122, a top or first dimensionally stable support 124, a liquid crystal display element 126, a second light polarizer 128, and the holographic multicolor reflection filter 900. The first light polarizer 922 is for linearly polarizing and passing light, such as ambient light, having a first linear polarization. The top dimensionally stable substrate 924 provides rigidity and overall structural support. The liquid crystal display element 126 is well known by those skilled in the art and is discussed in conjunction with the first volume holographic optical element 100.

In operation, when the liquid crystal display element 126 modifies or rotates the polarization of the light passing through the first set of cells X to the second polarization, the light passes through the second polarizer 128 into the first pixel volumes 910 in which the first volume holographic mirrors reflect light with the first sub-band (e.g., $R_1$) of the first color (e.g., Red) wavelength band back through the liquid crystal display element 126 to a viewer on the same side of the LCD apparatus that ambient light 4 enters the first polarizer 122. Similarly, light that passes through the second polarizer 128 into the first pixel volumes 911 in which the first volume holographic mirrors reflect light with the second sub-band (e.g., $R_2$) of the first color (e.g., Red) wavelength band back through the liquid crystal display element 126 to a viewer. The combination of the first sub-band (e.g., $R_1$) reflected light with the second sub-band (e.g. $R_2$) reflected light provides a widebandwidth reflection of the first color (e.g., Red) wavelength band. When the liquid crystal display element 126 modifies or rotates the polarization of the light passing through the second set of cells Y to the second polarization, the light passes through the second polarizer 128 into the second pixel volumes 912 in which the second volume holographic mirrors reflect light with the first sub-band (e.g. $G_1$) of the second color (e.g., Green) wavelength band back through the liquid crystal display element 126 to the viewer. Similarly, light that passes through the second polarizer 128 into the second pixel volumes 913 in which the second volume holographic mirrors reflect light with the second sub-band (e.g., $G_2$) of the first color (e.g., Green) wavelength band back through the liquid crystal display element 126 to a viewer. When the liquid crystal display element 126 modifies or rotates the polarization of the light passing through the third set of cells Z to the second polarization, the light passes through the second polarizer 128 into the third pixel volumes 114 in which the third volume holographic mirrors reflect light with the first sub-band (e.g., $B_1$) of the third color (e.g., Blue) wavelength band back through the liquid crystal display element 126 to the viewer. Similarly, light that passes through the second polarizer 128 into the third pixel volumes 915 in which the second volume holographic mirrors reflect light with the second sub-band (e.g., $B_2$) of the first color (e.g., Blue) wavelength band back through the liquid crystal display element 126 to a viewer.

In all three cases, other wavelengths of light pass through the filter 900 away from the viewer and are absorbed by the light absorbing, or antihalation, layer 962. Further, light which passes through the liquid crystal display element 126 towards the second polarizer 128, but was not changed by the liquid crystal display element 126 to have the second polarization, is absorbed by the second polarizer 128.

9.1 Method for Making Ninth Element 900

FIG. 3 depicts a first holographic recording film element 142 which can be used in making the first photohardened holographic recording film element 902. The first holographic recording film element 942 (same as 142) comprises, in turn, a cover sheet 944 (same as 144), an unimaged, unexposed holographic recording film layer 904' (same as 104'), a barrier layer 918 (same as 118) and a dimensionally stable support 946 (same as 146).

A method for making the ninth volume holographic optical element 900 will now be described starting with the first unimaged, unexposed holographic film element 942. The cover sheet 944 is removed from the first surface 906 of the first holographic film layer 904'. The first surface 906 of the film layer 904' is laminated on the dimensionally stable substrate 916. The support 946 is removed from the barrier layer 918. An anti-reflection plate 948 with a photomask layer 950 is coupled through a first index matching fluid layer 952 to the barrier layer 918.

FIG. 4 shows a pattern that can be used for the photomask layer 950 (same as 150). The pattern is a two dimensional array of pixels having a first plurality of pixels B adapted to block light, and a second plurality of pixels P adapted to transmit or pass light. As discussed in conjunction with first holographic recording element 100 the array of pixels can have a repeating pattern of three rows of pixels.

The glass substrate 916 is coupled through a second index matching fluid layer 954 (same as 154) to a reflector 956, such as a front surface mirror. This results in a laminate structure which is depicted in FIG. 29a.

Next a first sub-band first color (e.g., $Red_1$) light source 6' is selected adapted to emit coherent or substantially coherent light consisting essentially of the first sub-band (e.g., $Red_1$) of a first color (e.g., Red) wavelength band. Light from the light source 6' is directed, in turn, through the anti-reflection plate 948, the transparent pixels P of the photomask layer 950, and the first holographic film layer 904' onto the reflector 956. The reflector 956 reflects the light back through the first holographic film layer 904' such that the reflected light interferes with the light passing through the film layer 904' towards the reflector 956. This interference holographically images or imagewise holographically exposes the first holographic film layer 904' to record a plurality of the first volume holographic mirrors, one in each of the first pixel volumes 910.

Next the anti-reflection plate 148 and photomask layer 950 are shifted or moved one pixel in a first direction, i.e., in the X direction illustrated in FIG. 4.

Next, as illustrated in FIG. 29b, a first sub-band second color (e.g., $Green_1$) light source 8' is selected adapted to emit coherent or substantially coherent light consisting essentially of the first sub-band (e.g., $Green_1$) of a second color (e.g., Green) wavelength band. Light from the light source 8' is directed, in turn, through the anti-reflection plate 948, the transparent pixels P of the photomask layer 950, and the first holographic film layer 904' onto the reflector 956. The reflector 956 reflects the light back through the first holographic film layer 904' such that the reflected light interferes with the light passing through the film layer 904' towards the reflector 956. This interference holographically images or imagewise holographically exposes the first holographic film layer 904' to record a plurality of the second volume holographic mirrors, one in each of the second pixel volumes 912.

Next the anti-reflection plate 948 and the photomask layer 950 are again shifted or moved one pixel in the first or X direction.

Next, as illustrated in FIG. 29c, a first sub-band third color (e.g., $Blue_1$) light source 10' is selected adapted to emit coherent or substantially coherent light consisting essentially of the first sub-band (e.g., $Blue_1$) of a third color (e.g., Blue) wavelength band. Light from the light source 10' is directed, in turn, through the anti-reflection plate 948, the transparent pixels P of the photomask layer 950, and the first holographic film layer 904' onto the reflector 956. The reflector 956 reflects the light back through the film layer 904' such that the reflected light interferes with the light passing through the film layer 904' towards the reflector 956. This interference holographically images or imagewise holographically exposes the film layer 904' to record a plurality of the third volume holographic mirrors, one in each of the third pixel volumes 914. This third consecutive holographic imaging step completes the formation of the unimaged film layer 904' into the imaged film layer 904.

After the anti-reflection plate 948, the photomask layer 950 and the first index matching fluid layer 952 are removed, the resulting laminate structure can be optionally cured, fixed or exposed to substantially polymerize any monomer and fix the holographic mirrors in the laminate structure.

This can be accomplished, as illustrated in FIG. 29d, by using noncoherent actinic radiation, such as from a broad band ultraviolet light source 12, to flood expose the laminate structure. This step photohardens or substantially photohardens any remaining photosensitive material in the imaged film layer 904.

Figure 29E:
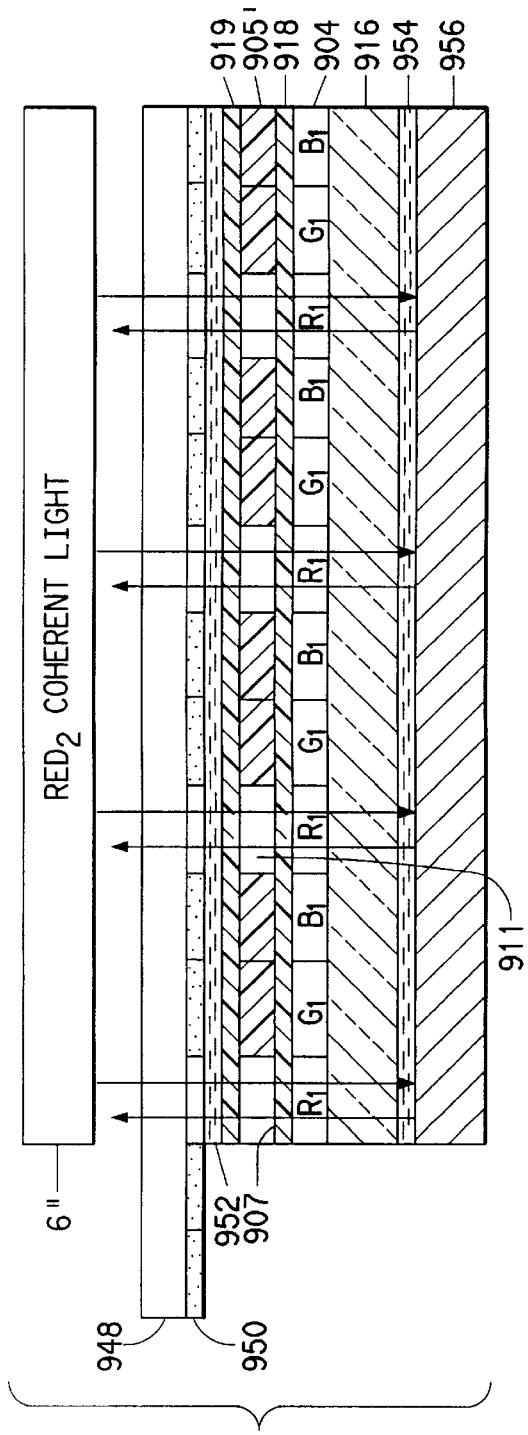
FIG. 29e illustrates holographically imaging the second holographic layer to record fourth holographic mirrors in the second holographic layer.

A second holographic recording film element 943 (same as 142) comprises, in turn, a cover sheet 945 (same as 144), an unimaged, unexposed holographic recording film layer 905' (same as 104'), the barrier layer 919 (same as 118) and a dimensionally stable support 947 (same as 146). The cover sheet 945 is removed from the first surface 907 of the second holographic film layer 905'. As illustrated in FIG. 29e, the first surface 907 of the film layer 905' is laminated on the barrier layer 918. The support 947 is removed from the barrier layer 919. An anti-reflection plate 948 with a photomask layer 950 is coupled through a first index matching fluid layer 952 to the barrier layer 919.

Next a second sub-band first color (e.g., $Red_2$) light source 6" is selected adapted to emit coherent or substantially coherent light consisting essentially of the second sub-band (e.g., $Red_2$) of a first color (e.g., Red) wavelength band. Light from the light source 6" is directed, in turn, through the anti-reflection plate 948, the transparent pixels P of the photomask layer 950, and the second holographic film layer 905', the first film layer 904', onto the reflector 956. The reflector 956 reflects the light back through the second holographic film layer 905' such that the reflected light interferes with the light passing through the film layer 905' towards the reflector 956. This interference holographically images or imagewise holographically exposes the second holographic film layer 905' to record a plurality of the first volume holographic mirrors, one in each of the first pixel volumes 911.

Next the anti-reflection plate 948 and photomask layer 950 are shifted or moved one pixel in a first direction, i.e., in the X direction illustrated in FIG. 4.

Figure 29F:
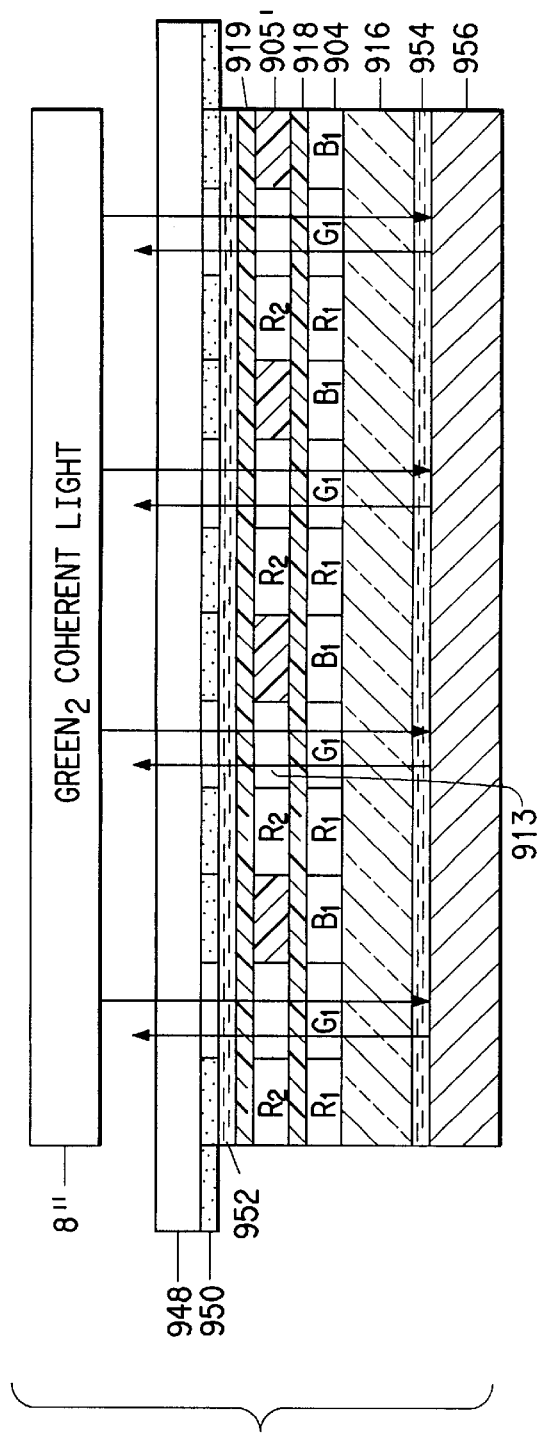
FIG. 29f illustrates holographically imaging the second holographic layer to record fifth holographic mirrors in the second holographic layer.

Next, as illustrated in FIG. 29f, a second sub-band second color (e.g., $Green_2$) light source 8" is selected adapted to emit coherent or substantially coherent light consisting essentially of the second sub-band (e.g., $Green_2$) of a second color (e.g., Green) wavelength band. Light from the light source 8" is directed, in turn, through the anti-reflection plate 948, the transparent pixels P of the photomask layer 950, and the second holographic film layer 905', the first film layer 904', onto the reflector 956. The reflector 956 reflects the light back through the second holographic film layer 905' such that the reflected light interferes with the light passing through the film layer 905' towards the reflector 956. This interference holographically images or imagewise holographically exposes the first holographic film layer 905' to record a plurality of the second volume holographic mirrors, one in each of the second pixel volumes 913.

Next the anti-reflection plate 948 and the photomask layer 950 are again shifted or moved one pixel in the first or X direction.

Next, as illustrated in FIG. 29g, a second sub-band third color (e.g., $Blue_2$) light source 10" is selected adapted to emit coherent or substantially coherent light consisting essentially of the second sub-band (e.g., $Blue_2$) of a third color (e.g., Blue) wavelength band. Light from the light source 10" is directed, in turn, through the anti-reflection plate 948, the transparent pixels P of the photomask layer 950, the second holographic film layer 905', and the first film layer 904', onto the reflector 956. The reflector 956 reflects the light back through the film layer 905' such that the reflected light interferes with the light passing through the film layer 905 towards the reflector 956. This interference holographically images or imagewise holographically exposes the film layer 905' to record a plurality of the third volume holographic mirrors, one in each of the third pixel volumes 915. This third consecutive holographic imaging step completes the formation of the unimaged film layer 905' into the imaged film layer 905.

After the anti-reflection plate 948, the photomask layer 950 and the first index matching fluid layer 952 are removed, the resulting laminate structure can be optionally cured, fixed or exposed to substantially polymerize any monomer and fix the holographic mirrors in the laminate structure. This can be accomplished, as illustrated in FIG. 29h, by using noncoherent actinic radiation, such as from a broad band ultraviolet light source 12, to flood expose the laminate structure. This step photohardens or substantially photohardens any remaining photosensitive material in the imaged film layer 905.

Figure 29I:
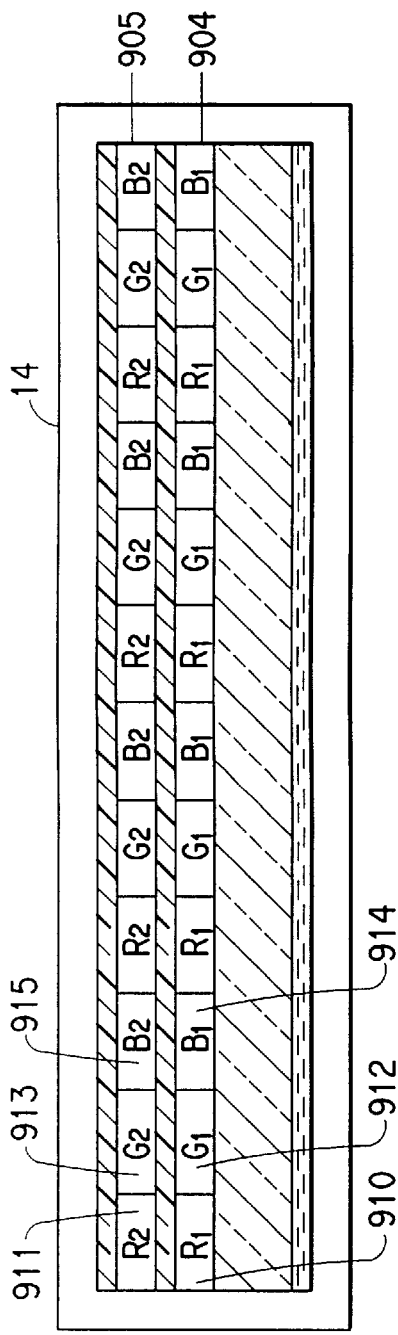
FIG. 29i illustrates heating the ninth volume holographic optical element.

After the reflector 956 and the second index matching fluid layer 954 are then removed, the resulting laminate structure can be optionally heated in an oven 14 such as illustrated in FIG. 29i. The structure is heated to further harden it and increase its refractive index modulation, its efficiency and the bandwidth of the holographic mirrors, as discussed in conjunction with first holographic optical element 100.

This results in the ninth volume holographic optical element 900 illustrated in FIGS. 26 and 27 where the unimaged, unexposed holographic recording film layers 904', 905' have become the holographic recording film layers 904, 905 holographically imaged with mirrors, optionally fixed (flood exposed) and optionally cured.

10.0 Tenth Volume Holographic Optical Element 1000

Figure 30:
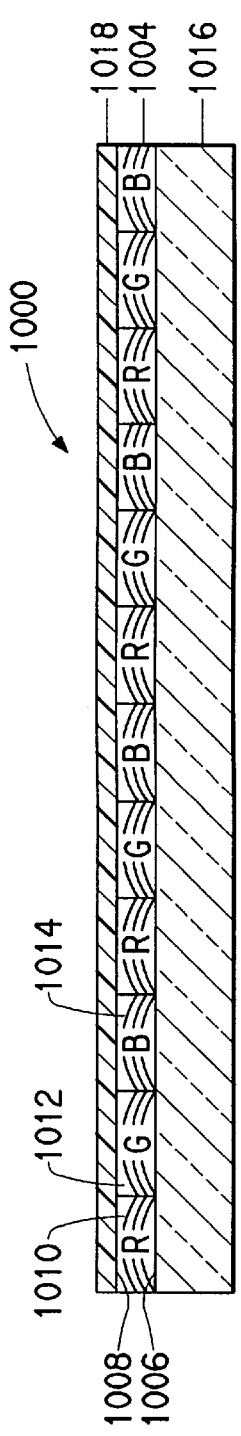
FIG. 30 illustrates a tenth volume holographic optical element with a holographic recording film element filtering a light source in accordance with the present invention to provide a wide viewing angle output.

Referring to FIG. 30, there is illustrated a tenth wide-viewing angle volume holographic optical element 1000 in accordance with the present invention. The tenth volume holographic optical element 1000 comprises a photohardened holographic recording film element 1002. In this embodiment, the photohardened holographic recording film element 1002 comprises a holographic recording film layer 1004. The holographic recording film layer 1004 has a first surface 1006 and a second surface 1008 and comprises a first plurality of pixel volumes 1010, a second plurality of pixel volumes 1012, and a third plurality of pixel volumes 1014.

Each one of the first pixel volumes 1010 includes a first volume holographic mirror that reflects light, in a diverging manner within a predetermined cone angle, with a first color (e.g., Red) wavelength band and passes light with at least a second color (e.g., Green) wavelength band and a third color (e.g., Blue) wavelength band. Each one of the second pixel volumes 1012 includes a second volume holographic mirror that reflects light, in a diverging manner within a predetermined cone angle, with a second color (e.g., Green) wavelength band and passes light with at least the first color (e.g., Red) wavelength band and the third color (e.g., Blue) wavelength band. Each one of the third pixel volumes 1014 includes a third volume holographic mirror that reflects light, in a diverging manner within a predetermined cone angle, with a third color (e.g., Blue) wavelength band and passes light with at least the first color (e.g., Red) wavelength band and the second color (e.g., Green) wavelength band.

10.1 Method for Making Tenth Element 1000

FIG. 3 depicts a first holographic recording film element 142 which can be used in making the tenth photohardened holographic recording film element 1002. The holographic recording film element 1042 (same as 142) comprises, in turn, a cover sheet 1044 (same as 144), an unimaged, unexposed holographic recording film layer 1004' (same as 104'), a barrier layer 1018 (same as 118) and a dimensionally stable support 1046 (same as 146).

A method for making the tenth volume holographic optical element 1000 is almost identical to the method for making the first volume holographic optical element 100, with the following exception. The glass substrate 1016 (same as 116) is coupled through a second index matching fluid layer 1054 (same as 154) to a reflector 1056, such as a front surface mirror, which differs from reflector 156. Reflector 1056 has a plurality of concave depressions which each correspond to a pixel to be formed in the holographic recording film layer 1004'. This results in a laminate structure which is depicted in FIG. 31a.

Light from the first color (e.g., Red) light source 6 is directed, in turn, through the anti-reflection plate 1048, the transparent pixels P of the photomask layer 1050, and the holographic film layer 1004' onto the reflector 1056. At each pixel site the reflector 1056 reflects the light back through a focal point and then in a diverging manner through the first holographic film layer 1004' such that the reflected light interferes with the light passing through the film layer 1004' towards the reflector 1056. The wavefronts of the substantially coherent light passing through the film layer 1004' toward the reflector are substantially planar and the wavefronts of the substantially coherent light passing through the film layer 1004' from the reflector are substantially spherical. This interference holographically images or imagewise holographically exposes the first holographic film layer 1004' to record a plurality of the first volume holographic mirrors, one in each of the first pixel volumes 1010. The first volume holographic mirrors have curved fringes and thus reflect light, in a diverging manner within a predetermined cone angle, with a first color (e.g., Red) wavelength band and pass light with at least a second color (e.g., Green) wavelength band and a third color (e.g., Blue) wavelength band.

Figure 31C:
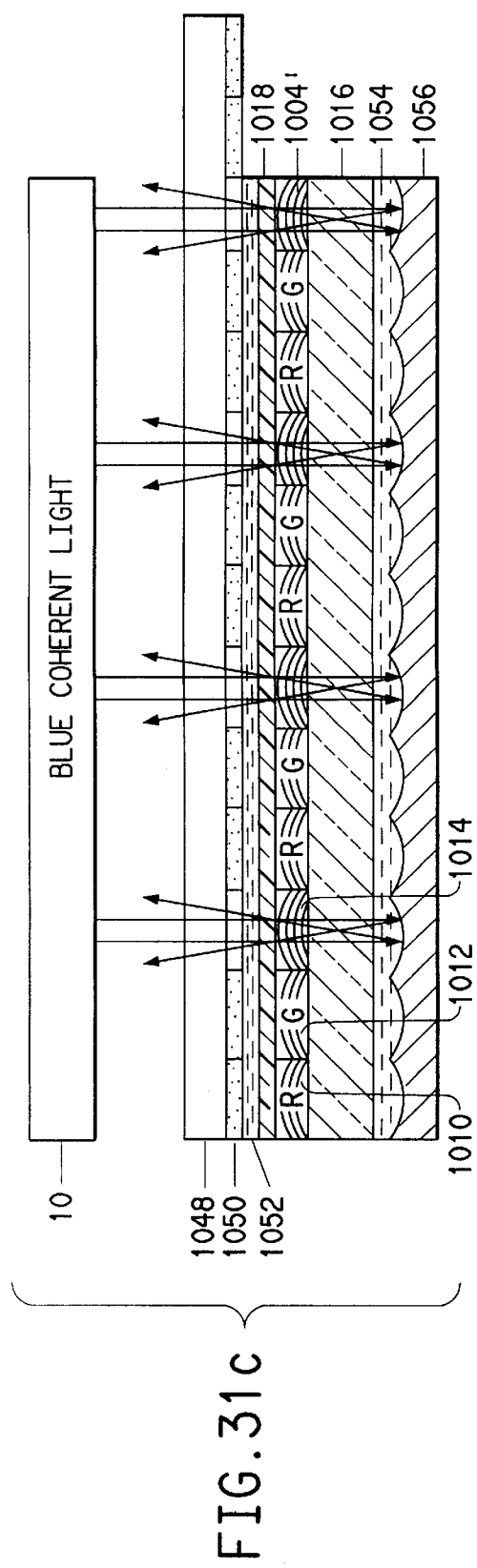
FIG. 31c illustrates holographically imaging the film element to record third holographic mirrors in the film element.

As illustrated in FIG. 31b, the second pixel volumes 1012, which includes a second volume holographic mirror that reflects light, in a diverging manner within a predetermined cone angle, with a second color (e.g., Green) wavelength band and passes light with at least the first color (e.g., Red) wavelength band and the third color (e.g., Blue) wavelength band are formed in a similar manner. As illustrated in FIG. 31c, each one of the third pixel volumes 1014, which includes a third volume holographic mirror that reflects light, in a diverging manner within a predetermined cone angle, with a third color (e.g., Blue) wavelength band and passes light with at least the first color (e.g., Red) wavelength band and the second color (e.g., Green) wavelength band are also formed in a similar manner.

Figure 32:
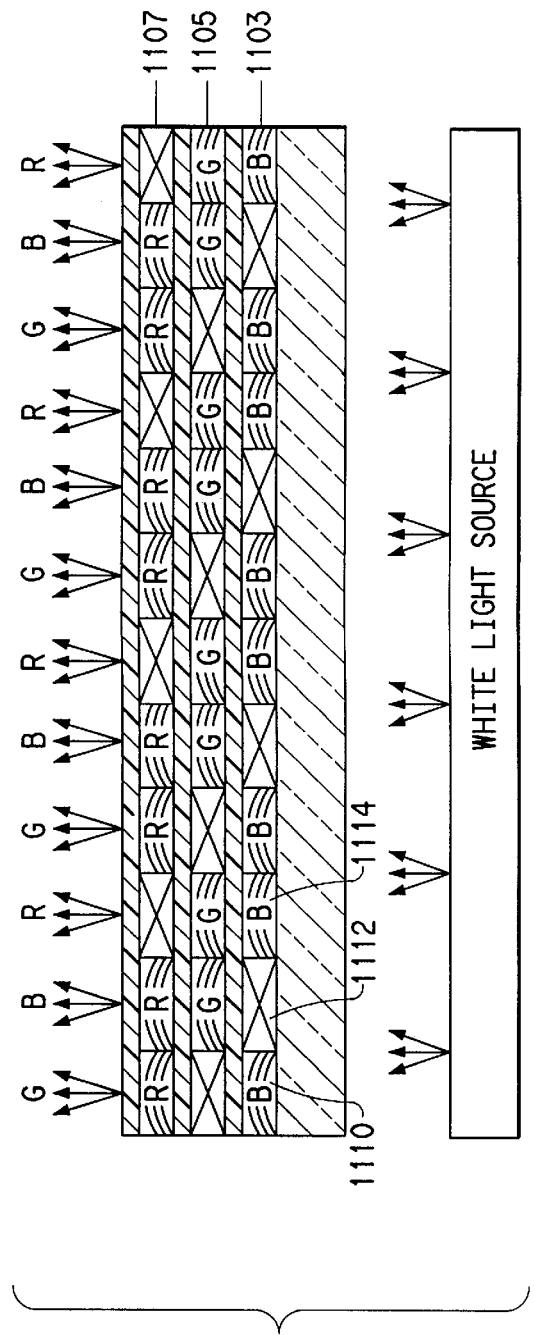
FIG. 32 illustrates an eleventh volume holographic optical element with a holographic recording film element filtering a light source in accordance with the present invention to provide a wide viewing angle output.

The concave depressions in the reflector 1056 may be of a predetermined shape, such as substantially spherical, and may have a predetermined radius of curvature. The predetermined shape and radius of curvature, along with the size of the pixel, will determine the curvature of the interference fringes within the holographic mirror volume and thus the predetermined cone angle of divergence of light reflected by the holographic mirror of a pixel Other shaped depressions, such as cylindrical or aspherical, in the reflector 1056 may be employed 11.0 Eleventh Volume Holographic Optical Element Referring to FIG. 32, an eleventh volume holographic optical element 1100 with a holographic recording film element, having a first holographic layer 1104, a second holographic layer 1106 and a third holographic layer 1108, filtering a light source 12 to provide a wide viewing angle output is illustrated The eleventh volume holographic optical element 1100 comprises a photohardened holographic recording film element comprising a first holographic recording layer 1103, a second holographic recording layer 1105 and a third holographic recording layer 1107 in which are recorded a first plurality of pixel volumes 1110, a second plurality of pixel volumes 1112, and a third plurality of pixel volumes 1114.

Each one of the first pixel volumes 1110 includes a first volume holographic mirror that passes light, in a diverging manner, with a first color wavelength band and reflects light, within a predetermined acceptance cone angle, with at least a second color wavelength band and a third color wavelength band. Each one of the second pixel volumes 1112 includes a second volume holographic mirror that passes light, in a diverging manner, with the second color wavelength band and reflects light, within a predetermined acceptance cone angle, with at least the first color wavelength band and the third color wavelength band. Each one of the third pixel volumes 1114 includes a third volume holographic mirror that passes light, in a diverging manner, with the third color wavelength band and reflects light with at least the first color wavelength band within a predetermined acceptance cone angle and the second color wavelength band. The eleventh volume holographic optical element 1100 functions in a manner similar to the fourth volume holographic optical element 400, but effectively filters incident light over a wider range of incident angles. The eleventh volume holographic optical element 1100 may be made by using the method for making the fourth volume holographic optical element 400, where a reflector 1156 (like reflector 1056), having a plurality of concave depressions which each correspond to a pixel to be formed in the holographic recording film layers 1104, 1106, 1108, is substituted for reflector 156.

II. Materials and/or Commercial Availability

The dimensionally stable substrates 116, 124, 216, 224, 316, 416, 516, 616, 682, 684, 686, 688, 716, 816, 916, 924, and 1016 can be made of rigid transparent materials and preferably are made of glass or plastic. Each of these substrates can be the same or different.

The barrier layers 118, 218, 309, 311, 313, 409, 411, 413, 509, 511, 609, 611, 718, 809, 918, 919, and 1018 are optional and are useful to prevent interlayer diffusion of dye sensitizer. When used, they are required to be transparent if irradiation is to be carried out through them. Each of these barrier layers can be the same or different. Such barrier layers can be made of transparent polymers and are preferably made of polyvinyl alcohol (PVA).

The cover sheets 144, 244 function to protect the film layers until ready for use. These cover sheets generally are a polymer film, such as polyethylene, polypropylene, or polyethylene terephthalate.

The unimaged, unexposed holographic film layers 104', 204', 303', 305', 307', 403', 4051, 407', 503', 505', 603', 605', 803', 805', 807', 904', 905', etc. are made of a photohardenable or photosensitive material. Each of these layers can be the same or different, unless otherwise specified. Holograms are recorded in materials that produce a spatial pattern of varying refractive index, rather than optical density, when exposed to light. Holographic recording materials are described in a number of references, such as, L. Solymer and D. J. Cook, Volume Holography and Volume Gratings, Academic Press, New York, 1981, Chapter 10, pages 254–304; and W. K. Smothers, B. M. Monroe, A. M. Weber and D. E. Keys, Photopolymers for Holography, SPIE Vol. 1212, Practical Holography IV (1990). Early developments in holography are described by E. N. Leith and J. Upatnieks, Scientific American, 212(6), 24–35 (June 1965). A useful discussion of holography is presented By C. C. Guest entitled Holography in Encyclopedia of Physical Science and Technology, Vol. 6, pages 507–519, R. A. Myers, Ed., Academic Press, Orlando, Fla., 1987. Preferred recording materials for use in this invention are photopolymerizable compositions, dichromated gelatin, and silver halide emulsions.

Photopolymerizable compositions are disclosed in Haugh, U.S. Pat. No. 3,658,526; Chandross, U.S. Pat. No. 3,993,485; and Fielding, U.S. Pat. Nos. 4,535,041 and 4,588,664. Preferred photopolymerizable compositions are disclosed in Keys, U.S. Pat. No. 4,942,102; Monroe, U.S. Pat. No. 4,942,112; Smothers, U.S. Pat. No. 4,959,284; Trout, U.S. Pat. No. 4,963,471; Smothers, U.S. Pat. No. 5,236,808; Smothers, U.S. Pat. No. 5,256,520; Beresniewicz, et al. U.S. Pat. No. 5,413,863; as well as in U.S. patent application Ser. No. 08/146,816. The compositions used in the preferred recording film element are dry films.

As used throughout this specification, "fully sensitized" means that the material is photosensitive to light from about 400 to about 700 nanometers wavelengths which includes the entire visible range of light. See U.S. Pat. No. 4,917,977 which discloses methods for making fully sensitized, and non-fully sensitized or wavelength selectively sensitized, holographic materials. In addition, see the following related and more recent patents disclosing use of photosensitizers: Smothers, U.S. Pat. No. 5,204,467; Smothers, U.S. Pat. No. 5,236,808; and Smothers, U.S. Pat. No. 5,256,520.

The dimensionally stable supports 146, 248, 448, etc. are required to be transparent if irradiation is to be carried out through the supports. Preferred materials for the support 146 are polymer films, such as polyethylene, polypropylene, cellulose, and polyethylene terephthalate.

Antireflection plates 148, 156, etc. function to prevent back reflection of imaging light and are commercially available from CVI Laser Corporation with offices at Albuquerque, N.Mex.

The photomask layers 150, 672, 674, 676, 678, etc. function to block all light from passing through the layers and can be made of patterned chromium or silver halide on glass. Alternatively, imagewise radiation can be carried out through a half-tone or continuous tone transparency. Other means of imagewise irradiation include exposure through a transmissive device, such as an absorptive filter, and exposure using a scanning laser, electron beam, or the like.

The index matching fluid layers 152, 154, 252, 254, 258, 454, 692, 694, 696, 698, etc. are preferably hydrocarbons and most preferably are Isopar® L available from Chemcentral Corporation with offices at Southwestern Pennsylvania 19399 and Cargille Al.59 available from R. P. Cargille Laboratories, Inc. at Cedar Grove, N.J. 07009.

Optical adhesive layers 260 function to adhere adjacent layers with proper index matching between layers. Preferred optical adhesive materials are transparent and include polyurethane, and proprietary products commercially available from Norland Products, Inc. with offices at New Brunswick, N.J. 08902.

The antihalation layer 262, etc. functions to absorb light and prevent back reflection. Suitable antihalation layers are black spray paint on float glass or highly absorbing films such as Cronar® commercially available from E. I. du Pont de Nemours and Company of Wilmington, Del.

III. Examples

The advantageous properties of this invention can be observed by reference to the following examples which illustrate, but do not limit, the invention. In these Examples, parts and percents are by weight unless otherwise indicated. Terms or abbreviations used throughout the examples are defined the following glossary.

| GLOSSARY | |
|---|---|
| DE (%) | Diffraction efficiency expressed as a percent; DE (%) = $I_{dif}/I_o$ × 100, where $I_{dif}$ is the intensity of the diffracted beam of actinic radiation and $I_o$ is the intensity of the incident beam corrected for absorption in the film sample and for spurious reflections off the film sample |
| FC-430 | Fluorad ® FC-430; fluoroaliphatic polymeric esters; CAS 11114-17-3 3M Company, St. Paul, MN |
| GA2-red | OmniDex ® GA2-red color tuning film (CTF); E. I. du Pont de Nemours, Inc., Wilmington, DE; OmniDex ® is a registered trademark of E. I. du Pont de Nemours and Company |
| Isopar ® L | An aliphatic hydrocarbon product; Exxon Company, Houston, TX |
| JAW | Cyclopentanone, 2,5-bis[2,3,6,7-tetrahydro-1H,5H-benzo[i, j]quinolizin-9-yl)methylene]- |
| MMT | 4-Methyl-4H-1,2,4-triazole-3-thiol; CAS 24854-43-1 |
| Mylar ® film | Polyethylene terephthalate film; registered trademark of E. I. du Pont de Nemours and Company, Wilmington, DE |
| NVC | N-Vinyl carbazole; 9-vinyl carbazole; CAS 1484-13-5 |
| Photomer ® 4039 | Phenol ethoxylate monoacrylate; CAS 56641-05-5; Henkel Process Chemical Company, Ambler, PA |
| PI-B | 4,5-diphenyl-1-[4,5-diphenyl-2-(2,3,5-trichlorophenyl)-2H-imidazol-2-yl]-2-(2,3,5-trichlorophenyl)-1H-imidazole |
| PVA | Poly(vinyl alcohol) |
| Sartomer 349 | Ethoxylated bisphenol A diacrylate; CAS 24447-78-7; Sartomer Company, West Chester, PA |
| SD-A | 3-[(1-ethyl-1,2,3,4-tetrahydro-6 quinolinyl)methylene]-2,3-dihydro-4H-1-benzopyran-4-one; CAS 75535-23-8 |
| SD-B | 2,4-bis[(3-ethyl-2(3H)-benzothiazolylidene) ethylidene]-8-methyl-8-azabicyclo[3.2.1]octan-3-one; CAS 154482-35-6 |
| SD-C | 1-ethyl-2-[[3-[(1-ethyl-1,3-dihydro-5-methoxy-3,3-dimethyl-2H-indol-2-ylidene)methyl]-2-hydroxy-4-oxo-2-cyclobuten-1-ylidene]methyl]-5-methoxy-3,3-dimethyl-3H-indolium hydroxide inner salt; CAS - none on computer files (STN International) |
| Spot# | Area/pixel/region (identified by number) of the HRF that is imaged in the examples of this specification |
| TFE | Tetrafluoroethylene |
| TMPTMA | Trimethylol propane trimethacrylate |
| VAc | Vinyl acetate |
| VOH | Vinyl alcohol |
| ( )max (nm) | Wavelength of actinic radiation showing the maximum diffraction efficiency (DE (%)) from the transmission spectrum of a holographic mirror |

EXAMPLE 1

This example demonstrates the ability to record high efficiency single-color mirrors at separate regions in a single holographic photopolymer layer, which is required for high efficiency volume holographic optical elements and multi-color holographic filters.

To prepare the holographic (photopolymer) recording film which is utilized in this example, a coating solution was prepared containing 66.0 weight % of tetrafluoroethylene/vinyl acetate (TFE/VAc) binder copolymer (containing 19.4 mole % TFE and 80.6 mole % vinyl acetate and having inherent viscosity=1.48 deciliters/gram measured at 30° C.), 21.0 weight % of Photomer® 4039, 6.0 weight % of NVC, 3.0 weight % of Sartomer 349, 3.0 weight % of PI-B, 1.0 weight % of MMT, 0.22 weight % of FC-430, 0.075 weight % of JAW, and 0.034 weight % of SD-C in 19:1 dichloromethane/methanol.

The solution was extrusion dye coated onto a 50 μm Mylar® base sheet at a speed of about 31 ft/min (15 cm/sec) using a web coater. The solvent was evaporated by passing the coated film through a three zone drier. The first zone was at 120° F. (49° C.), the second at 140° F. (60° C.), and the third at 160° F. (71° C.). A coversheet of 23 micron Mylar® (polyethylene terephthalate film) was laminated to the coating as it exited the drier. Dry coating thickness of the holographic photopolymer was 20 μm between a 23 μm Mylar® cover sheet and 50 μm Mylar® base sheet. The coversheet was removed from the photopolymer and the tacky photopolymer was laminated to a section of 100 mm×125 mm×3.2 mm float glass. Excess film was trimmed away so that the laminated film fit within the edges of the glass substrate. The base sheet was left in place during subsequent processing. We refer to the structure of base/holographic photopolymer and glass plate as the imaging plate. The film side of the imaging plate was coupled to an anti-reflection (AR) plate using Isopar® L (Exxon) to provide a good match of the refractive index of the film to the AR plate. On the opposite side of the imaging plate, a front-surface aluminum mirror was coupled to the surface using the same index matching fluid. Pressure was applied to the stack of plates to provide thin, even index matching fluid layers. The stack of plates was then mounted in a conventional plate holder mounted on an imaging stage and allowed to settle for more than 30 seconds.

An argon ion laser with emissions at 458 nm, a diode-pumped, frequency-doubled YAG laser with emissions at 532 nm and a krypton ion laser with emissions at 647 nm were combined by appropriate dichroic mirrors in the conventional way to form a 3-color laser beam. This 3-color beam was passed through achromatic optics to form an expanded, collimated, 3-color beam. A shutter was installed to allow each color to be introduced separately (for the imaging of individual regions (spots or pixels) with one color wavelength of the three available in the 3-color beam). The imaging plate was rotated on the imaging stage such that the 3-color laser beam direction was perpendicular to the imaging stack.

Four holographic mirrors at each of three imaging wavelengths were formed, each one being located in a separate region (spot or pixel), by exposing with a collimated single-color laser beam oriented perpendicular to the film plane and passing, in order, through the anti-reflection plate, Isopar® L layer, base sheet, holographic photopolymer, glass plate and Isopar® L layer and then reflecting back onto itself off the mirror. The exposure energy of holographic mirrors imaged at 647 nm was 100 mJ/cm². The exposure nergy of holographic mirrors imaged at 532 nm was 20 mJ/cm². The exposure energy of holographic mirrors imaged at 458 nm was 10 mJ/cm². Each set of four 20 mm diameter regions was formed on the plate using identical imaging conditions. The imaging plate was translated to an unimaged region of the film plate after each exposure and allowed to settle for 30 seconds before a subsequent exposure. After imaging, the AR plates, front surface mirror and Isopar® L layers were removed.

The imaging plate was overall exposed to ultraviolet and visible light from a Theimer-Strahler #5027 mercury-arc lamp (Exposure Systems Corp., Bridgeport, Conn.) mounted in a Douthitt DCOP-X exposure unit (Douthitt Corp., Detroit, Mich.) for 120 sec (about 150 mJ/cm²). The imaging plate was thermally processed by heating at 120° C. for 2 hours in a forced-air convection oven.

The transmission spectrum of the holographic mirrors was recorded using a standard double-beam spectrophotometer (Perkin-Elmer model Lambda-9) with the sample beam oriented perpendicular to the hologram film plane. The results are shown in Table 1 and demonstrate that high efficiency holographic mirrors each having a single wavelength have been formed at the three different wavelengths (448, 522, and 635 nm) at different spots (regions or pixels) within a single holographic photopolymer layer.

TABLE 1

| spot # | red λmax (nm) | exposure DE (%) | green λmax (nm) | exposure DE (%) | blue λmax (nm) | exposure DE (%) |
|---|---|---|---|---|---|---|
| 1 | 635.0 | 99.6 | | | | |
| 2 | 635.2 | 99.5 | | | | |
| 3 | 635.2 | 99.5 | | | | |
| 4 | 635.8 | 99.4 | | | | |
| 5 | | | 522.4 | 99.9 | | |
| 6 | | | 522.2 | 99.9 | | |
| 7 | | | 522.0 | 99.9 | | |
| 8 | | | 522.6 | 99.9 | | |
| 9 | | | | | 448.0 | 99.9 |
| 10 | | | | | 448.4 | 99.9 |
| 11 | | | | | 448.4 | 99.9 |
| 12 | | | | | 448.2 | 99.9 |

EXAMPLE 2

This example demonstrates the imaging of a three-color holographic optical element and a three-color imaging through the holographic optical element designed to block one of the three imaging wavelengths, allowing the other two to pass through and record into the copy film.

To prepare the holographic (photopolymer) recording film which is utilized in this example, a coating solution was prepared containing 66.0 weight % of tetrafluoroethylene/vinyl acetate (TFE/VAc) binder copolymer (containing 20.0 mole % TFE and 80.0 mole % vinyl acetate and having inherent viscosity=1.45 deciliters/gram measured at 30° C.), 21.0 weight % of Photomer® 4039, 6.0 weight % of NVC, 3.0 weight % of Sartomer 349, 3.0 weight % of PI-B, 1.0 weight % of MMT, 0.22 weight % of FC-430, 0.080 weight % of SD-A, 0.060 weight % of SD-B, and 0.020 weight % of SD-C in 19:1 dichloromethane/methanol. The solution was extrusion dye coated onto a 50 µm Mylar® base sheet at a speed of about 31 ft/min (15 cm/sec) using a web coater. The solvent was evaporated by passing the coated film through a three zone drier. The first zone was at 120° F. (49° C.), the second at 140° F. (60° C.), and the third at 160° F. (71° C.). A coversheet of 23 micron Mylar® (polyethylene terephthalate film) was laminated to the coating as it exited the drier. Dry coating thickness was 20 µm.

The coversheet was removed from the photopolymer and the tacky photopolymer was laminated to 100 mm×125 mm×3.2 mm float glass. Excess film was trimmed away so that the laminated film fit within the edges of the glass substrate. The base sheet was left in place during subsequent processing. We refer to the structure of base/holographic photopolymer and glass plate as the imaging plate. The film side of the imaging plate was coupled to an anti-reflection (AR) plate using Isopar® L (Exxon) to provide a good match of the refractive index of the film to the AR plate. On the opposite side of the imaging plate, a front-surface aluminum mirror was coupled to the surface using the same index matching fluid. Pressure was applied to the stack of plates to provide thin, even index matching fluid layers. The stack of plates was then mounted in a conventional plate holder mounted on an imaging stage and allowed to settle for more than 30 seconds.

An argon ion laser with emissions at 458 nm, a dye laser with emissions at 576 nm and a krypton ion laser with emissions at 647 nm were combined by appropriate dichroic mirrors in the conventional way to form a 3-color laser beam This 3-color beam was passed through achromatic optics to form an expanded, collimated, 3-color beam A shutter was installed to allow each color to be introduced separately The imaging plate was rotated on the imaging stage such that the 3-color laser beam direction was perpendicular to the imaging stack.

Four holographic mirrors at each imaging wavelength were formed by exposing with a collimated single-color laser beam oriented perpendicular to the film plane and passing, in order, through the anti-reflection plate, Isopar® L layer, base sheet, holographic photopolymer, glass plate and Isopar® L layer and then reflecting back onto itself off the mirror. The exposure energy of holographic mirrors imaged at 647 nm was 35.4 mJ/cm². The exposure energy of holographic mirrors imaged at 576 nm was 17.7 mJ/cm². The exposure energy of holographic irrors imaged at 458 nm was 12.5 mJ/cm² Each set of four 20 mm diameter region was formed on the plate using identical imaging conditions. The imaging plate was translated to an unimaged region of the film plate after each exposure and allowed to settle for 30 seonds before a subsequent exposure After imaging, the AR plates, front surface mirror and isopar® L layers were removed.

The imaging plate was overall exposed to ultraviolet and visible light from a Theimer-Strahler #5027 mercury-arc lamp (Exposure Systems Corp., Bridgeport, Conn.) mounted in a Douthitt DCOP-X exposure unit (Douthitt Corp., Detroit, Michigan) for 120 sec (about 150 mJ/cm²). The imaging plate was thermally processed by heating at 120° C. for 2 hours in a forced-air convection oven.

The transmission spectra of the holographic mirror was recorded using a standard double-beam spectrophotometer (Perkin-Elmer model Lambda-9) with the sample beam oriented perpendicular to the hologram film plane. The results are shown in Table 2.

TABLE 2

| spot # | λmax (nm) | DE (%) |
|---|---|---|
| 1 | 648.7 | 79.6% |
| 2 | 648.0 | 74.3% |
| 3 | 647.2 | 63.7% |

TABLE 2-continued

| spot # | λmax (nm) | DE (%) |
|---|---|---|
| 4 | 647.7 | 66.9% |
| 5 | 575.7 | 94.5% |
| 6 | 575.8 | 94.8% |
| 7 | 576.0 | 95.3% |
| 8 | 576.1 | 95.9% |
| 9 | 457.5 | 97.4% |
| 10 | 457.5 | 97.5% |
| 11 | 457.5 | 97.7% |
| 12 | 457.5 | 97.9% |

Using the element described in Table 2, we again used the same holographic photopolymer described above coated to a thickness of 20 μm between a 23 μm Mylar® cover sheet and 50 μm Mylar® base sheet on the pilot coater. The coversheet was removed from the photopolymer and the tacky photopolymer was laminated to a section of 100 mm×125 mm×3.2 mm float glass. Excess film was trimmed away so that the laminated film fit within the edges of the glass substrate. The base sheet was left in place during subsequent processing. We refer to the structure of base/holographic photopolymer and glass plate as the imaging plate. The film side of the imaging plate was coupled to glass side of the patterned holographic photomask using Isopar® L (Exxon) to provide a good match of the refractive index for all of the layers. The anti-reflection plate was attached coupled to the film side of the patterned holographic photomask. On the opposite side of the imaging plate, a front-surface aluminum mirror was coupled to the surface using the same index matching fluid. Pressure was applied to the stack of plates to provide thin, even index matching fluid layers. The stack of plates was then mounted in a conventional plate holder mounted on an imaging stage and allowed to settle for more than 30 seconds.

An argon ion laser with emissions at 458 nm, a dye laser with emissions at 576 nm and a krypton ion laser with emissions at 647 nm were combined by appropriate dichroic mirrors in the conventional way to form a 3-color laser beam. This 3-color beam was passed through achromatic optics to form an expanded, collimated, 3-color beam. A shutter was installed to allow simultaneous exposure of all three wavelengths. The imaging plate was rotated on the imaging stage such that the 3-color laser beam direction was perpendicular to the imaging stack.

Twelve holographic mirrors at each imaging wavelength were formed by exposing with a collimated single-color laser beam oriented perpendicular to the film plane and passing, in order, through the anti-reflection plate, Isopar® L layer, base sheet, holographic photopolymer layer of the patterned holographic photomask, glass plate, Isopar® L layer, base sheet, unexposed holographic photopolymer of imaging plate, glass plate and Isopar® L layer and then reflecting back onto itself off the mirror. The exposure energy of the three-color beam incident upon the patterned holographic photomask was 27 mJ/cm² at 647 nm, 13.5 mJ/cm² at 576 nm and 9.5 mJ/cm² at 458 nm. Each set of four 20 mm diameter regions was formed on the plate using identical imaging conditions. The imaging plate was translated to align with the imaged areas of the patterned holographic photomask and an unimaged region of the film plate after each exposure and allowed to settle for 30 seconds before a subsequent exposure. After imaging, the AR plates, front surface mirror and Isopar® L layers were removed.

The imaging plate was overall exposed to ultraviolet and visible light from a Theimer-Strahler #5027 mercury-arc lamp (Exposure Systems Corp., Bridgeport, Conn.) mounted in a Douthitt DCOP-X exposure unit (Douthitt Corp., Detroit, Mich.) for 120 sec (about 150 mJ/cm²). The imaging plate was thermally processed by heating at 120° C. for 2 hours in a forced-air convection oven.

The transmission spectra of the holographic mirror was recorded using a standard double-beam spectrophotometer (Perkin-Elmer model Lambda-9) with the sample beam oriented perpendicular to the hologram film plane. The results are shown in Table 3. Spots 1 through 4 should show high diffraction efficiency at 562 nm and 446 nm and low efficiency at 633 nm. While there is a measurable diffraction efficiency at 633 nm, we attribute this to the somewhat low diffraction efficiency of the patterned holographic photomask at this wavelength as shown in Table 2 spots 1 through 4. Spots 5 through 8 should show high diffraction efficiency at 633 nm and 446 nm and low diffraction efficiency at 563 nm. This is clearly demonstrated. Spots 9 through 12 should show high diffraction efficiency at 633 nm and 563 nm and no diffraction efficiency at 446 nm. Again, this condition is clearly evident.

TABLE 3

| spot # | λmax (nm) | DE (%) | λmax (nm) | DE (%) | λmax (nm) | DE (%) |
|---|---|---|---|---|---|---|
| 1 | 633.2 | 12.9% | 562.2 | 99.0% | 446.9 | 66.1% |
| 2 | 633.3 | 22.4% | 562.6 | 99.7% | 447.3 | 68.4% |
| 3 | 633.2 | 35.4% | 563.0 | 99.6% | 447.4 | 66.9% |
| 4 | 633.5 | 27.6% | 561.2 | 99.8% | 447.8 | 68.4% |
| 5 | 632.8 | 94.0% | 563.4 | 8.8% | 447.3 | 98.9% |
| 6 | 632.8 | 92.8% | 563.2 | 6.7% | 447.3 | 98.2% |
| 7 | 633.0 | 94.8% | 563.0 | 6.7% | 447.4 | 98.8% |
| 8 | 633.0 | 93.7% | — | 0.0% | 447.5 | 98.8% |
| 9 | 633.3 | 85.5% | 562.8 | 99.7% | — | 0% |
| 10 | 633.7 | 84.2% | 562.6 | 99.7% | — | 0% |
| 11 | 633.9 | 82.2% | 562.9 | 99.8% | — | 0% |
| 12 | 634.0 | 85.2% | 562.9 | 99.8% | — | 0% |

IV. Generic Description

In a broader sense, each one of the volume holographic optical elements disclosed herein can also be described as a volume holographic optical element comprising a photohardened holographic recording film element. The photohardened holographic recording film element comprises at least a first plurality of pixel volumes and a second plurality of pixel volumes. For certain uses such as in LCD apparatuses, the first pixel volumes and the second pixel volumes are arranged in rows and columns. Each one of the first pixel volumes includes a volume holographic mirror that passes light with at least one first color (e.g., Red) wavelength band and reflects light with at least another color (e.g., Green) wavelength band. Each one of the second pixel volumes includes a volume holographic mirror that passes light with at least the another color (e.g., Green) wavelength band and reflects light with at least the one color (e.g., Red) wavelength band.

Those skilled in the art, having the benefit of the teachings of the present invention as hereinabove set forth, can effect numerous modifications thereto These modifications are to be construed as being encompassed within the scope of the present invention as set forth in the appended claims.

What is claimed is:

1. A volume holographic optical element, comprising:
   a photohardened holographic recording film element comprising a first plurality of pixel volumes, a second plurality of pixel volumes, and a third plurality of pixel volumes;

each one of the first pixel volumes including a first volume holographic mirror that reflects only light with a first color wavelength band and passes light with at least a second color wavelength band and a third color wavelength band;

each one of the second pixel volumes including a second volume holographic mirror that reflects only light with the second color wavelength band and passes light with at least the first color wavelength band and the third color wavelength band; and each one of the third pixel volumes including a third volume holographic mirror that reflects only light with the third color wavelength band and passes light with at least the first color wavelength band and the second color wavelength band.

2. The element of claim 1, wherein the first color wavelength band has a width of at least 5 nanometers and includes 612 nanometer, the second color wavelength band has a width of at least 5 nanometers and includes 545 nanometer, and the third color wavelength band has a width of at least 5 nanometers and includes 436 nanometer.

3. The element of claim 1, wherein the film element comprises a single photohardened holographic recording film layer.

4. The element of claim 1, wherein the film element comprises two photohardened holographic recording film layers.

5. The element of claim 1, wherein the film element comprises three photohardened holographic recording film layers.

6. In a reflective liquid crystal display apparatus, comprising, in order:

a first light polarizer for passing ambient light having a first polarization;

a liquid crystal display element for selectively modifying the polarization of the light passing through an array of cells such that the polarization of light passing through a first set, a second set or a third set of the cells can be changed to a second polarization;

a second light polarizer for passing light from the liquid crystal display element having the second polarization; and a holographic multicolor reflection filter comprising a first plurality of pixel volumes, a second plurality of pixel volumes, and a third plurality of pixel volumes;

each one of the first pixel volumes including a first volume holographic mirror that reflects only light with a first color wavelength band and passes light with at least a second color wavelength band and a third color wavelength band;

each one of the second pixel volumes including a second volume holographic mirror that reflects only light with the second color wavelength band and passes light with at least the first color wavelength band and the third color wavelength band; and each one of the third pixel volumes including a third volume holographic mirror that reflects only light with the third color wavelength band and passes light with at least the first color wavelength band and the second color wavelength band;

such that (1) when the liquid crystal display element modifies the polarization of the light passing through the first set of cells to the second polarization, the light passes through the second polarizer into the first pixel volumes in which the first volume holographic mirrors reflect light with the first color wavelength band back to a viewer, (2) when the liquid crystal display element modifies the polarization of the light passing through the second set of cells to the second polarization, the light passes through the second polarizer into the second pixel volumes in which the second volume holographic mirrors reflect light with the second color wavelength band back to the viewer, and (3) when the liquid crystal display element modifies the polarization of the light passing through the third set of cells to the second polarization, the light passes through the third polarizer into the third pixel volumes in which the third volume holographic mirrors reflect light with the third color wavelength band back to the viewer.

7. A method for making a first volume holographic optical element, comprising:

a holographic recording film element comprising a first plurality of pixel volumes, a second plurality of pixel volumes, and a third plurality of pixel volumes;

each one of the first pixel volumes including a first volume holographic mirror that reflects only light with a first color wavelength band and passes light with at least a second color wavelength band and a third color wavelength band;

each one of the second pixel volumes including a second volume holographic mirror that reflects only light with the second color wavelength band and passes light with at least the first color wavelength band and the third color wavelength band; and each one of the third pixel volumes including a third volume holographic mirror that reflects only light with the third color wavelength band and passes light with at least the first color wavelength band and the second color wavelength band; the method comprising:

(A) holographically exposing the film element with coherent or substantially coherent light to record the first volume holographic mirrors in the first pixel volumes;

(B) holographically exposing the film element with coherent or substantially coherent light to record the second volume holographic mirrors in the second pixel volumes; and (C) holographically exposing the film element with coherent or substantially coherent light to record the third volume holographic mirrors in the third pixel volumes.

8. The method of claim 7, wherein steps (A), (B) and (C) are performed simultaneously.

9. The method of claim 7, wherein the step (A) comprises:

directing coherent or substantially coherent light through a photomask having a first plurality of pixels which block light and a second plurality of pixels which allow light to pass and then through the film element onto a reflector which reflects the coherent or substantially coherent light back through the film element holographically forming the first volume holographic mirrors in the first pixel volumes.

10. The method of claim 9, further comprising:

before step (A), positioning a first index matching fluid layer on the reflector, a glass support on the first index matching fluid layer, the film element on the glass support, a second index matching fluid layer on the film element, the photomask on the second index matching fluid layer, and an anti-reflection layer on the photomask.

11. The method of claim 9, wherein the step (B) is after step (A) and comprises:

shifting the photomask one pixel in a first direction; and
directing coherent or substantially coherent light through the photomask and then the film element onto the reflector which reflects the coherent or substantially coherent light back through the film element holographically forming the second volume holographic mirrors in the second pixel volumes.

12. The method of claim 11, wherein the step (C) is after step (B) and comprises:
shifting the photomask one pixel in the first direction; and
directing coherent or substantially coherent light through the photomask and then the film element onto the reflector which reflects the coherent or substantially coherent light back through the film element holographically forming the third volume holographic mirrors in the third pixel volumes.

13. The method of claim 7, further comprising curing the holographic recording film element by exposing it to actinic radiation to substantially polymerize any monomer and fix the holographic mirrors in the film element.

14. The method of claim 7, further comprising heating the holographic recording film to increase the refractive index modulation, efficiency and bandwidth of the holographic mirrors.

15. The method of claim 7, further comprising forming the film element with a single, substantially solid, holographic recording film.

16. A volume holographic optical element, comprising:
a photohardened holographic recording film element comprising a first plurality of pixel volumes, a second plurality of pixel volumes, and a third plurality of pixel volumes;
each one of the first pixel volumes including a first volume holographic mirror that passes light with a first color wavelength band and reflects light with at least a second color wavelength band and a third color wavelength band;
each one of the second pixel volumes including a second volume holographic mirror that passes light with the second color wavelength band and reflects light with at least the first color wavelength band and the third color wavelength band; and
each one of the third pixel volumes including a third volume holographic mirror that passes light with the third color wavelength band and reflects light with at least the first color wavelength band and the second color wavelength band, wherein:
the film element comprising a first holographic recording layer, a second holographic recording layer, and a third holographic recording layer;
each one of the first pixel volumes, the second pixel volumes and the third pixel volumes comprises a first layer volume, a second layer volume and a third layer volume;
each of the first volume holographic mirrors comprising:
a fourth volume holographic mirror that passes light with the first color wavelength band and the second color wavelength band and reflects light with the third color wavelength band, the fourth mirrors in the third layer volumes of the first pixel volumes; and
a fifth volume holographic mirror that passes light with the first color wavelength band and the third color wavelength band and reflects light with the second color wavelength band, the fifth mirrors in the second layer volumes of the first pixel volumes; and each of the second volume holographic mirrors comprising:
one of the fourth mirrors in the third layer volumes of the second pixel volumes; and
a sixth volume holographic mirror that passes light with the second color wavelength band and the third color wavelength band and reflects light with the first color wavelength band, the sixth mirrors in the first layer volumes of the second pixel volumes; and
each of the third volume holographic mirrors comprising:
one of the fifth mirrors in the second layer volumes of the third pixel volumes; and
one of the sixth mirrors in the first layer volumes of the third pixel volumes.

17. A volume holographic optical element, comprising:
a photohardened holographic recording film element comprising a first plurality of pixel volumes, a second plurality of pixel volumes, and a third plurality of pixel volumes;
each one of the first pixel volumes including a first volume holographic mirror that passes light with a first color wavelength band and reflects light with at least a second color wavelength band and a third color wavelength band;
each one of the second pixel volumes including a second volume holographic mirror that passes light with the second color wavelength band and reflects light with at least the first color wavelength band and the third color wavelength band; and
each one of the third pixel volumes including a third volume holographic mirror that passes light with the third color wavelength band and reflects light with at least the first color wavelength band and the second color wavelength band, wherein:
the film element comprising a first holographic recording layer and a second holographic recording layer on the first layer;
each one of the first pixel volumes, the second pixel volumes and the third pixel volumes comprises a first layer volume and a second layer volume;
each of the first volume holographic mirrors comprising:
a fourth volume holographic mirror that passes light with the first color wavelength band and the second color wavelength band and reflects light with the third color wavelength band, the fourth mirrors in the first layer volumes of the first pixel volumes; and
a fifth volume holographic mirror that passes light with the first color wavelength band and the third color wavelength band and reflects light with the second color wavelength band, the fifth mirrors in the second layer volumes of the first pixel volumes; and
each of the second volume holographic mirrors comprising:
one of the fourth mirrors in the second layer volumes of the second pixel volumes; and
a sixth volume holographic mirror that passes light with the second color wavelength band and the third color wavelength band and reflects light with the first color wavelength band, the sixth mirrors in the first layer volumes of the second pixel volumes; and
each of the third volume holographic mirrors comprising:

one of the fifth mirrors in the second layer volumes of the third pixel volumes; and one of the sixth mirrors in the first layer volumes of the third pixel volumes.

18. In a transmission liquid crystal display apparatus, for use with a light source having narrowband discrete spectral power peaks at a first color, a second color and a third color, comprising, in order:

a light assembly which emits light with a first color wavelength band, a second color wavelength band and a third color wavelength band;

a first light polarizer for passing light from the light assembly having a first polarization;

a liquid crystal display element for selectively modifying the polarization of the light passing through an array of cells such that the polarization of light passing through a first set, a second set or a third set of the cells can be changed to a second polarization;

a volume holographic optical element comprising a photohardened holographic recording film element comprising a first plurality of pixel volumes, a second plurality of pixel volumes, and a third plurality of pixel volumes;

each one of the first pixel volumes including a first volume holographic mirror that passes light with a first color wavelength band and reflects light with at least a second color wavelength band and a third color wavelength band;

each one of the second pixel volumes including a second volume holographic mirror that passes light with the second color wavelength band and reflects light with at least the first color wavelength band and the third color wavelength band; and each one of the third pixel volumes including a third volume holographic mirror that passes light with the third color wavelength band and reflects light with at least the first color wavelength band and the second color wavelength band, wherein:

the film element comprising a first holographic recording layer, a second holographic recording layer, and a third holographic recording layer;

each one of the first pixel volumes, the second pixel volumes and the third pixel volumes comprises a first layer volume a second layer volume and a third layer volume;

each of the first volume holographic mirrors comprising:

a fourth volume holographic mirror that passes light with the first color wavelength band and the second color wavelength band and reflects light with the third color wavelength band, the fourth mirrors in the third layer volumes of the first pixel volumes; and a fifth volume holographic mirror that passes light with the first color wavelength band and the third color wavelength band and reflects light with the second color wavelength band, the fifth mirrors in the second layer volumes of the first pixel volumes; and each of the second volume holographic mirrors comprising:

one of the fourth mirrors in the third layer volumes of the second pixel volumes; and a sixth volume holographic mirror that passes light with the second color wavelength band and the third color wavelength band and reflects light with the first color wavelength band, the sixth mirrors in the first layer volumes of the second pixel volumes; and each of the third volume holographic mirrors comprising:

one of the fifth mirrors in the second layer volumes of the third pixel volumes; and one of the sixth mirrors in the first layer volumes of the third pixel volumes;

a second light polarizer for passing light having a second polarization, such that (1) when the liquid crystal display element modifies the polarization of the light passing through the first set of cells to the second polarization, the light passes into the first pixel volumes in which the first volume holographic mirrors pass light with the first color wavelength band through the second polarizer to a viewer, (2) when the liquid crystal display element modifies the polarization of the light passing through the second set of cells to the second polarization, the light passes into the second pixel volumes in which the second volume holographic mirrors pass light with the second color wavelength band through the second polarizer to the viewer, and (3) when the liquid crystal display element modifies the polarization of the light passing through the third set of cells to the second polarization, the light passes into the third pixel volumes in which the third volume holographic mirrors pass light with the third color wavelength band through the third polarizer to the viewer.

19. A method for making a second volume holographic optical element from a first volume holographic optical element, the first volume holographic optical element comprising:

a first holographic recording film element comprising a first plurality of pixel volumes, a second plurality of pixel volumes, and a third plurality of pixel volumes;

each one of the first pixel volumes including a first volume holographic mirror that reflects light with a first color wavelength band and passes light with at least a second color wavelength band and a third color wavelength band;

each one of the second pixel volumes including a second volume holographic mirror that reflects light with the second color wavelength band and passes light with at least the first color wavelength band and the third color wavelength band; and each one of the third pixel volumes including a third volume holographic mirror that reflects light with the third color wavelength band and passes light with at least the first color wavelength band and the second color wavelength band; the method comprising:

directing coherent or substantially coherent light including the first color wavelength band, the second color wavelength band and the third color wavelength band through the first volume holographic optical element and then a second holographic recording film element;

reflecting the coherent or substantially coherent light off a reflector back through the second film element; and holographically forming the second volume holographic optical element comprising:

the second film element comprising a first plurality of pixel volumes, a second plurality of pixel volumes, and a third plurality of pixel volumes;

each one of the first pixel volumes including a first volume holographic mirror that passes light with a first color wavelength band and reflects light with at least a second color wavelength band and a third color wavelength band;

each one of the second pixel volumes including a second volume holographic mirror that passes light with the second color wavelength band and reflects light with at least the first color wavelength band and the third color wavelength band; and each one of the third pixel volumes including a third volume holographic mirror that passes light with the third color wavelength band and reflects light with at least the first color wavelength band and the second color wavelet band.

20. The method of claim 19, further comprising:
before the directing step, positioning the second film element on the reflector, a glass support on the second film element, and the first film element on the glass support.

21. The method of claim 19, further comprising:
removing the first film element; and
curing the second film element by exposing it to actinic radiation to substantially polymerize any monomer and fix the holographic mirrors in the second film element.

22. The method of claim 21, further comprising, after the removing step and before the curing step, laminating a cover sheet to the second film element.

23. The method of claim 22, further comprising heating the second film element to increase the refractive index modulation, efficiency and bandwidth of the holographic mirrors.

24. The method of claim 22, further comprising:
removing the reflector; and
laminating the second film element to a second glass support.

25. The method of claim 19, further comprising forming the film element with a single, substantially solid, holographic recording film.

26. The method of claim 19, forming the film element with a first holographic recording layer sensitized to the third color wavelength band, a second holographic recording layer sensitized to the second color wavelength band on the first layer, and a third holographic recording layer sensitized to the first color wavelength band on the second layer.

27. A method for making a second volume holographic optical element from a first volume holographic optical element, comprising:
a first holographic recording film element comprising a first plurality of pixel volumes, a second plurality of pixel volumes, and a third plurality of pixel volumes;
each one of the first pixel volumes including a first volume holographic mirror that passes light with a first color wavelength band and reflects light with at least a second color wavelength band and a third color wavelength band;
each one of the second pixel volumes including a second volume holographic mirror that passes light with the second color wavelength band and reflects light with at least the first color wavelength band and the third color wavelength band; and
each one of the third pixel volumes including a third volume holographic mirror that passes light with the third color wavelength band and reflects light with at least the first color wavelength band and the second color wavelength band;

the method comprising:
directing coherent or substantially coherent light including the first color wavelength band, the second color wavelength band and the third color wavelength band through a laminate comprising a second holographic recording film element and then the first volume holographic optical element;
reflecting the second color wavelength band and the third color wavelength band off the first mirrors back through first pixel volumes of the second film element;
reflecting the first color wavelength band and the third color wavelength band off the second mirrors back through second pixel volumes of the second film element;
reflecting the first color wavelength band and the second color wavelength band off the third mirrors back through third pixel volumes of the second film element; and
holographically forming the second volume holographic optical element.

28. The method of claim 27, further comprising:
before the directing step, positioning the first film element on a light absorbing layer, a glass support on the first film element, the second film element on the glass support, an index matching fluid layer on the second film element, and an anti-reflection layer on the index matching fluid layer.

29. The method of claim 28, further comprising:
removing the light absorbing layer, the first film element, the glass support, the index matching fluid layer and the anti-reflection layer; and
curing the second film element by exposing it to actinic radiation to substantially polymerize any monomer and fix the holographic mirrors in the second film element.

30. The method of claim 29, further comprising heating the second film element to increase the refractive index modulation, efficiency and bandwidth of the holographic mirrors.

31. The method of claim 30, further comprising laminating the second film element to a second glass support.

32. The method of claim 27, further comprising forming the film element with a single, substantially solid, holographic recording film.

33. The method of claim 27, forming the film element with a first holographic recording layer sensitized to the third color wavelength band, a second holographic recording layer sensitized to the second color wavelength band on the first layer, and a third holographic recording layer sensitized to the first color wavelength band on the second layer.

34. A method for making a multi-layer volume holographic optical element, comprising:
a photohardened holographic recording film element comprising a first plurality of pixel volumes, a second plurality of pixel volumes, and a third plurality of pixel volumes;
each one of the first pixel volumes including a first volume holographic mirror that passes light with at least a first color wavelength band and reflects only light with a second color wavelength band and a third color wavelength band;
each one of the second pixel volumes including a second volume holographic mirror that passes light with at least the second color wavelength band and reflects only light with the first color wavelength band and the third color wavelength band; and each one of the third pixel volumes including a third volume holographic mirror that passes light with at least the third color wavelength band and reflects only light with the first color wavelength band and the second color wavelength band;

the film element comprising a first holographic recording layer sensitized to the third color wavelength band, a second holographic recording layer sensitized to the second color wavelength band on the first layer, and a third holographic recording layer sensitized to the first color wavelength band on the second layer;

each one of the first pixel volumes, the second pixel volumes and the third pixel volumes comprises a first layer volume, a second layer volume and a third layer volume;

each of the first volume holographic mirrors comprising:
 a fourth volume holographic mirror that passes light with the first color wavelength band and the second color wavelength band and reflects light with the third color wavelength band, the fourth mirrors in the third layer volumes of the first pixel volumes; and
 a fifth volume holographic mirror that passes light with the first color wavelength band and the third color wavelength band and reflects light with the second color wavelength band, the fifth mirrors in the second layer volumes of the first pixel volumes; and each of the second volume holographic mirrors comprising:
 one of the fourth mirrors in the third layer volumes of the second pixel volumes; and
 a sixth volume holographic mirror that passes light with the second color wavelength band and the third color wavelength band and reflects light with the first color wavelength band, the sixth mirrors in the first layer volumes of the second pixel volumes; and each of the third volume holographic mirrors comprising:
 one of the fifth mirrors in the second layer volumes of the third pixel volumes; and
 one of the sixth mirrors in the first layer volumes of the third pixel volumes;

the method comprising:
 imagewise exposing the film element to actinic radiation to polymerize monomer in selected first layer volumes, second layer volumes and third layer volumes to make the exposed volumes holographically inactive; and
 holographically imaging the film element with coherent or substantially coherent light consisting essentially of the first color wavelength band, the second color wavelength band and the third color wavelength band to record the multi-layer volume holographic optical element.

35. A method for making a two-layer volume holographic optical element, comprising:
 a photohardened holographic recording film element comprising a first plurality of pixel volumes, a second plurality of pixel volumes, and a third plurality of pixel volumes;
 each one of the first pixel volumes including a first volume holographic mirror that passes light with a first color wavelength band and reflects light with at least a second color wavelength band and a third color wavelength band;
 each one of the second pixel volumes including a second volume holographic mirror that passes light with the second color wavelength band and reflects light with at least the first color wavelength band and the third color wavelength band; and each one of the third pixel volumes including a third volume holographic mirror that passes light with the third color wavelength band and reflects light with at least the first color wavelength band and the second color wavelength band;

the film element comprising a first holographic recording layer at least sensitized to the first color wavelength band and the third color wavelength band, and a second holographic recording layer at least sensitized to the second color wavelength band and the third color wavelength band on the first layer;

each one of the first pixel volumes, the second pixel volumes and the third pixel volumes comprises a first layer volume and a second layer volume;

each of the first volume holographic mirrors comprising:
 a fourth volume holographic mirror that passes light with the first color wavelength band and the second color wavelength band and reflects light with the third color wavelength band, the fourth mirrors in the first layer volumes of the first pixel volumes; and
 a fifth volume holographic mirror that passes light with the first color wavelength band and the third color wavelength band and reflects light with the second color wavelength band, the fifth mirrors in the second layer volumes of the first pixel volumes; and each of the second volume holographic mirrors comprising:
 one of the fourth mirrors in the second layer volumes of the second pixel volumes; and
 a sixth volume holographic mirror that passes light with the second color wavelength band and the third color wavelength band and reflects light with the first color wavelength band, the sixth mirrors in the first layer volumes of the second pixel volumes; and each of the third volume holographic mirrors comprising:
 one of the fifth mirrors in the second layer volumes of the third pixel volumes; and
 one of the sixth mirrors in the first layer volumes of the third pixel volumes;

the method comprising:
 imagewise holographically exposing the second layer with coherent or substantially coherent light consisting essentially of the third color wavelength band to record the fourth volume holographic mirrors in the second layer volumes of the second pixel volumes;
 imagewise holographically exposing the second layer with coherent or substantially coherent light consisting essentially of the second color wavelength band to record the fifth volume holographic mirrors in the second layer volumes of the first pixel volumes and the third pixel volumes;
 laminating the first holographic recording layer adjacent the second layer;
 imagewise holographically exposing the first layer with coherent or substantially coherent light consisting essentially of the third color wavelength band to record the fourth volume holographic mirrors in the first layer volumes of the first pixel volumes;
 imagewise holographically exposing the first layer with coherent or substantially coherent light consisting essentially of the first color wavelength band to record the sixth volume holographic mirrors in the first layer volumes of the second pixel volumes and the third pixel volumes.

36. A volume holographic optical element, comprising:

a photohardened holographic recording film element comprising at least a first plurality of pixel volumes and a second plurality of pixel volumes arranged in rows and columns;

each one of the first pixel volumes including a volume holographic mirror that passes light with at- least one first color wavelength band and reflects light with at least a second color wavelength band;

each one of the second pixel volumes including a volume holographic mirror that passes light with at least the second color wavelength band and reflects light with at least the first color wavelength band;

a substantially optically transparent mask surrounding each first and second pixel volumes, that transmits light with at least the first color wavelength band and the second color wavelength band; and an optical absorber that is substantially nonreflective and optically opaque such that light which passes through the mask between the first pixel volumes and the second pixel volumes is substantially absorbed by the optical absorber.

37. In a liquid crystal display apparatus having a multicolor filter comprising (i) at least a first plurality of pixel volumes that pass light with at least a first color wavelength band and block light with at least a second color wavelength band and (ii) a second plurality of pixel volumes that passes light with at least a second color wavelength band and blocks light with at least the first color wavelength band, wherein the improvement comprises the filter being a photohardened holographic recording film element having an integral substantially transparent mask surrounding the first and second pixel volumes.

38. In a reflective liquid crystal display apparatus, comprising, in order:

a first light polarizer for passing ambient light having a first polarization;

a liquid crystal display element for selectively modifying the polarization of the light passing through an array of cells such that the polarization of light passing through a first set, a second set or a third set of the cells can be changed to a second polarization;

a second light polarizer for passing light from the liquid crystal display element having the second polarization; and a holographic multicolor reflection filter comprising a first plurality of pixel volumes, a second plurality of pixel volumes, a third plurality of pixel volumes, and an integral transparent mask comprising a fourth plurality of mask volumes;

each one of the first pixel volumes including a first volume holographic mirror that reflects light with a first color wavelength band and passes light with at least a second color wavelength band and a third color wavelength band;

each one of the second pixel volumes including a second volume holographic mirror that reflects light with the second color wavelength band and passes light with at least the first color wavelength band and the third color wavelength band;

each one of the third pixel volumes including a third volume holographic mirror that reflects light with the third color wavelength band and passes light with at least the first color wavelength band and the second color wavelength band;

each one of the fourth mask volumes that transmits light with first color wavelength band, the second color wavelength band, and the third color wavelength band; and an optical absorber that is substantially nonreflective and optically opaque;

such that (1) when the liquid crystal display element modifies the polarization of the light passing through the first set of cells to the second polarization, the light passes through the second polarizer into the first pixel volumes in which the first volume holographic mirrors reflect light with the first color wavelength band back to a viewer, (2) when the liquid crystal display element modifies the polarization of the light passing through the second set of cells to the second polarization, the light passes through the second polarizer into the second pixel volumes in which the second volume holographic mirrors reflect light with the second color wavelength band back to the viewer, (3) when the liquid crystal display element modifies the polarization of the light passing through the third set of cells to the second polarization, the light passes through the third polarizer into the third pixel volumes in which the third volume holographic mirrors reflect light with the third color wavelength band back to the viewer, and (4) light which passes through the mask between the first pixel volumes, the second pixel volumes and the third pixel volumes is substantially absorbed by the optical absorber.

39. A wide bandwidth volume holographic optical element, comprising:

a photohardened holographic recording film element comprising at least a first plurality of pixel volumes and a second plurality of pixel volumes arranged in rows and columns;

each one of the first pixel volumes including a first volume holographic mirror in a first layer that passes light with at least one first color wavelength band and reflects light only with a first wavelength sub-band of a second color wavelength band and a second volume holographic mirror in a second layer that passes light with at least one first color wavelength band and reflects light only with a second wavelength sub-band of the second color wavelength band, the first sub-band of the second color wavelength band being immediately adjacent in wavelength to the second wavelength sub-band of the second color wavelength band; and each one of the second pixel volumes including a first volume holographic mirror in the first layer that passes light with at least the second color wavelength band and reflects light only with a first wavelength sub-band of the first color wavelength band and a second volume holographic mirror in the second layer that passes light with at least the second color wavelength band and reflects light only with a first wavelength sub-band of the first color wavelength band, the first sub-band of the first color wavelength band being immediately adjacent in wavelength to the second wavelength sub-band of the first color wavelength band.

40. In a liquid crystal display apparatus having a multicolor filter comprising (i) at least a first plurality of pixel volumes that pass light with at least a first color wavelength band and block only light with a second color wavelength band and (ii) a second plurality of pixel volumes that passes light with at least a second color wavelength band and blocks only with the first color wavelength band, wherein the improvement comprises the filter being a photohardened holographic recording film element, comprising:

a photohardened holographic recording film element comprising at least a first plurality of pixel volumes and a second plurality of pixel volumes arranged in rows and columns;

each one of the first pixel volumes including a first volume holographic-mirror in a first layer that passes light with at least one first color wavelength band and reflects light only with a first wavelength sub-band of a second color wavelength band and a second volume holographic mirror in a second layer that passes light with at least one first color wavelength band and reflects light only with a second wavelength sub-band of the second color wavelength band, the first sub-band of the second color wavelength band being immediately adjacent in wavelength to the second wavelength sub-band of the second color wavelength band; and each one of the second pixel volumes including a first volume holographic mirror in the first layer that passes light with at least the second color wavelength band and reflects light only with a first wavelength sub-band of the first color wavelength band and a second volume holographic mirror in the second layer that passes light with at least the second color wavelength band and reflects light only with a first wavelength sub-band of the first color wavelength band, the first sub-band of the first color wavelength band being immediately adjacent in wavelength to the second wavelength sub-band of the first color wavelength band.

41. A wide-bandwidth volume holographic optical element for use as a multicolor reflection filter in a liquid crystal display apparatus, the volume holographic optical element comprising:

a plurality of first pixel volumes which each include a volume holographic mirror in a first layer and a volume holographic mirror in a second layer, the volume holographic mirror in the first layer reflecting light in a first wavelength sub-band of a first color wavelength band and passing at least a second and a third color wavelength band, and the volume holographic mirror in the second layer reflecting light in a second wavelength sub-band of a first color wavelength band and passing at least a second and a third color wavelength band, the first sub-band of the first color wavelength band being immediately adjacent in wavelength to the second wavelength sub-band of the first color wavelength band;

a plurality of second pixel volumes which each include a volume holographic mirror in a first layer and a volume holographic mirror in a second layer, the volume holographic mirror in the first layer reflecting light in a first wavelength sub-band of a second color wavelength band and passing at least a first and a third color wavelength band, and the volume holographic mirror in the second layer reflecting light in a second wavelength sub-band of a second color wavelength band and passing at least a first and a third color wavelength band, the first sub-band of the second color wavelength band being immediately adjacent in wavelength to the second wavelength sub-band of the second color wavelength band;

a plurality of third pixel volumes-which each include a volume holographic mirror in a first layer and a volume holographic mirror in a second layer, the volume holographic mirror in the first layer reflecting light in a first wavelength sub-band of a third color wavelength band and passing at least a first and a second color wavelength band, and the volume holographic mirror in the second layer reflecting light in a second wavelength sub-band of a third color wavelength band and passing at least a first and a second color wavelength band, the first sub-band of the third color wavelength band being immediately adjacent in wavelength to the second wavelength sub-band of the third color wavelength band.

42. The element of claim 41, wherein the first color wavelength band has a width of at least 20 nanometers and includes 612 nanometer, the second color wavelength band has a width of at least 20 nanometers and includes 545 nanometer, and the third color wavelength band has a width of at least 20 nanometers and includes 436 nanometer.

43. The element of claim 41, wherein the film element comprises three photohardened holographic recording film layers.

44. In a reflective liquid crystal display apparatus, comprising, in order:

a first light polarizer for passing ambient light having a first polarization;

a liquid crystal display element for selectively modifying the polarization of the light passing through an array of cells such that the polarization of light passing through a first set, a second set or a third set of the cells can be changed to a second polarization;

a second light polarizer for passing light from the liquid crystal display element having the second polarization; and a holographic multicolor reflection filter comprising a first plurality of pixel volumes, a second plurality of pixel volumes, and a third plurality of pixel volumes;

each one of the first pixel volumes including a volume holographic mirror in a first layer and a volume holographic mirror in a second layer, the volume holographic mirror in the first layer reflecting light in a first wavelength sub-band of a first color wavelength band and passing at least a second and a third color wavelength band, and the volume holographic mirror in the second layer reflecting light in a second wavelength sub-band of a first color wavelength band and passing at least a second and a third color wavelength band, the first sub-band of the first color wavelength band being immediately adjacent in wavelength to the second wavelength sub-band of the first color wavelength band;

each one of the second pixel volumes including volume holographic mirror in a first layer and a volume holographic mirror in a second layer, the volume holographic mirror in the first layer reflecting light in a first wavelength sub-band of a second color wavelength band and passing at least a first and a third color wavelength band, and the volume holographic mirror in the second layer reflecting light in a second wavelength sub-band of a second color wavelength band and passing at least a first and a third color wavelength band, the first sub-band of the second color wavelength band being immediately adjacent in wavelength to the second wavelength sub-band of the second color wavelength band; and each one of the third pixel volumes including a volume holographic mirror in a first layer and a volume holographic mirror in a second layer, the volume holographic mirror in the first layer reflecting light in a first wavelength sub-band of a third color wavelength band and passing at least a first and a second color wavelength band, and the volume holographic mirror in the second layer reflecting light in a second wavelength sub-band of a third color wavelength band and passing at least a first and a second dolor wavelength band, the first sub-band of the third color wavelength band being immediately adjacent in wavelength to the second wavelength sub-band of the third color wavelength band;

such that (1) when the liquid crystal display element modifies the polarization of the light passing through the first set of cells to the second polarization, the light passes through the second polarizer into the first pixel volumes in which the first volume holographic mirrors reflect light with the first color wavelength band back to a viewer, (2) when the liquid crystal display element modifies the polarization of the light passing through the second set of cells to the second polarization, the light passes through the second polarizer into the second pixel volumes in which the second volume holographic mirrors reflect light with the second color wavelength band back to the viewer, and (3) when the liquid crystal display element modifies the polarization of the light passing through the third set of cells to the second polarization, the light passes through the third polarizer into the third pixel volumes in which the third volume holographic mirrors reflect light with the third color wavelength band back to the viewer.

45. A wide-viewing angle volume holographic optical element for use as a multicolor reflection filter in a liquid crystal display apparatus, the volume holographic optical element comprising:

a holographic recording film element comprising a first plurality of pixel volumes, a second plurality of pixel volumes, and a third plurality of pixel volumes;

each one of the first pixel volumes including a first volume holographic mirror that reflects, in a diverging manner within a predetermined cone angle, only light with a first color wavelength band and passes light with at least a second color wavelength band and a third color wavelength band;

each one of the second pixel volumes including a second volume holographic mirror that reflects, in a diverging manner within a predetermined cone angle, only light with the second color wavelength band and passes light with at least the first color wavelength band and the third color wavelength band; and each one of the third pixel volumes including a third volume holographic mirror that reflects, in a diverging manner within a predetermined cone angle, only light with the third color wavelength band and passes light with at least the first color wavelength band and the second color wavelength band.

46. A method for making a first volume holographic optical element, comprising:

a holographic recording film element comprising a first plurality of pixel volumes, a second plurality of pixel volumes, and a third plurality of pixel volumes;

each one of the first pixel volumes including a first volume holographic mirror that reflects, in a diverging manner within a predetermined cone angle, only light with a first color wavelength band and passes light with at least a second color wavelength band and a third color wavelength band;

each one of the second pixel volumes including a second volume holographic mirror that reflects, in a diverging manner within a predetermined cone angle, only light with the second color wavelength band and passes light with at least the first color wavelength band and the third color wavelength band; and each one of the third pixel volumes including a third volume holographic mirror that reflects, in a diverging manner within a predetermined cone angle, only light with the third color wavelength band and passes light with at least the first color wavelength band and the second color wavelength band; the method comprising:

(A) holographically exposing the film element with coherent or substantially coherent light to record the first volume holographic mirrors in the first pixel volumes;

(B) holographically exposing the film element with coherent or substantially coherent light to record the second volume holographic mirrors in the second pixel volumes; and (C) holographically exposing the film element with coherent or substantially coherent light to record the third volume holographic mirrors in the third pixel volumes.

47. The method of claim 46, wherein steps (A), (B) and (C) are performed simultaneously.

48. The method of claim 46, wherein the step (A) comprises.

directing coherent or substantially coherent light through a photomask having a first plurality of pixels which block light and a second plurality of pixels which allow light to pass and then through the film element onto a reflector comprising an array of concave reflector elements corresponding to the first plurality of pixels, the reflector elements reflecting the coherent or substantially coherent light back through the film element, in a diverging manner within a predetermined cone angle to holographically form the first volume holographic mirrors in the first pixel volumes.

49. The method of claim 48 wherein the reflector elements are substantially spherically concave.

50. The method of claim 48 wherein the reflector elements are substantially cylindrically concave.

51. The method of claim 50, wherein the step (C) is after step (B) and comprises:

shifting the photomask one pixel in the first direction; and directing coherent or substantially coherent light through the photomask and then the film element onto a reflector comprising an array of concave reflector elements corresponding to the third plurality of pixels, the reflector elements reflecting the coherent or substantially coherent light back through the film element holographically forming the third volume holographic mirrors in the third pixel volumes.

52. The method of claim 48, further comprising:

before step (A), positioning a first index matching fluid layer on the reflector, a glass support on the first index matching fluid layer, the film element on the glass support, a second index matching fluid layer on the film element, the photomask on the second index matching fluid layer, and an anti-reflection layer on the photomask.

53. The method of claim 48, wherein the step (B) is after step (A) and comprises:

shifting the photomask one pixel in a first direction; and directing coherent or substantially coherent light through the photomask and then the film element onto a reflector comprising an array of concave reflector elements corresponding to the second plurality of pixels, the reflector elements reflecting the coherent or substantially coherent light back through the film element, in a diverging manner within a predetermined cone angle, holographically forming the second volume holographic mirrors in the second pixel volumes.

54. The method of claim 46, further comprising curing the holographic recording film element by exposing it to actinic radiation to substantially polymerize any monomer and fix the holographic mirrors in the film element.

55. The method of claim 46, further comprising heating the holographic recording film to increase the refractive index modulation, efficiency and bandwidth of the holographic mirrors.

56. The method of claim 46, further comprising forming the film element with a single, substantially solid, holographic recording film.

57. A wide viewing angle volume holographic optical element, comprising:
- a photohardened holographic recording film element comprising a first plurality of pixel volumes, a second plurality of pixel volumes, and a third plurality of pixel volumes;
- each one of the first pixel volumes including a first volume holographic mirror that passes light, in a diverging manner, with a first color wavelength band and reflects light, within a predetermined acceptance cone angle, with at least a second color wavelength band and a third color wavelength band;
- each one of the second pixel volumes including a second volume holographic mirror that passes light, in a diverging manner, with the second color wavelength band and reflects light, within a predetermined acceptance cone angle, with at least the first color wavelength band and the third color wavelength band; and
- each one of the third pixel volumes including a third volume holographic mirror that passes light, in a diverging manner, with the third color wavelength band and reflects light with at least the first color wavelength band within a predetermined acceptance cone angle and the second color wavelength band, wherein:
- the film element comprising a first holographic recording layer and a second holographic recording layer on the first layer;
- each one of the first pixel volumes, the second pixel volumes and the third pixel volumes comprises a first layer volume and a second layer volume;
- each of the first volume holographic mirrors comprising:
  - a fourth volume holographic mirror that passes light with the first color wavelength band and the second color wavelength band and reflects light, within a predetermined acceptance cone angle, with the third color wavelength band, the fourth mirrors in the first layer volumes of the first pixel volumes; and
  - a fifth volume holographic mirror that passes light with the first color wavelength band and the third color wavelength band and reflects light, within a predetermined acceptance cone angle, with the second color wavelength band, the fifth mirrors in the second layer volumes of the first pixel volumes; and
- each of the second volume holographic mirrors comprising:
  - one of the fourth mirrors in the second layer volumes of the second pixel volumes; and
  - a sixth volume holographic mirror that passes light with the second color wavelength band and the third color wavelength band and reflects light, within a predetermined acceptance cone angle, with the first color wavelength band, the sixth mirrors in the first layer volumes of the second pixel volumes; and
- each of the third volume holographic mirrors comprising:
  - one of the fifth mirrors in the second layer volumes of the third pixel volumes; and
  - one of the sixth mirrors in the first layer volumes of the third pixel volumes.

58. In a transmission liquid crystal display apparatus, for use with a light source having narrow bandwidth discrete spectral power peaks at a first color, a second color and a third color, comprising, in order:
- a light assembly which emits light with a first color wavelength band, a second color wavelength band and a third color wavelength band;
- a first light polarizer for passing light from the light assembly having a first polarization;
- a liquid crystal display element for selectively modifying the polarization of the light passing through an array of cells such that the polarization of light passing through a first set, a second set or a third set of the cells can be changed to a second polarization;
- a holographic multicolor transmission filter comprising a first plurality of pixel volumes, a second plurality of pixel volumes, and a third plurality of pixel volumes;
- each one of the first pixel volumes including a first volume holographic mirror that passes, in a diverging manner, at least light with a first color wavelength band and reflects light, within a predetermined acceptance cone angle, with only a second color wavelength band and a third color wavelength band;
- each one of the second pixel volumes including a second volume holographic mirror that passes light, in a diverging manner, with at least the second color wavelength band and reflects light, within a predetermined acceptance cone angle, with only the first color wavelength band and the third color wavelength band; and
- each one of the third pixel volumes including a third volume holographic mirror that passes light, in a diverging manner, with at least the third color wavelength band and reflects light, within a predetermined acceptance cone angle, with only the first color wavelength band and the second color wavelength band;
- a second light polarizer for passing light having a second polarization,
- such that (1) when the liquid crystal display element modifies the polarization of the light passing through the first set of cells to the second polarization, the light passes into the first pixel volumes in which the first volume holographic mirrors pass light with the first color wavelength band, in a diverging manner, through the second polarizer to a viewer, (2) when the liquid crystal display element modifies the polarization of the light passing through the second set of cells to the second polarization, the light passes into the second pixel volumes in which the second volume holographic mirrors pass light with the second color wavelength band, in a diverging manner, through the second polarizer to the viewer, and (3) when the liquid crystal display element modifies the polarization of the light passing through the third set of cells to the second polarization, the light passes into the third pixel volumes in which the third volume holographic mirrors pass light with the third color wavelength band, in a diverging manner, through the third polarizer to the viewer.

59. A volume holographic optical element, comprising:
   a photohardened holographic recording film element comprising at least a first plurality of pixel volumes and a second plurality of pixel volumes;
   each one of the first pixel volumes including a volume holographic mirror that passes light with at least one first color wavelength band and reflects light with at least a second color wavelength band;
   each one of the second pixel volumes including a volume holographic mirror that passes light with at least the second color wavelength band and reflects light with at least the first color wavelength band; and
   a substantially optically opaque mask volume surrounding each first and second pixel volumes, comprising a third volume holographic mirror that reflects light with at least the first color wavelength band and the second color wavelength band.

60. In a liquid display apparatus having a multicolor filter comprising (i) at least a first plurality of pixel volumes that pass light with at least a first color wavelength band and block light with at least a second color wavelength band and (ii) a second plurality of pixel volumes that passes light with at least a second color wavelength band and blocks light with at least the first color wavelength band, wherein the improvement comprises the filter being a photohardened holographic recording film element having an integral substantially optically opaque mask volume surrounding the first and second pixel volumes the mask volume comprising a third volume holographic mirror that reflects light with at least the first color wavelength band and the second color wavelength band.

61. In a reflective liquid crystal display apparatus, comprising, in order:
   a first light polarizer for passing ambient light having a first polarization;
   a liquid crystal display element for selectively modifying the polarization of the light passing through an array of cells such that the polarization of light passing through a first set, a second set or a third set of the cells can be changed to a second polarization;
   a second light polarizer for passing light from the liquid crystal display element having the second polarization; and
   a holographic multicolor reflection filter comprising a first plurality of pixel volumes, a second plurality of pixel volumes, a third plurality of pixel volumes, and an integral opaque mask volume comprising a fourth plurality of mask volumes;
   each one of the first pixel volumes including a first volume holographic mirror that reflects light with a first color wavelength band and passes light with at least a second color wavelength band and a third color wavelength band;
   each one of the second pixel volumes including a second volume holographic mirror that reflects light with the second color wavelength band and passes light with at least the first color wavelength band and the third color wavelength band;
   each one of the third pixel volumes including a third volume holographic mirror that reflects light with the third color wavelength band and passes light with at least the first color wavelength band and the second color wavelength band; and
   each one of the fourth mask volumes including a fourth volume holographic mirror that reflects light with first color wavelength band, the second color wavelength band and the third color wavelength band;
   such that (1) when the liquid crystal display element modifies the polarization of the light passing through the first set of cells to the second polarization, the light passes through the second polarizer into the first pixel volumes in which the first volume holographic mirrors reflect light with the first color wavelength band back to a viewer, (2) when the liquid crystal display element modifies the polarization of the light passing through the second set of cells to the second polarization, the light passes through the second polarizer into the second pixel volumes in which the second volume holographic mirrors reflect light with the second color wavelength band back to the viewer, and (3) when the-liquid crystal display element modifies the polarization of the light passing through the third set of cells to the second polarization, the light passes through the third polarizer into the third pixel volumes in which the third volume holographic mirrors reflect light with the third color wavelength band back to the viewer.

62. A method for making a first volume holographic optical element, comprising:
   a holographic recording film element comprising a first plurality of pixel volumes, a second plurality of pixel volumes, a third plurality of pixel volumes, and a fourth plurality of mask volumes;
   each one of the first pixel volumes including a first volume holographic mirror that reflects light with a first color wavelength band and passes light with at least a second color wavelength band and a third color wavelength band;
   each one of the second pixel volumes including a second volume holographic mirror that reflects light with the second color wavelength band and passes light with at least the first color wavelength band and the third color wavelength band; and
   each one of the third pixel volumes including a third volume holographic mirror that reflects light with the third color wavelength band and passes light with at least the first color wavelength band and the second color wavelength band;
   each one of the fourth mask volumes including a fourth volume holographic mirror that reflects light with first color wavelength band, the second color wavelength band and the third color wavelength band; the method comprising:
   (A) holographically exposing the film element with coherent or substantially coherent light to record the first volume holographic mirrors in the first pixel volumes and a first portion of the fourth volume holographic mirrors in the fourth mask volumes;
   (B) holographically exposing the film element with coherent or substantially coherent light to record the second volume holographic mirrors in the second pixel volumes and a second portion of the fourth volume holographic mirrors in the fourth mask volumes; and
   (C) holographically exposing the film element with coherent or substantially coherent light to record the third volume holographic mirrors in the third pixel volumes and a third portion of the fourth volume holographic mirrors in the fourth mask volumes.

* * * * *